United States Patent
Eckman et al.

(10) Patent No.: US 10,984,378 B1
(45) Date of Patent: Apr. 20, 2021

(54) PROFILING PALLETS AND GOODS IN A WAREHOUSE ENVIRONMENT

(71) Applicants: Lineage Logistics, LLC, Irvine, CA (US); Cloud 9 Perception, LP, Arlington, TX (US)

(72) Inventors: Christopher Frank Eckman, San Francisco, CA (US); Aalam Shaikh, Sunnyvale, TX (US); Chris McMurrough, Arlington, TX (US); James Staud, Arlington, TX (US); Caitlin Voegele, San Francisco, CA (US); Tony Taurone, Sunnyvale, TX (US); Daniel Thomas Wintz, San Francisco, CA (US); Maxwell Micali, Berkeley, CA (US); Charles Inokon, Raleigh, NC (US); Michael Buenger, Sunnyvale, TX (US); Elliott Gerard Wolf, Oakland, CA (US)

(73) Assignees: Lineage Logistics, LLC, Irvine, CA (US); Cloud 9 Perception, LP, Arlington, TX (US)

( * ) Notice: Subject to any disclaimer, the term of this patent is extended or adjusted under 35 U.S.C. 154(b) by 0 days.

(21) Appl. No.: 16/671,133

(22) Filed: Oct. 31, 2019

(51) Int. Cl.
G06Q 10/08 (2012.01)
G06K 19/06 (2006.01)
(Continued)

(52) U.S. Cl.
CPC ....... *G06Q 10/087* (2013.01); *G05B 19/4189* (2013.01); *G06K 19/06131* (2013.01);
(Continued)

(58) Field of Classification Search
CPC .......... G06Q 10/087; G06T 7/62; G06T 7/97; G05B 19/4189
(Continued)

(56) References Cited

U.S. PATENT DOCUMENTS 9,826,213 B1 11/2017 Russell
2006/0287759 A1* 12/2006 Charych ............... B66F 9/0755
700/213
(Continued)

OTHER PUBLICATIONS

Cloud9Perception.com [online], "Machine Vision Systems—Perception hardware & software," available on or before Sep. 25, 2019, via Internet Archive: Wayback Machine URL <https://web.archive.org/web/20190925155457/https:/cloud9perception.com/>, retrieved on May 13, 2020, URL<https://cloud9perception.com/>, 4 pages.
(Continued)

*Primary Examiner* — Vanel Frenel
(74) *Attorney, Agent, or Firm* — Fish & Richardson P.C.

(57) ABSTRACT

In one implementation, a system for automatically profiling pallets includes a frame defining an opening that is sized and shaped for a pallet to pass through, and cameras mounted to the frame, the cameras being configured to capture images of a pallet as it passes through the frame. The system further includes a profiling computer system that is configured to receive the images captured by the cameras and to automatically profile the pallet based, at least in part, on analysis of the images. Automatically profiling the pallet includes generating a point cloud representing the pallet based on the images, determining a size of the pallet based on the point cloud generated from images of the pallet, identifying contents of the pallet based on the images, and providing pallet information identifying, at least, the size and contents of the pallet to a warehouse management system in association with the pallet.

29 Claims, 47 Drawing Sheets

(51) Int. Cl.
*G06T 7/62* (2017.01)
*G06T 7/00* (2017.01)
*G05B 19/418* (2006.01)

(52) U.S. Cl.
CPC .................. *G06T 7/62* (2017.01); *G06T 7/97* (2017.01); *G06T 2207/10016* (2013.01)

(58) Field of Classification Search
USPC .......... 705/28, 339, 340; 700/213, 232, 244; 414/788.1, 799; 348/159; 382/152
See application file for complete search history.

(56) References Cited

U.S. PATENT DOCUMENTS

| | | | |
|---|---|---|---|
| 2017/0091957 A1* | 3/2017 | Driegen | G06T 7/62 |
| 2017/0301004 A1* | 10/2017 | Chirnomas | G07F 17/10 |
| 2018/0245316 A1* | 8/2018 | Forcash | E02F 3/283 |
| 2018/0327196 A1* | 11/2018 | Sullivan | B65G 59/026 |
| 2018/0370046 A1* | 12/2018 | Hance | B25J 9/162 |
| 2018/0370727 A1* | 12/2018 | Hance | G06Q 10/087 |
| 2019/0016543 A1 | 1/2019 | Turpin | |
| 2019/0152634 A1 | 5/2019 | Almogy | |
| 2019/0361125 A1* | 11/2019 | Sorensen | G01S 17/87 |

OTHER PUBLICATIONS

GitHub.com [online], "YOLO: Real Time Object Detection", Nov. 2019, retrieved on May 13, 2020, 2020, retrieved from URL<https://github.com/pjreddie/darknet/wiki/YOLO:-Real-Time-Object-Detection, 13 pages.

Pal, "16 OpenCV Functions to Start your Computer Vision journey (with Python code)", Analytics Vidhya, Mar. 25, 2019, 40 pages.

PointCloudLibrary.io [online], "Point Cloud Library", retrieven on May 13, 2020, retrieved from URL<https://pointcloudlibrary.github.io/>, 3 pages.

Robotics.org [online], "Voxel Perception Module," Oct. 2017, retrieved on May 13, 2020, retrieved from URL<https://www.robotics.org/product-catalog-detail.cfm/Cloud-9-Perception-LP/Voxel-Perception-Module/productid/4810>, 2 pages.

Universal-Robots.com [online], "Universal Robots UR5," available on or before Feb. 23, 2018, via Internet Archive: Wayback Machine URL <https://web.archive.org/web/20180223235559/https:/www.universal-robots.com/products/ur5-robot/>, retrieved on May 13, 2020, URL<https://www.universal-robots.com/products/ur5-robot/>, 7 pages.

Universal-Robots.com.com [online], "Technical details,",available on or before May 13, 2020, via Internet Archive: Wayback Machine URL<https://web.archive.org/web/20190117030009/https:/www.universal-robots.com/media/1801303/eng_199901_ur5_tech_spec_web_a4.pdf>,retrieved on May 13, 2020, URL<https:/www.universal-robots.com/media/1801303/eng_199901_ur5_tech_spec_web_a4.pdf> 2 pages.

Wikipedia.org[online], "Convolutional Neural Network", retrieved on May 13, 2020, retrieved from URL<https://en.wikipedia.org/wiki/Convolutional_neural_network>, 35 pages.

Wikipedia.org[online], "TensorFlow", retrieved on May 13, 2020, retrieved from URL<https://en.wikipedia.org/wiki/TensorFlow>, 8 pages.

International Search Report and Written Opinion in International Application No. PCT/US2020/058606, dated Jan. 27, 2021, 15 pages.

* cited by examiner

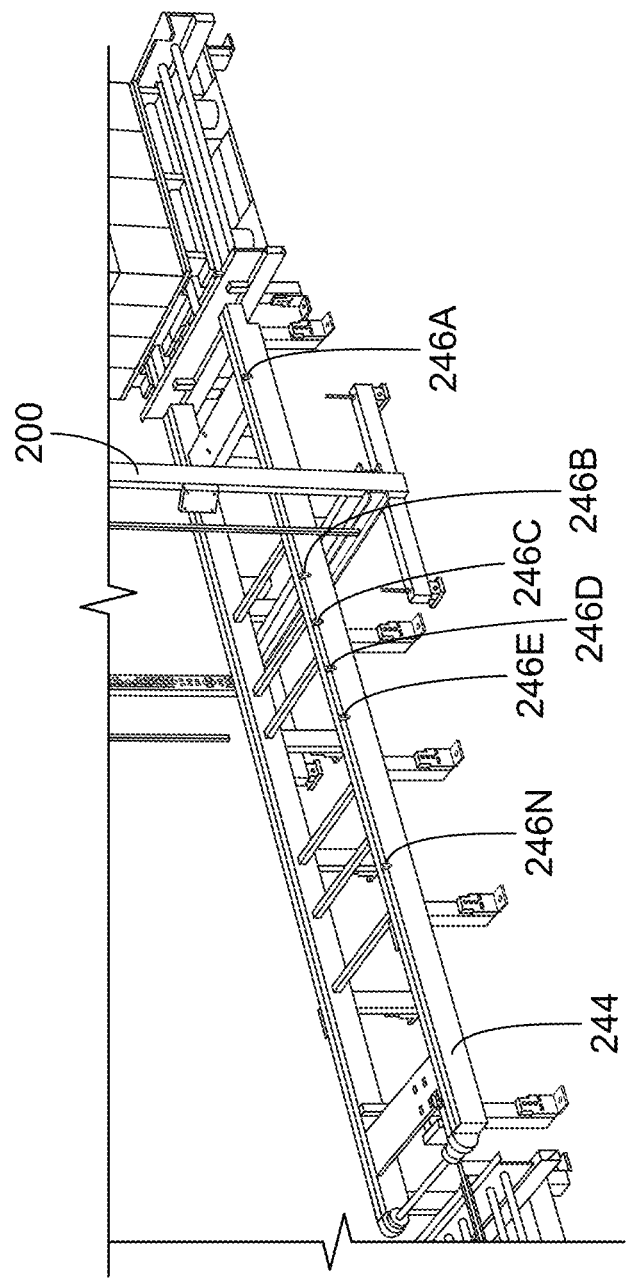

PROFILING PALLETS AND GOODS IN A WAREHOUSE ENVIRONMENT

TECHNICAL FIELD

This document generally describes technology for automatically profiling objects, such as pallets of goods for storage in a warehouse.

BACKGROUND

Warehouses receive, store, and distribute pallets of goods based on information specific to each pallet, such as the dimensions of the pallet (e.g., pallet height), the contents of the pallet (e.g., goods contained on pallet), the quantity of items on the pallet (e.g., number of boxes of particular good stacked on pallet), and other details. Pallet information is typically provided by the supplier with a shipment of pallets arriving at a warehouse. For example, a supplier may provide documentation detailing information for all of the pallets that are contained in a truck arriving at a warehouse.

Upon receiving the documentation, the warehouse can add the pallet and its corresponding information to its warehouse management system (WMS), and use that information to make determinations for handling, storage, and distribution of the pallet. For example, the dimension information for a pallet can be used to select an appropriately sized storage location in a warehouse for a pallet (e.g., rack location). In another example, the type of goods contained on a pallet can be used to select a storage environment in a warehouse (e.g., refrigerated room, non-refrigerated room, frozen room) should be used to store the pallet. In another example, the quantity of goods contained in a pallet can be used to select pallets for distribution from a warehouse, for instance, to satisfy particular requirements for outgoing shipments (e.g., shipment requires a particular number of boxes of a good).

SUMMARY

This document generally describes systems, devices, processes, and program products for automatically profiling pallets in a warehouse environment. Profiling pallets can include, for example, identifying parameters associated with pallets, such as a pallet's dimensions (e.g., height, width, depth), weight, contents (e.g., type of goods included on pallet), quantity of goods (e.g., number of boxes of goods), lean (e.g., whether and to what extent the goods on a pallet are leaning), damage (e.g., whether and to what extent the pallet and/or goods stored on the pallet are damaged), and/or other pallet parameters.

Although pallets are typically received at a warehouse with information identifying corresponding pallet parameters, that information is often inaccurate and unreliable, and can lead to inefficiencies in warehouse operations. For example, the dimensions for an incoming pallet may be inaccurate (e.g., list pallet as being shorter than it actually is), which can cause the warehouse management system to select an incorrectly sized rack location in the warehouse in which to store the pallet. In another example, the content of a pallet, expiration dates for the pallet contents, and/or the number of items included on the pallet may be misidentified (e.g., identify pallet as fresh strawberries when it is processed strawberry preserve, identify an incorrect number of crates of strawberries), which may cause the pallet to be incorrectly stored (e.g., stored in wrong room of a warehouse, such as a refrigerated room instead of a frozen room) and/or for the stored stock of items in the warehouse to be inaccurate (e.g., WMS lists smaller number of crates of strawberries in warehouse than is actually present). Other inaccuracies are also possible, and can create additional sources of error/inaccuracy in warehouse management.

Additionally, pallets may arrive at a warehouse with damage to the pallet frame itself and/or to the goods stored on the pallet. For example, pallet frame may arrive at a warehouse with cracks, which can make the pallet susceptible to breaking while it is being transported around the warehouse and, as a result, can damage the goods being transported on the pallet. In another example, pallets may arrive with damage to the goods stored on the pallets, such as puncture holes, rips, and/or tears in boxes on the pallet. The damage on pallets may be incorrectly attributed to a warehouse storing the pallets, such as a cold storage facility that is storing pallets for subsequent distribution. However, damage may not be readily or thoroughly documented in a traditional warehousing environment, and may subject storage facilities to unfair and unwarranted claims.

The disclosed technology provides a way to remedy these (and/or other) issues through the use of an automated pallet profiling system that is able to accurately and robustly identify parameters for pallets and to identify damage on pallets. Such pallet profiling can correct for and remedy inaccuracies in supplier-provided pallet information, which can resolve and eliminate associated inefficiencies and errors in storing and retrieving pallets in the warehouse. Additionally, such pallet profiling can identify damage in pallets as they are received at a warehouse, and can attribute the damage to the actual source of the damage (e.g., suppliers, shipping provider) instead of to a warehouse receiving and storing the damaged pallet. Such pallet profiling information can be automatically generated using any of a variety of devices, mechanisms, and systems, such as through the analysis of pallet images using any of a variety of machine learning and/or other appropriate techniques to generate accurate results.

For example, the disclosed systems for scanning pallets can include at least one of a stereoscopic, 3D, or 2D camera in addition to a thermal imaging camera, the at least one camera being mounted to a frame to capture pallet information. The frame can be placed around a conveyor belt or other mechanism that moves pallets in and out of a scanning area in the warehouse. The cameras on the frame can be configured to take images of a pallet as the pallet moves through/under the frame. The images can be batched and sent or transmitted to a backend or remote server. The remote server can include one or more modules (e.g., applications) that may be trained based on machine learning and/or geometric-based training models, and configured to process the batch of images and identify particular parameters associated with the pallet. The identified parameters can be stored in a pallet profile associated with the pallet, the pallet profile being stored in a database that communicates with the backend server. The pallet profile can be accessed by a user at a user computing device, and the user can make modifications to one or more of the identified parameters. If, in identifying the parameters, the server determines a low confidence value (e.g., uncertainty in the accuracy of the server's parameter identification) for one or more parameters, the user computing device can be notified, such that the user can manually input correct parameter information to resolve each low confidence value. Based on a comparison of the user input and the server's identified parameter, the server can improve its training model(s) to ensure there are fewer occurrences of low confidence values.

In one implementation, a system for automatically profiling pallets includes a pallet profiling frame defining an opening that is sized and shaped for a pallet to pass through, and a plurality of cameras mounted to the pallet profiling frame, the plurality of cameras being configured to capture images of a pallet as the pallet passes through the opening of the pallet profiling frame. The system further includes a pallet profiling computer system that is configured to receive the images captured by the plurality of cameras and to automatically profile the pallet based, at least in part, on analysis of the images. Automatically profiling the pallet includes generating a point cloud representing the pallet based on the images, determining a size of the pallet based on the point cloud generated from images of the pallet, identifying contents of the pallet based on the images, and providing pallet information identifying, at least, the size and contents of the pallet to a warehouse management system in association with the pallet.

Such a system can optionally include one or more of the following features. The size of the pallet can include a height of the pallet. The pallet information provided to the warehouse management system can include the height of the pallet. The pallet profiling frame can be located at a warehouse and is configured to automatically profile the pallet upon arrival at the warehouse. The warehouse management system can use the pallet information (i) to select an appropriately-sized storage location for the pallet in the warehouse and (ii) to direct storage of the pallet in the selected storage location. The warehouse management system can direct a robot or other type of warehouse vehicle capable of transporting the pallet to store the pallet in the appropriately-sized storage location. The warehouse management system can direct an automated warehouse system to convey the pallet in the appropriately-sized storage location via one or more automated pallet transportation mechanisms contained in the warehouse.

Continuing from the previous paragraph, the system can optionally include one or more of the following additional features. The contents of the pallet can include (i) a type of goods and (ii) a quantity of the type of goods contained in the pallet. The type of goods can be identified based, at least in part, on optical identification of one or more goods identifying markings from the images of the pallet. The quantity of the type of goods can be determined based on (i) the size of the pallet and (ii) a size of containers determined for the type of goods on the pallet. The one or more goods identifying markings can include a barcode identifying a SKU corresponding to the type of goods. The one or more goods identifying markings on the pallet can include text that identifies the type of goods. The containers can include boxes containing the types of goods. Determining the quantity of the type of goods can include identifying (i) a number of boxes contained within a layer of the pallet based on the size of the pallet and the size of the containers and (ii) a number of layers of boxes contained within the pallet based on the size of the pallet and the size of the containers. The contents of the pallet can further include one or more expiration dates of perishable goods contained in the pallet. The pallet profiling frame can be located at a warehouse and is configured to automatically profile the pallet upon arrival at the warehouse. The warehouse management system can use the pallet information to select an appropriate area of the warehouse for storage of the pallet based on the types of goods contained in the pallet and environmental requirements for safe storage of the types of goods.

Continuing from the previous paragraphs, the system can optionally include one or more of the following additional features. Automatically profiling the pallet can further include identifying a lean amount for the pallet based on the point cloud generated from images of the pallet, wherein the lean amount identifies an amount by which goods contained in the pallet lean to one or more sides of the pallet. The information provided to the warehouse management system can include the lean amount for the pallet. Identifying the lean amount can include generating geometric planes that represent sides of the pallet based on the geometric planes providing a at least a threshold fit with points from the point cloud that correspond to the sides of the pallet, and identifying angles by which each of the geometric planes are offset from a vertical orientation, wherein the lean amount corresponds to the angles. Automatically profiling the pallet can further include determining a confidence value for the determined lean amount based on a difference between the angles for opposing sides of the pallet, wherein the confidence value indicates a degree to which the system can rely on the automatic lean determinations for the pallet. The pallet profiling frame can be located at a warehouse and is configured to automatically profile the pallet upon arrival at the warehouse. The warehouse management system can use the lean amount from the pallet information to determine whether to disassemble and reassemble the pallet before storage in the warehouse to avoid potential dangers and damage that may result from at least a threshold level of pallet lean.

Continuing from the previous paragraphs, the system can optionally include one or more of the following additional features. Automatically profiling the pallet can further include identifying damage to the pallet based on one or more of: the point cloud and the images of the pallet. The information provided to the warehouse management system can include the identified damage. The identified damage can include damage to goods contained in the pallet. Identifying the damage can include identifying, from the point cloud, one or more of: voids of at least a threshold size in a side of the pallet and protrusions extending at least a threshold length from a side of the pallet. The identified damage can include damage to a pallet frame on which goods contained in the pallet rest. Identifying the damage can include processing images of the frame using one or more machine learning algorithms and one or more trained models of frame damage to determine whether the pallet frame includes damage and a type of damage. The pallet profiling frame can be located at a warehouse and is configured to automatically profile the pallet upon arrival at the warehouse. The warehouse management system can use the damage from the pallet information to determine whether to disassemble and reassemble the pallet before storage in the warehouse to avoid potential dangers and damage that may result from at least a threshold level of damage.

Continuing from the previous paragraphs, the system can optionally include one or more of the following additional features. The system can further include one or more conveyor belts that are configured to convey the pallet through the opening of the pallet profiling frame, one or more optical gateways that are positioned along the conveyor belts to detect presence of the pallet at particular locations relative to the pallet profiler frame, and a pallet profiling controller that is configured to selectively control the groups of the cameras to capture the images based on the position of the pallet along the conveyor belts as indicated by signals from the optical gateways. The groups of cameras can include (i) a first group of cameras that are arranged along surfaces of the pallet profiling frame that define the opening and that are configured to capture images of the pallet as it passes through the opening, (ii) a second group of cameras that extend from the pallet profiling frame to capture front and back images of the pallet as it enters into and exits through the the opening, and (iii) a third group of cameras that are positioned below a top surface of the conveyor belts at or around the opening of the pallet profiling frame so as to capture images of a pallet frame for the pallet. Light sources can be positioned on opposing sides of the conveyor belts at one or more locations before or after the opening. The second group of cameras can include rotatable cameras that are configured to selectively rotate to capture a first set of images of the pallet before the pallet reaches the opening and, as the pallet passes through the opening, to rotate so as to capture a second set of images of the pallet after the pallet has passed through the opening. The system can further include a weight scale that is positioned along the conveyor belts and that is configured to record a weight of the pallet as it moves down the conveyor belts. The information provided to the warehouse management system can include the weight for the pallet.

Continuing from the previous paragraphs, the system can optionally include one or more of the following additional features. The pallet profiling frame can be positioned at or around a doorway in a warehouse. The images can be captured as a machine carrying and transporting the pallet throughout the warehouse passes through the doorway in the warehouse. The doorway can include a truck bay door in the warehouse. The machine can be a forklift.

Continuing from the previous paragraph, the system can optionally include one or more of the following additional features. The system can further include one or more thermal imaging devices that are configured to capture one or more thermal images of the pallet as it passes through the opening. The information provided to the warehouse management system can include the thermal images of the pallet.

Automatically profiling the pallet can further include determining confidence values for the pallet information based on the images and the point cloud, wherein the confidence values indicate a determined level of accuracy of the pallet information, determining whether one or more of the confidence values are less than a threshold confidence level, providing, in response to determining that one or more of the confidence values are less than the threshold confidence level, the pallet information to a user computing device for review, wherein the user computing device is configured (i) to present the pallet information to a user with, at least, the images of the pallet and (ii) to receive user input verifying or correcting the pallet information with corresponding confidence values below the threshold confidence level, receiving the user input from the user computing device verifying or correcting the pallet information, and providing the verified or corrected pallet information to the warehouse management system.

Continuing from the previous paragraphs, the system can optionally include one or more of the following additional features. The system can further include a tunnel with which the pallet profiling frame is positioned, the tunnel including an entrance and an exit between which the pallet profiling frame is positioned inside the tunnel, the entrance and exit being sized to permit the pallet to pass into and through the tunnel and the opening of the pallet profiling frame; an x-ray scanner device that is positioned inside the tunnel to capture x-ray images of the pallet and its contents, wherein the tunnel is configured to minimize or eliminate interference from radiation in an ambient environment when capturing the x-ray images. The information provided to the warehouse management system can include the x-ray images of the pallet. The system can further include a tunnel with which the pallet profiling frame is positioned, the tunnel including an entrance and an exit between which the pallet profiling frame is positioned inside the tunnel, the entrance and exit being sized to permit the pallet to pass into and through the tunnel and the opening of the pallet profiling frame; a millimeter wave scanner device that is positioned inside the tunnel to capture millimeter wave images of the pallet and its contents, wherein the tunnel is configured to minimize or eliminate interference from radiation in an ambient environment when capturing the millimeter wave images. The information provided to the warehouse management system can include the millimeter wave images of the pallet.

The technology described throughout this document can, in various implementations, provide one or more advantages. For example, the accuracy and details of pallet information that is used by a warehouse can be increased through automated pallet profiling. Instead of relying on supplier pallet information, which may include errors and omissions, pallet information (e.g., overall pallet dimensions) and/or information about its components (e.g., dimensions of individual boxes included in pallets) can be accurately determined for every pallet stored in a warehouse. Such accurate pallet information can provide improved efficiencies that cascade throughout the entire supply chain, such as through providing more accurate size information, identifying existing damage and other dangerous conditions with pallets that may lead to future damage (e.g., identifying pallet lean), and identifying the contents of a pallet. For instance, by having a more accurate identification of a pallet's contents and their quantity, suppliers of pallet goods can more accurately track the inventory that is currently stored in the warehouse which may otherwise be difficult or near impossible with inaccurate pallet information. As a result, suppliers can adjust the production, storage, and distribution of goods from a warehouse, as well as make other adjustments to improve efficiency throughout the supply chain.

In another example, the systems described herein can improve planning of pallet placement in a warehouse or other facility. For instance, a pallet's dimensions, as identified by the server and based on visual information in the batch of images, can be used by a warehouse management system to determine which warehouse rack openings the pallet would fit into. In another example, identifying text and/or a temperature of the pallet can help the warehouse management system determine whether the pallet should be stored in a cold zone in the warehouse.

In another example, the systems described herein can also more accurately inventory pallets within a warehouse, which can provide a variety of benefits. For instance, using the identified parameters (e.g., barcode, text, or other identifying information), warehouse management can track and check whether a supplier is using a contracted amount of space within the warehouse, or is exceeding their contracted amount. Without improved pallet profiling information, such information would not be readily or accurately attainable.

In another example, automated pallet profiling systems described in this document can further mitigate potential liability issues for warehouses, and can help pinpoint sources of damage for suppliers. For instance, the systems described herein can detect damage to a pallet upon arrival at the warehouse, which the system can record and verify with time-stamped images. Additionally, the system can relay that information to suppliers, who can use that information to determine whether carriers or other parts of the supply chain delivering the pallets to the warehouse are the source of the damage. Such notification can also be used, for instance, to absolve the warehouse facility from liability claims brought by its customer(s) or other parties.

In another example, the systems described herein can improve accuracy and efficiency in logging pallets as the pallets enter the warehouse, and can maintain accurate information about each pallet stored in the warehouse. For instance, instead of relying on potentially inaccurate or incomplete pallet information from suppliers, accurate pallet information can be automatically generated and verified. This can improve the speed and accuracy of pallet profiling by alleviating the potential use of human operators to inventory each pallet, which would be time and labor intensive. While human operators may be called upon to identify and/or verify some pallet information that the automated systems are unable to identify with at least a threshold level of confidence, that verification may be performed through communication with a backend system that does not hold up pallet operations, such as placing a pallet in a storage location in a warehouse.

In another example, the disclosed technology can provide reliable records that can be used to verify the state and condition of pallets at various points along the supply chain, and to identify sources of pallet damage. For example, without a pallet profiling system, pallets may arrive at a warehouse with damage that goes unnoticed and unreported by the manual and/or automated systems tasked with storing and retrieving the pallet in the warehouse. As a result, the pallets may be stored with the damage and subsequently distributed from the warehouse with the damage, which may be incorrectly attributed to the warehouse by other parties receiving the pallet further down the supply chain. In contrast, with pallet profiling systems described in this document, pallet damage can be documented and recorded at various points along with supply chain, which can aid in attributing damage to the correct party/entity that caused the damage (e.g., supplier, transit company, etc.) and in determining when the damage occurred. As a result, manual labor associated to resolving these sorts of questions (e.g., who caused damage, when did damage occur) related to pallet damage can be reduced by pallet profile records. Additionally, pallet profiling systems and the generated pallet profiling records can speed up the process of induction of pallets for the system.

The details of one or more embodiments are set forth in the accompanying drawings and the description below. Other features and advantages will be apparent from the description, drawings, and claims.

BRIEF DESCRIPTION OF DRAWINGS

FIGS. 2A-J depict example configurations of a scanning frame.

Like reference symbols in the various drawings indicate like elements.

DETAILED DESCRIPTION

This document generally describes a system and method to automatically profile pallets in a warehouse. Generally, this document describes a system that includes a mechanism, such as a conveyor belt, to move a pallet in and out of a scanning area. The pallet can be moved through an array of stereoscopic, 3D, and/or 2D cameras in the scanning area, and the cameras can capture images of the pallet from various angles. Those images can be used by a computer server in communication with the system to identify one or more parameters associated with the pallet.

Figure 1:
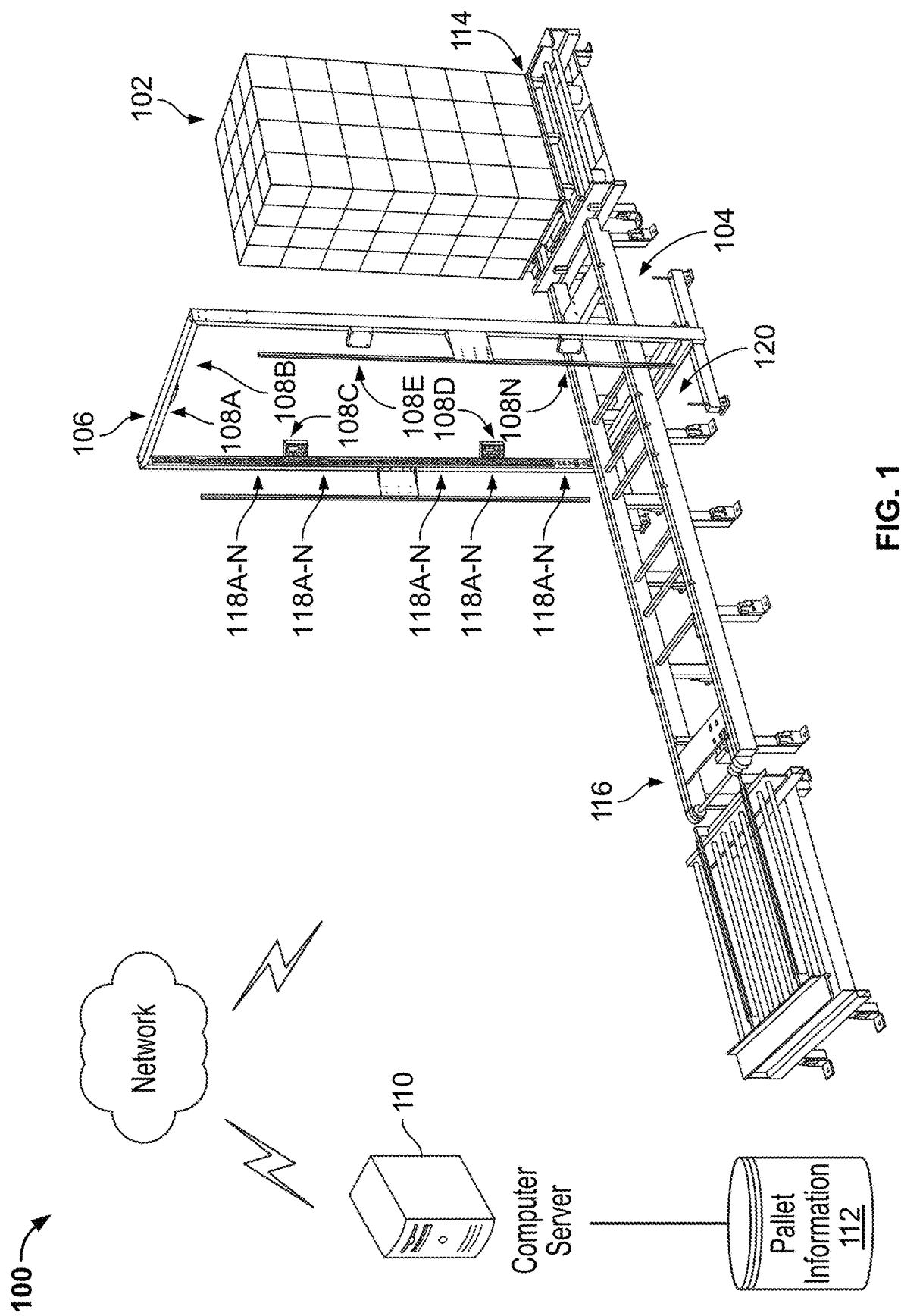
FIG. 1 depicts an example warehouse environment with a system configured to detect one or more parameters associated with a pallet.

FIG. 1 depicts an example warehouse environment 100 with a system configured to detect one or more parameters associated with a pallet 114. Warehouse environment 100, for example, includes a conveyor belt 104 and a scanning frame 106. In some implementations, conveyor belt 104 can be configured to move at a constant speed and/or velocity through and/or beneath the frame 106. The frame 106 in the present example includes at least one stereoscopic camera, and at least one thermal imaging camera 118A-N. The at least one camera 118A-N can be integrated into/attached to the frame 106's structure. The one or more cameras 118A-N can also be statically mounted at fixed locations anywhere along the scanning frame 106. The frame 106 can further include one or more additional cameras (e.g., stereoscopic, 3D, 2D, and/or thermal imaging cameras) that are placed on one or more paddles 108A-N, which are structures that protrude from the frame with housings, enclosures, mounts, and/or other features to which cameras are affixed to obtain images of pallets from one or more alternate vantage points (e.g., vantage points different from those provided by the frame structure itself). The paddles 108A-N can be angled from a side of the frame 106 to provide for different angles/views of capturing images of the pallet 114 moving on the conveyor belt (see discussion below regarding FIG. 2E).

In some implementations, cameras positioned on the paddles 108A-N can further use RGB-D imaging data and convolutional neural networks (CNNs) to identify one or more parameters on the pallets (e.g., barcode, text, pallet board type). One or more of the paddles 108A-N can be angled, positioned below, directly above, or along the sides of the conveyor belt 104 so that cameras positioned on the paddles 108A-N can continuously take pictures of each item 102 (e.g., boxes, food, other goods) on a pallet 114 from multiple perspectives and angles as the pallet 114 moves along on the conveyor belt 104. If any of the cameras 118A-N attached to the frame 106 are configured to identify that the pallet 114 is approaching the frame 106 from a particular distance, then the cameras 118A-N can be configured to adjust their frequency and shutter speed based on detecting a speed, acceleration, and/or velocity of the pallet 114 as it approaches the frame 106. As a result, adjusting shutter speed and frequency of each camera can prevent blurring in the images as the pallet 114 passes in front of, beneath, and through the frame 106. Additionally, the images can each be automatically analyzed to detect blurring, fuzziness, and/or other image artifacts that indicate a possible error in the image capture system, either via the hardware components (e.g., camera malfunction, conveyor belt malfunction) and/or software components (e.g., image processing software error). In response to identifying such an error, a message can be sent out identifying the error along with associated information (e.g., identifying error type, potential source of error, and potential remedy).

In the present example, the pallet 114 passes under the frame 106 and over rollers that create a space 120 over the bottom of the frame 106. The space 120 allows for one or more cameras 118A-N attached to/integrated into the bottom of the frame 106 to capture images of the pallet 114. Once the pallet 114 passes over the space 120, for example, the pallet 114's weight can be measured by a weight scale 116 that is integrated into the conveyor belt 104. In some implementations, the scanning frame 106 can include one or more weight sensors that communicate with a warehouse vehicle (e.g., a forklift) and/or with an automated warehouse to determine a maximum weight that the vehicle and/or automated pallet transporter (e.g., conveyor belt, robot configured to transport pallets, pallet elevator) can carry, and whether the scanned pallet 114 can be carried by the vehicle and/or automated pallet transporter.

After the pallet passes the scanning frame 106, for example, some or all the images that were taken by the cameras 118A-N can be batched together in their raw form with metadata and communicated to a remote (e.g., back-end) computer server 110. Communication between the cameras, computer server 110, and other components in the system can be wireless (e.g., WIFI, BLUETOOTH) and/or via a wireless connection (e.g., fiber optic cabling, Ethernet-based communication using, for example, Ethernet/IP or HTTP network protocols). After receiving the batch of images, for example, the computer server 110 can build 3D models (e.g., point cloud) of the pallet 114 and the item(s) 102 on the pallet 114 based on the images and associated metadata (e.g., detection results, logging information, etc). In some implementations, server 110 can further process the images to counteract any differences in lighting or other ambient features in the warehouse 100 that may impact the camera's ability to take clear, sharp images of the moving pallet 114.

Some of the processing done by the server 110 can include but are not limited to removing blurring (e.g., when the pallet 114 moved at a speed that was faster than the cameras calculated and were adjusted for), fixing lighting (e.g., remove random ambient lighting), and/or making other atmosphere-based changes in each of the images. For example, one or more images may have been over-exposed because the cameras 118A-N had captured the images with a higher aperture setting; in other words the cameras were adjusted to capture images in a more dimly lit setting. However, if the setting (warehouse environment 100) is more brightly lit than the cameras are adjusted for, then the resulting images may be over-exposed. The server 110 can be trained to compensate for overexposed images, delete/remove any white light or over-exposed light, and then replace that light with neutral/correctly-exposed light that was captured in other images in the batch. As a result, the processed image(s) can be easier to read by modules that are configured to identify particular parameters from the visual information in the images. This can increase accuracy in the identification of parameters, thereby increasing a confidence value associated with each identification of a parameter.

The processed batch of images can include one or more images of each side of the pallet 114, for example. In some implementations, the server 110 can create a prioritization hierarchy of the images based on which parameters, at minimum, are to be accurately identified, such that the pallet 114 may be efficiently moved throughout the warehouse. For example, one or more images associated with box segmentation can be marked as the highest priority, one or more images wherein a barcode/label is present can have the second highest priority, and one or more images in which text is present can have the third highest priority. The prioritization of images can change based on which parameters associated with the pallet 114 are used for moving the pallet 114 throughout the warehouse.

In some implementations, using the processed batch of images, the server 110 can create a 3D point cloud structure of the pallet 114. The 3D point cloud can be used by one or more modules comprising the server 110 to identify parameters associated with the pallet 114, for example.

Figure 6:
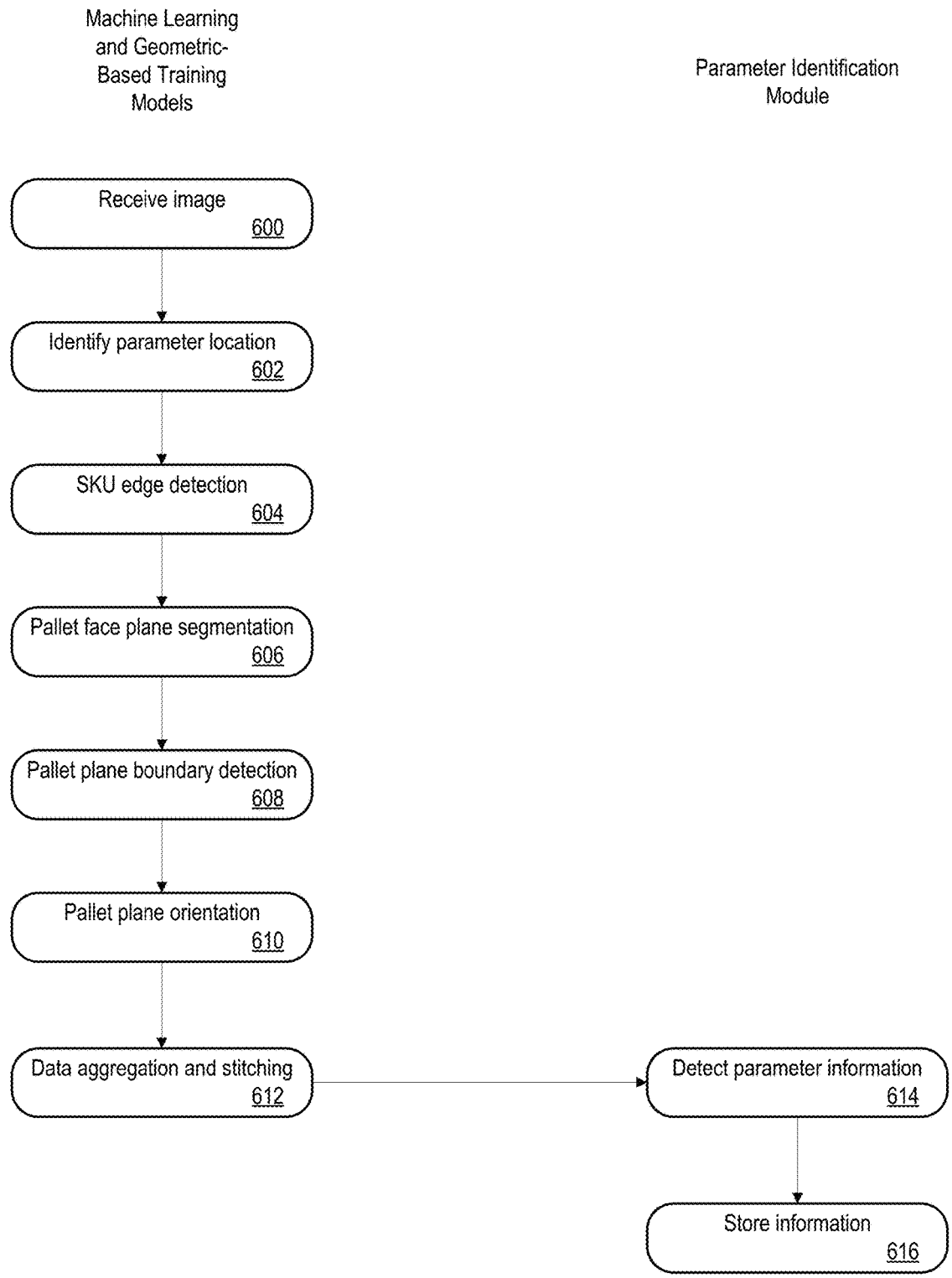
FIG. 6 is a flowchart that shows an example process for training a model and pallet identification modules.
Figure 7:
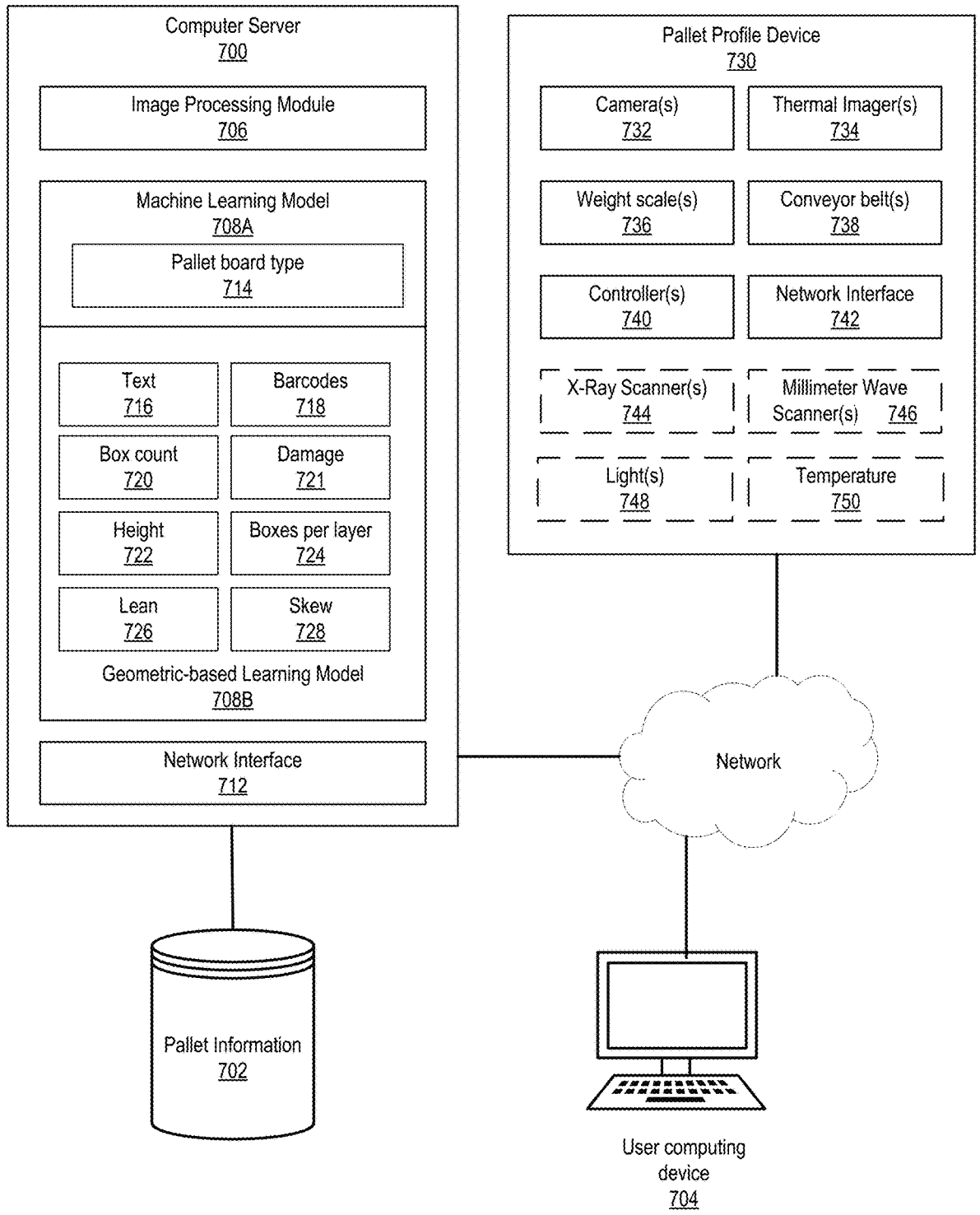
FIG. 7 depicts an example computer system.

After the images in the batch are processed, for example, the server 110 can transmit/communicate the prioritized batch of images as well as the 3D point cloud structure to one or more modules (e.g., applications) executed by the server 110. Those modules can be configured and trained to determine one or more particular parameters for the pallet 114 based on the visual information in the images and/or 3D point cloud, for example. In some implementations, server 110 can include modules for each of the following parameter identifications: barcodes, QR codes, SKUs, text, damage, box count, etc. Refer to FIG. 7 for further discussion about the modules executed by the server 110. In some implementations, each module can be trained to identify a particular parameter and therefore can perform a more granular inspection of the batch of images and/or 3D point cloud. Refer to FIG. 6 for further discussion about training the modules executed by the server 110.

After the modules described throughout this disclosure identify the parameters, for example, the parameters can be stored by the server 110 in a pallet information database 112. Each pallet that is scanned can be represented by a pallet profile that includes the identified parameters, for example. Identified parameters that have a high confidence value, for example, (e.g., the associated module accurately identified the parameter) can be stored in the pallet information database 112 as processed data. Identified parameters that have a low confidence value, for example, (e.g., the associated module is uncertain whether its identification of the parameter is accurate) can be stored as unprocessed data, and the user can later edit/modify/correct such parameters to improve accuracy. Once a particular parameter is corrected by the user's input, for example, the user input can be stored as processed data for that parameter.

Figure 3:
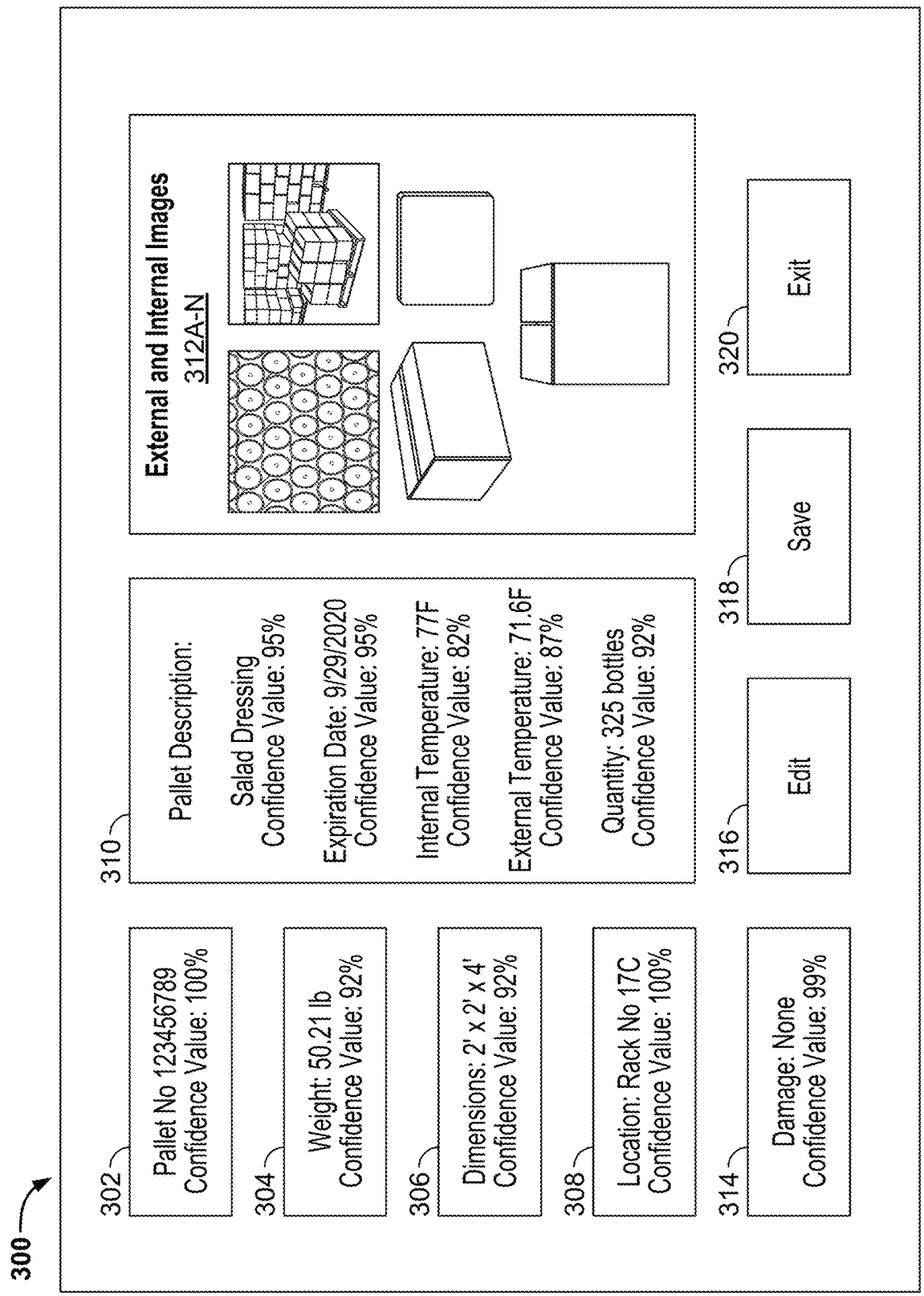
FIG. 3 depicts an example graphical user interface for viewing and modifying one or more parameters associated with a pallet.

In some implementations, the pallet 114's profile can be displayed on the GUI of the user's computing device (example depicted in FIG. 3) for review by the user. Refer to FIG. 3 for discussion of the GUI. The GUI can display processed and/or unprocessed data for review by the user, for example. In some implementations, the GUI can further display a confidence value that is associated with each of the identified parameters. For example, the processed data that is displayed can include high confidence values (e.g., 90% or above) because the associated modules accurately identified the parameters. If a module is unable to recognize text on the pallet 114, for example, and stores a string for the text that consists of random characters, the module can have a low confidence value for recognizing the text (e.g., 80% or less). That confidence value can be outputted alongside the recognized text (e.g., the string of random characters) as a flag or indicator to the user that the user should review the output, manually inspect the pallet 114, and/or make any necessary edits/corrections to the string of random characters. In the present example, if there is an error determined in the identified text and/or if the machine learning algorithm is being trained to generate/improve upon a model to be used for automated text detection (e.g., see discussion below), the user can then input the actual text on the pallet 114 and save that input, thereby replacing the module's random characters determination with the user's input. In contrast, if the text is automatically identified on the pallet 114 with at least a threshold level of confidence, then the text can be automatically entered into the system as pallet information for the pallet 114 without prompting the user for input.

In some cases, the user may want to verify the processed data about the pallet 114 (e.g., parameters that were identified with high confidence values). In other cases, the user may want to manually enter/input parameters that were not identified accurately by one or more modules (e.g., identified parameters with low confidence values or parameters that could not be identified by any of the modules). For example, if a font style on the pallet 114 cannot be read or recognized by a text recognition module, then the user may access the pallet 114's profile from the user's computing device (e.g., smartphone, laptop, tablet) and manually input the text that appears on the pallet 114.

In some implementations, the user computing device can receive a notification from the server 110 indicating that one or more parameters were not determined and/or recognized, or were determined but with low confidence values. This notification can prompt the user to manually inspect the pallet 102 and/or review the one or more images and/or 3D point cloud structure to determine and input the correct parameter information. In some implementations, where the computing device does not receive a notification from the server 110, an input region for a particular parameter that was not determined by the server 110 can be left empty in the pallet profile. Then, when the user accesses the pallet profile via the user's computing device, for example, the user can see the empty input region and proceed to fill it in with the necessary/correct information. Any changes/edits made to the parameters in the pallet profile can be saved and stored by the server 110 in the pallet information database 112, for example. In some implementations, the server 110 can further use user inputs to enhance the training models so that the associated modules can more accurately determine parameters for pallets in the future.

As mentioned, each of the modules executed by the server 110 can determine a confidence value for each identified parameter, where the value can be a percent from 0% (no confidence that the determined parameter is accurate) to 100% (highest confidence that the determined parameter is accurate). Refer to FIGS. 11-17 for discussion of how confidence values are determined for one or more particular parameters. The determined confidence values can be used by the server 110 to gauge the relative quality of the detection results, such that any potential fail cases and/or ambiguity (e.g., presence of conflicting labels and/or visually occluded/blocked markings like barcodes or text) can be identified, flagged for manual inspection by a human user/operator in the warehouse, and/or used to improve the training models and performance of the associated modules.

In some implementations, the server 110 can communicate with the warehouse management system to receive identification information associated with a scanned pallet and to refine a list of parameters that are to be identified at the server 110. For example, the warehouse management system can access a database that stores a customer name, order number, and timestamp (e.g., in Julian time) for any pallet that comes into the warehouse. This information can be collected and stored when a truck carrying the pallet intentionally bumps a dock area, for example. That information can then be linked with a door that the truck uses for unloading goods, and can be communicated to the server 110 so that the server 110 can determine which parameters are key parameters for detection. For example, the server 110 may prioritize information that indicates whether a pallet contains frozen foods, and at what time the pallet was unloaded from the truck. Based on this information, for example, the server 110 can determine that the key parameters to detect may include text, which can indicate at what temperature and/or date the food will spoil and what temperature the pallet should be stored at, and temperature readings (e.g., external temperature readings obtained through, for example, a thermal image of the pallet, internal temperature readings inferred from external temperature determinations, internal temperature readings from the use of temperature probes). Focusing on detecting key parameters, for example, can increase efficiency in scanning the pallet and can enhance decisions made regarding storage and placement of the pallet in the warehouse environment.

In some implementations, the server 110 can communicate with an inventory management system to compare one or more parameters that are already known by the inventory management system (e.g., based on past determinations of parameters) and one or more parameters detected by one or more modules executed by the server 110. As a result, the one or more modules can more accurately determine each of the parameters that are identified and have higher confidence values for each of the identified parameters, for example.

Figure 2A:
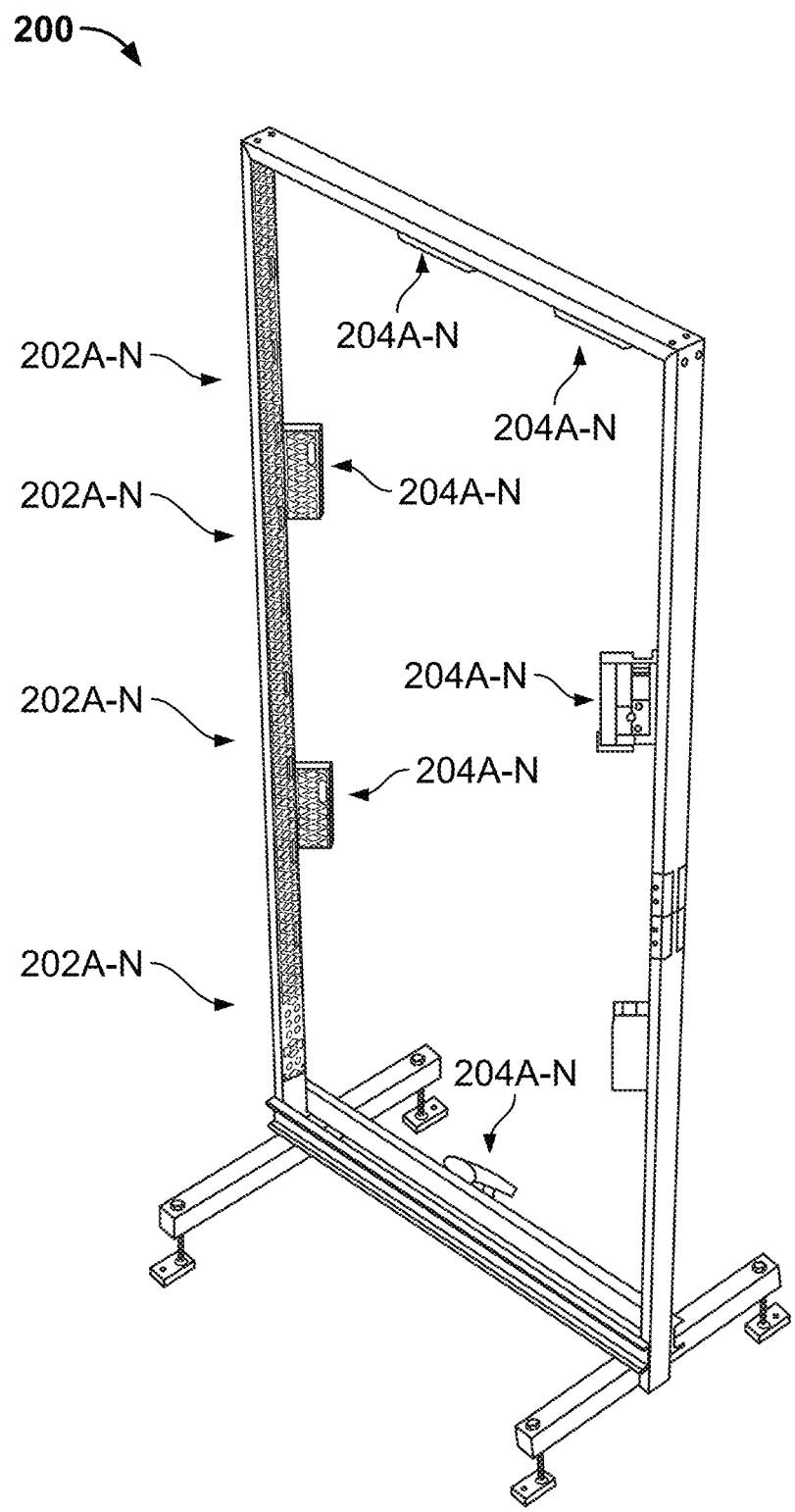

FIGS. 2A-G depict example configurations of a scanning frame. FIG. 2A depicts a view of the scanning frame 200 from an angle. In the present example, or more cameras 202A-N (e.g., stereoscopic, 3D, 2D) are integrated into one or more sides of the scanning frame 200 (e.g., a top, bottom, left, and right sides). One or more cameras 202A-N can also be attached to one or more paddles 204A-N. The paddles 204A-N, for example can be attached to any part of the scanning frame 200. In the present example, the paddles 204A-N can be used to capture one or more images of a pallet from different angles. Thus, the paddles 204A-N can be angled out/away from the scanning frame 200. In general, the more cameras configured to the frame, the more angles and/or sides of the pallet that can be catalogued/imaged. In addition, one or more cameras can be configured to a top and bottom of the frame in order to enhance the ability of computer server 110 (shown in FIG. 1) to piece together all the images of the pallet and build a more accurate 3D point cloud structure of the pallet. The 3D point cloud structure can then be used by one or more of the modules executed by the computer server, for example, in order to more accurately identify, with high confidence values, one or more parameters associated with the pallet.

In some implementations, one or more thermal cameras can be positioned at the bottom of the frame and oriented in an upward direction. The thermal camera can be configured to capture images of a bottom of the pallet (e.g., the pallet boards) so that one or more modules executed by the computer server can determine structural integrity of the pallet and whether the pallet is safe to travel throughout the warehouse. For example, the computer server 110 can use the images of the bottom of the pallet to determine whether the pallet is damaged, whether there is deflection, bowing, cracks in the pallet boards, etc. The one or more thermal cameras can also be configured to determine internal and/or external temperature readings of the pallet.

Figure 2B:
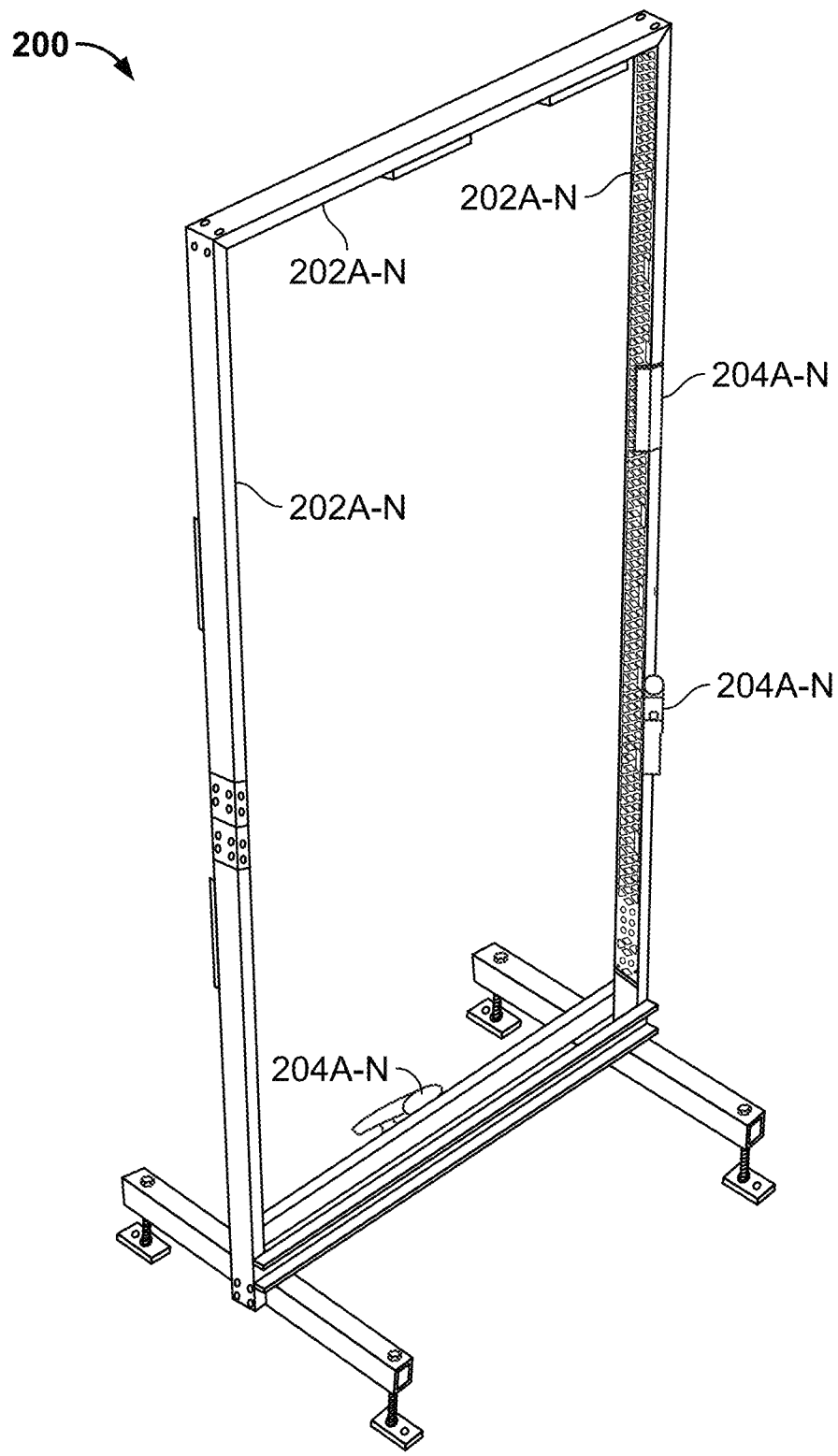

FIG. 2B depicts a view of the scanning frame 200 from another angle.

Figure 2C:
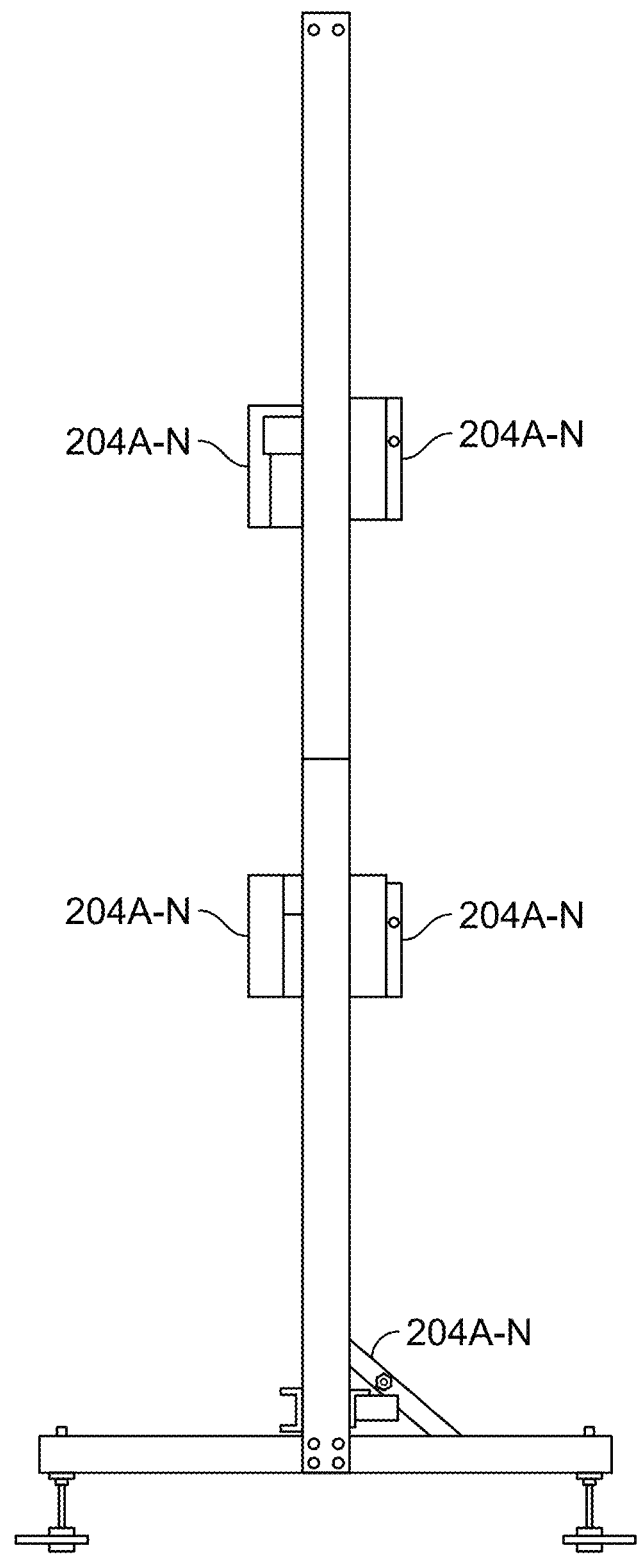

FIG. 2C depicts a view of the scanning frame 200 from a side. In the present example, paddles 204A-N are angled inward and outwards so that the cameras attached to the paddles 204A-N can capture front and back views of the pallet as it passes through/under the scanning frame 200.

Figure 2D:
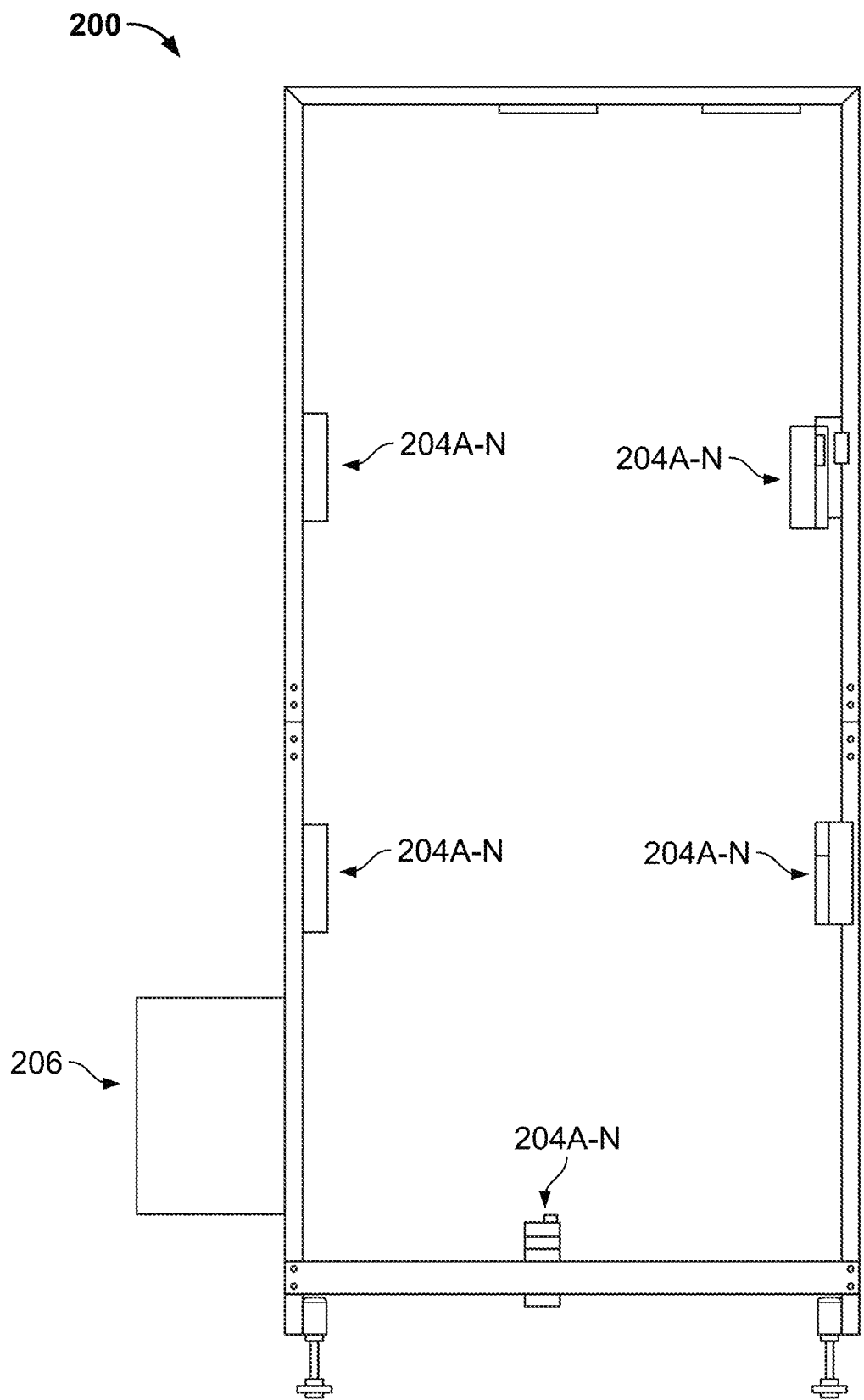

FIG. 2D depicts a view of the scanning frame 200 from the front. In the present example, scanning frame 200 includes a pallet profile device 206. The pallet profile device 206, for example, can be a controller that is configured to control/modify one or more settings of the cameras 202A-N and the paddles 204A-N on the scanning frame 200. The pallet profile device 206 can also be configured to temporarily store images taken by the cameras 202A-N until the pallet is done being scanned. After the scanning is completed, for example, the pallet profile device 206 can batch the images with their metadata (e.g., camera settings, time stamp) and transmit the batch to the computer server 110 for processing, as described throughout this disclosure.

Figure 2E:
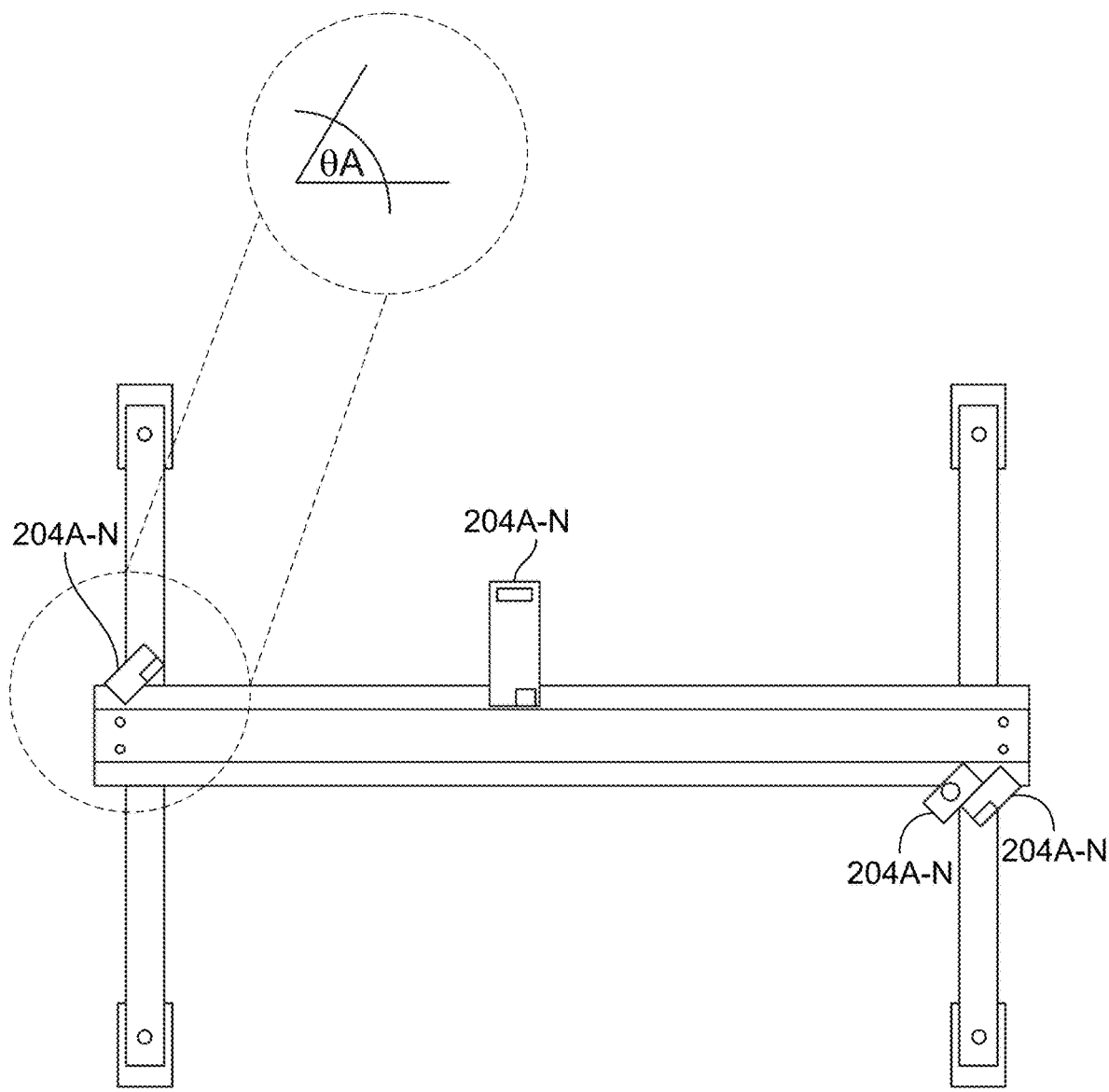

FIG. 2E depicts a view of the scanning frame 200 from the top. In the present example, or more paddles 204A-N are angled out from the scanning frame 200 in order to capture different angles and perspectives of the pallet as it moves through/under the frame. For example, each of the paddles 204A-N are positioned at an angle of ΘA from the scanning frame 200. The angle ΘA of the paddles 204A-N can be any of a variety angles to provide a sufficiently varied vantage point for cameras mounted to the paddles 204A-N relative to the cameras 202A-N on the frame 200, such as 5 degrees, 10 degrees, 15 degrees, 25 degrees, 30 degrees, 45 degrees, 60 degrees, 75 degrees, 80 degrees, and/or other appropriate degrees providing variation from the vantage point of the cameras 202A-N without obstructing/blocking the path of pallets passing through the frame. The paddles 204A-N and their associated angle(s) can be fixed and/or adjustable, and the paddles 204A-N may have the same or different angles from to each other. The computer server 110 and/or the pallet profile device 206 can use the angle ΘA of the paddles 204A-N to interpret and use the images captured by the cameras on the paddles 204A-N to determine information for pallets being profiled.

Figure 2F:
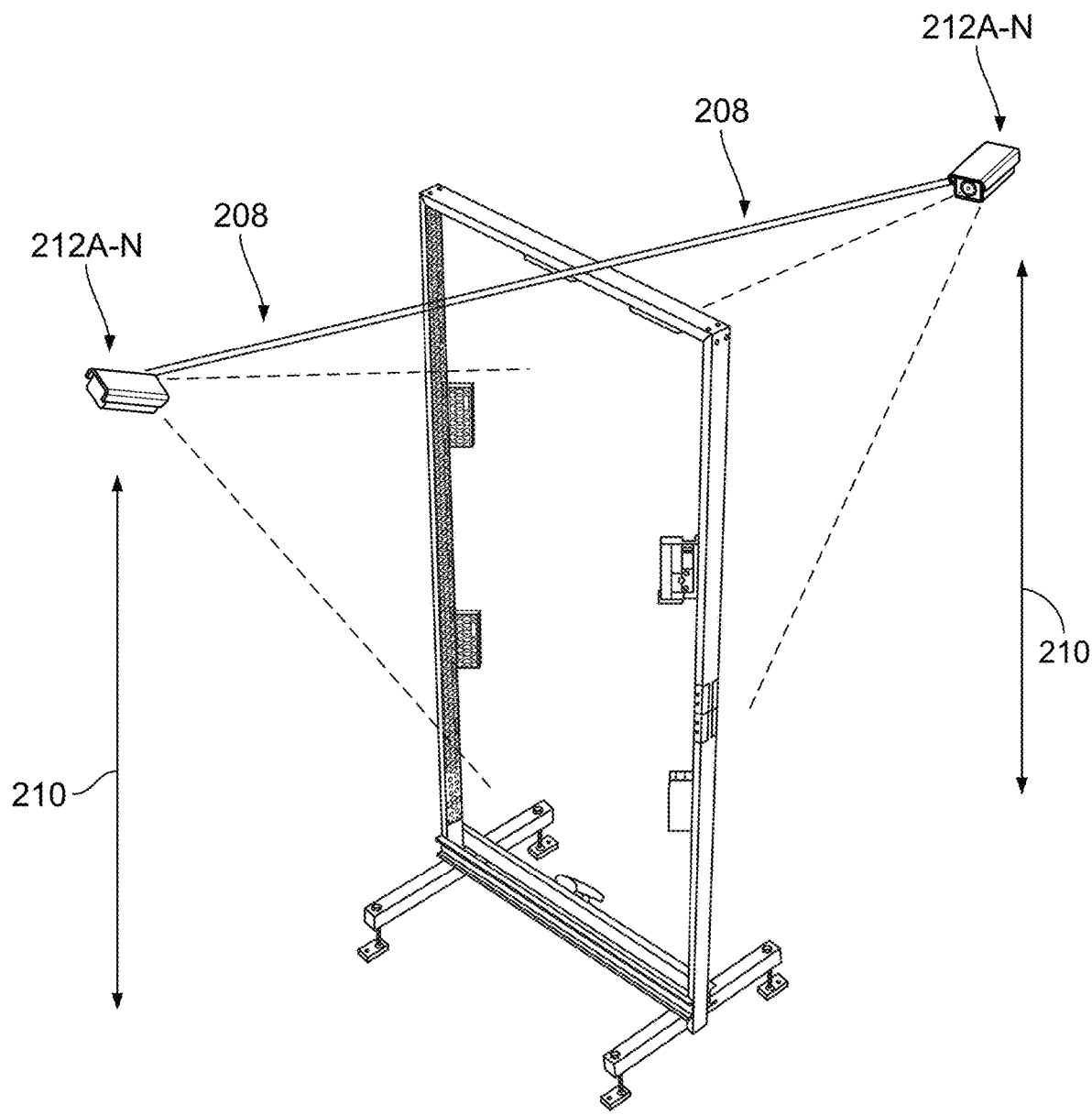

FIG. 2F depicts an example configuration of the scanning frame 200. In some implementations (e.g., see FIG. 2A), the scanning frame can be configured with multiple cameras to capture more details and more images of a pallet that is in closer proximity to the frame. In some implementations (e.g., see FIG. 2F), the scanning frame can be configured with fewer cameras to capture details of a pallet that is farther away from the frame. In general, the more cameras that are used, the smaller the field of view, such that accurate images of the pallet may be captured when the pallet is closer to the frame. In general, the fewer the number of cameras used, the larger the field of view, such that accurate images of the pallet may be captured when the pallet is farther from the frame. In FIG. 2F, for example, an arm 208 extends out from the top of the scanning frame 200 and includes at least one camera 212A-N on each end of the arm 208. In this configuration, the at least one camera 212A-N on each end of the arm 208 can capture one or more images of the pallet from a front and back perspective. Furthermore, when the cameras 212A-N are placed at an equidistant distance 210 from the ground/floor, for example, the cameras 212A-N can have a wider field of view, and therefore may be able to capture images of the pallet when the pallet is farther away from the scanning frame 200.

In some implementations, the arm 208 may extend in only one direction (e.g., out towards the front of the scanning frame) and/or may have only one camera attached to the end of the arm 208. In some implementations, the scanning frame 200 may have one or more cameras 212A-N attached to the arm 208 and no cameras 202A-N integrated into/attached to the frame or paddles on the frame. In some implementations, the cameras 212A-N attached to the arm 208 may be set at different angles from each other and/or different distances from the ground/floor in order to capture images of the pallet from varying perspectives.

Figure 2G:
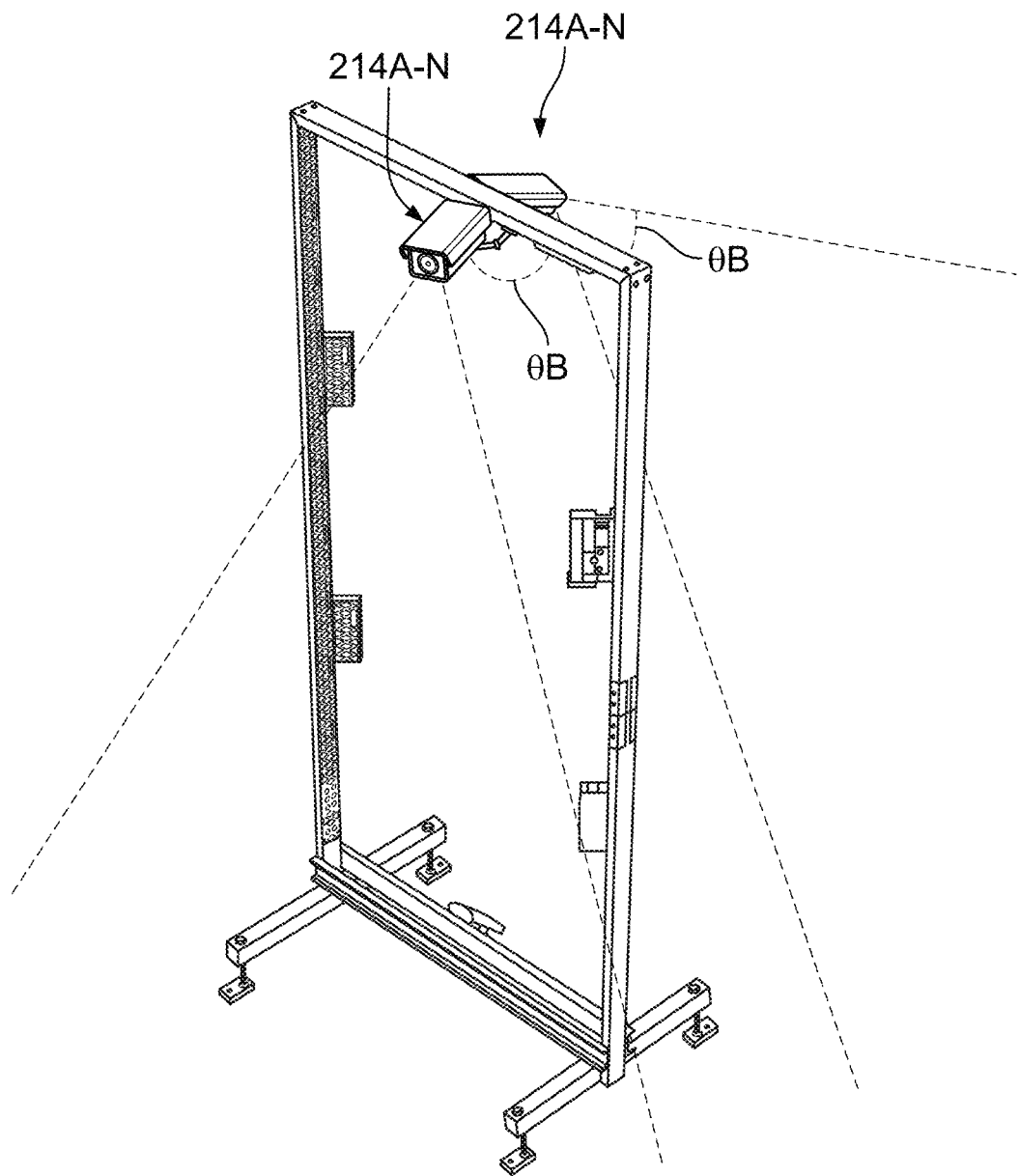

FIG. 2G depicts another example configuration of the scanning frame 200. In the present example, one or more high resolution cameras 214A-N can be angled and attached to/from the front and back of the scanning frame 200. The cameras 214A-N can be angled at an angle of ΘB, as determined by the computer server 110 and/or the pallet profile device 206. The cameras 214A-N can be configured similarly to the cameras 212A-N in FIG. 2F, for example.

In general, the frame's configuration and number of cameras can be based on the needs, layout, and/or client expectations/requirements of the warehouse. For example, a warehouse may choose to install a scanning frame in a dock area to scan pallets as the pallets come off a truck and are placed on a conveyor belt. As a result, the warehouse may configure a single frame with many cameras to capture images of the pallet as the pallet moves in close proximity to the frame. On the other hand, another warehouse may choose to install scanning frames throughout the warehouse to identify pallets as they are being moved around the facility. As a result, the warehouse may configure each scanning frame with one or very few cameras that can capture images of a pallet that is farther away from the fame and moving at any speed/velocity.

Figure 2H:
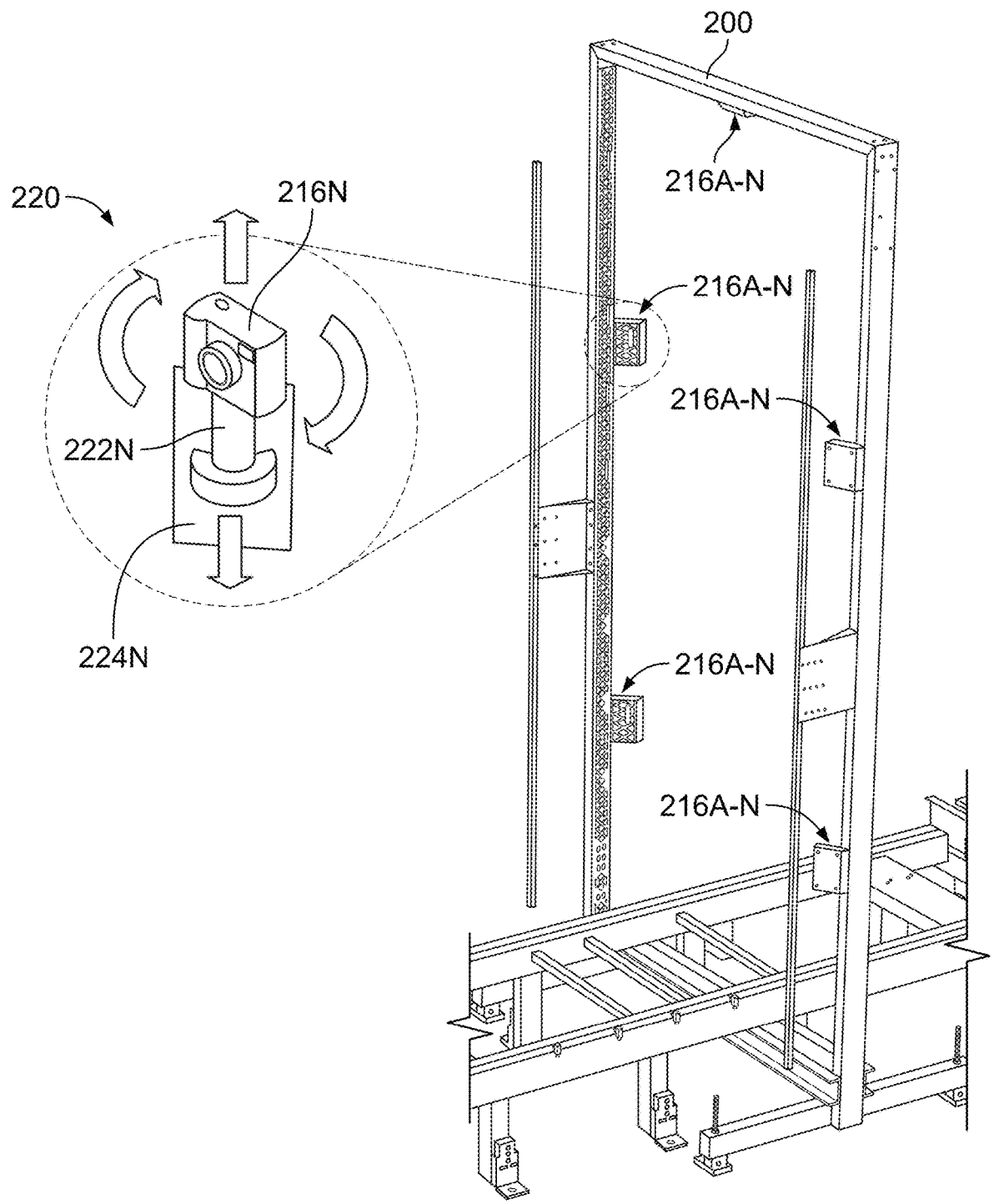

FIG. 2H depicts another example configuration of the scanning frame 200. In the present example, one or more high resolution cameras 216A-N can be spatially adjusted using a motion control system. As shown in detail section 220, for example, the camera 216N can be connected to an actuator 222N (e.g., including one or more servos, electric motors, hydraulic devices, etc.), the actuator 222N being connected to the scanning frame 200 (e.g., via a paddle 224N that may be attached to the frame). The actuator 222N, for example, can receive control signals from the computer server 110, and can move the camera 216N in response to the control signals. Possible camera motions that can be performed by the actuator 222N, for example, can include panning (e.g., rotation in a horizontal plane), titling (e.g., rotation in a vertical plane), and/or various dolly motions (e.g., camera motion along a pole or track). The various camera motions, for example, can be used to capture images of a pallet and/or goods from various angles and perspectives, thus facilitating the generation of improved 3D models (e.g., point clouds). Further, by moving one or more cameras as a pallet passes through the scanning frame 200, for example, a same camera (or a same group of cameras) can be used to capture images of the front, sides, and/or rear of the pallet, rather than using different cameras (or different groups of cameras) to capture images of the front, sides, and/or rear.

Figure 2I:
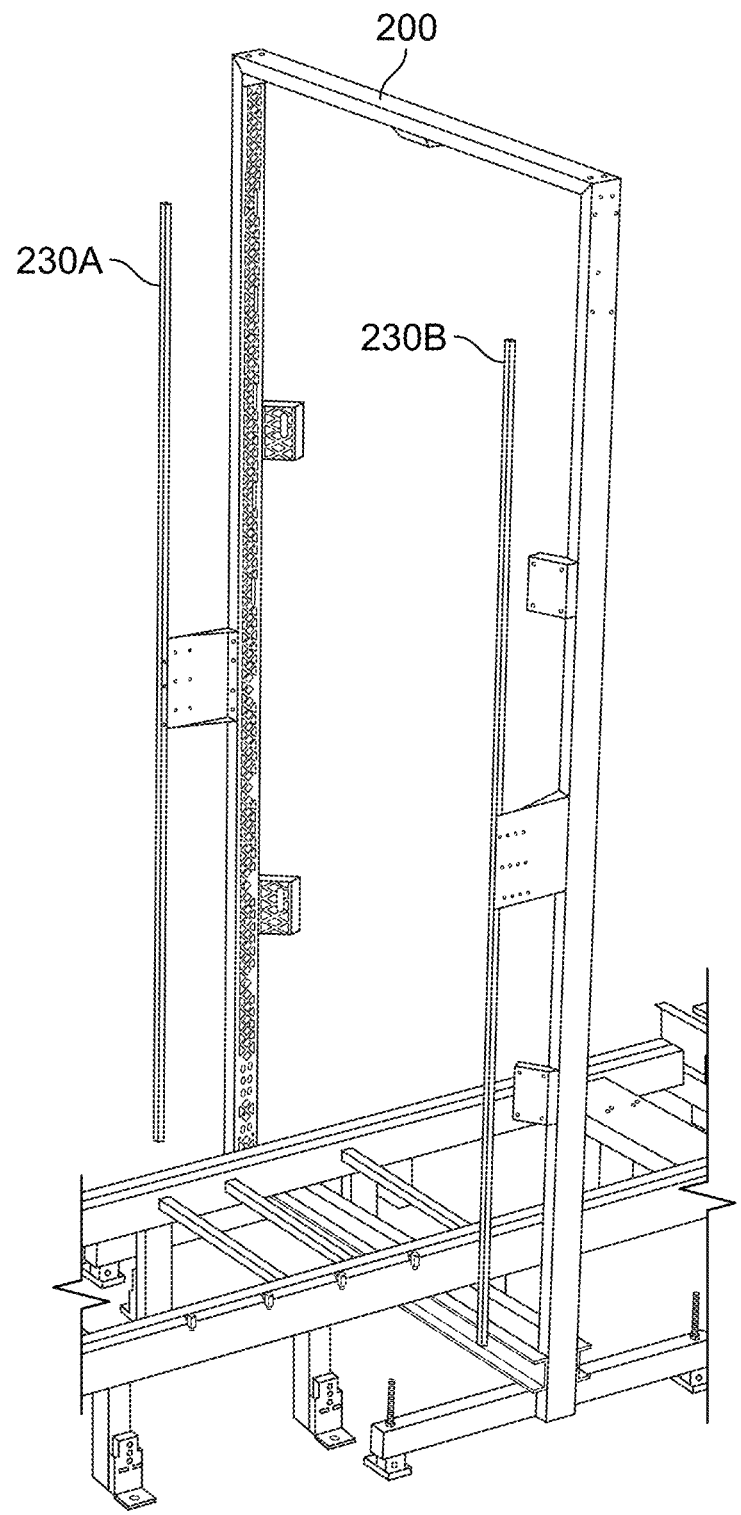

FIG. 2I depicts an example configuration of the scanning frame 200 including one or more light sources. In the present example, light sources 230A and 230B (e.g., light bars) are attached to the scanning frame 200, and extend parallel to the height of the frame along each side. As another example, one or more light sources may be positioned at the top and/or bottom of the frame, instead of or in addition to light sources positioned along the sides. As another example, one or more light sources may be disconnected from the frame, instead of or in addition to light sources that are connected to the frame. The light sources 230A and 230B, for example, can be LED light bars, however other suitable light sources may also be used. In general, light sources directed toward the scanning frame may provide consistent lighting such that surfaces of pallets and/or goods are consistently illuminated, thus facilitating the capture of better quality images and the generation of improved models.

FIG. 2J depicts an example configuration of the scanning frame 200 including one or more trigger sensors positioned along conveyor belt 244. In the present example, trigger sensors 246A-N(e.g., light gates, motion detectors, etc.) are shown along conveyor belt 244, however any suitable number of trigger sensors may be used. Each of the trigger sensors 246A-N in the present example can include a light emitter on one side of the belt 244, and a corresponding light detector on the other side of the belt. In general, the trigger sensors 246A-N can provide information related to the position of a pallet with respect to the scanning frame 200 at a given time. As a pallet moves along the conveyor belt 244, for example, each of the trigger sensors 246A-N can detect the passage of the pallet, and can in turn provide a corresponding notification to the computer server 110 that the sensor has been triggered. In response to receiving a trigger sensor notification, for example, the computer server 110 can cause one or more actions to be performed that are appropriate for the pallet at the location indicated by the corresponding trigger sensor. Actions to be performed can include capturing images with various cameras, positioning cameras, rotating cameras, turning on lights, turning off lights, activating one or more millimeter wave scanners, activating one or more x-ray scanners, taking temperature measurements, taking weight measurements, and/or other suitable actions. Each different trigger sensor, for example, can be used to trigger a different action or group of actions. By using the trigger sensors 246A-N to identify the location of the pallet at a particular time, for example, the location can be identified without determining the velocity of the pallet on the conveyor belt 244.

FIG. 3 depicts an example graphical user interface for viewing and modifying one or more parameters associated with a pallet. As previously discussed, one or more modules executed by the computer server 110 (shown in FIG. 1) can determine one or more parameters associated with a pallet. The computer server 110, for example, can then store parameters with high confidence values as processed data, and parameters with low confidence values as unprocessed data in a pallet profile. The processed and/or unprocessed data (e.g., all identified parameters) can be displayed in the graphical user interface ("GUI") 300, for example, on a user computing device (e.g., tablet, smartphone, computer, etc.). A user in the warehouse can access the GUI 300 and make any corrections/modifications and/or additions to the processed and/or unprocessed data. For example, if a parameter is stored as unprocessed data, it may have a low confidence values and therefore be flagged on the GUI 300 for the user to review. If the user modifies the parameter and saves his/her input, the computer server 110 can replace the stored unprocessed data with the user input, which would be classified as processed data.

In some implementations, the GUI 300 can display the parameters that are identified by the computer server 110 and that have some associated confidence value. Some of those parameters can include, but are not limited to, a pallet identification number 302, weight 304, dimensions 306 of the pallet, dimensions of one or more boxes on the pallet (not depicted), location 308 of the pallet in the warehouse, damage 314 to the pallet and/or boxes, a pallet description 310, and a batch of images 312A-N that were taken by one or more cameras attached to a scanning frame, millimeter wave scanner information, or x-ray scanner information, as previously described. The pallet description 310 can display information that is read by a module performing optical character recognition or other text identification techniques. Each textual determination can have an associated confidence value. The user can add additional information to the pallet description 310, for example, including information that does not appear anywhere on the pallet. For example, the user can input a phone number for the supplier or a reminder note that the supplier is to be contacted about damage to the pallet.

In general, the parameters described throughout this disclosure can be displayed in the GUI 300. To edit the displayed parameters, for example, the user can select an EDIT button 316. Once the user makes changes/additions to the parameters, the user can select a SAVE button 318, for example, which prompts the computer server 110 to store the user input in the pallet's associated profile as processed data. Once the user inputs changes/additions to the parameters, for example, the computer server 110 can modify each parameter's associated confidence value. For example, if a parameter has a low confidence value and the user inputs correct information for the parameter, then the computer server 110 can modify the low confidence value to reflect a higher confidence value of 90% or above.

Although the user cannot edit the images 312A-N in the present example, the user can view a timestamp (e.g., date and time information) at which each image was captured. The images 312A-N can also include viewable metadata, such as which camera took the image, a shutter speed, frequency, speed of the pallet on the conveyor belt, and/or other imaging information. The user can also view one or more images 312A-N that were taken when the pallet first arrived at the warehouse, and one or more images 312A-N that were taken at a later time when the pallet was being transported around the warehouse, and/or that were taken when the pallet was stored at a location within the warehouse. The user can compare the images 312A-N, for example, to determine whether or not the pallet received any damage while the pallet was in the warehouse, and when the pallet was damaged. If the user detects any changes in damage based on the images 312A-N, for example, the user can update the damage 314 field with a brief description of the damage, including a timestamp, name of the image that depicts the damage, or any other association to the damage-identifying image(s). Although not depicted, the GUI 300 can display one or more other parameters discussed throughout this disclosure.

As previously discussed, if a module has a low confidence value associated with determination of a parameter, for example, that parameter can be flagged on the GUI 300 for further inspection/modification by the user. In the example of FIG. 3, the internal and external temperatures in the pallet description 310 have low confidence values (e.g., below 90%). Those parameters can be flagged/marked in a variety of ways (not depicted) such as highlighting the confidence value or any other visual indicator. The server 110 can also send a notification to the user's computing device, for example, prompting the user to review the parameter that has a low confidence value. The user can manually inspect the pallet to try and determine an accurate value for the parameter with the low confidence value. The user can also view one or more images flagged by the server to determine a correct value for the parameter. For example, the user can be notified that one or more images of an SKU on a pallet are blurry. The user can manually inspect the pallet to read the SKU and/or the user can look through the one or more blurry images to determine the appropriate value. The user can also access a warehouse management system and/or inventory management system to cross-reference similar pallets to identify the appropriate SKU. The user can then input his/her determined SKU value into the GUI 300 which can be saved by the computer server 110 to the associated pallet profile.

In some implementations, the user's inputted value can be stored as processed data and used to train the module that scans and determines SKUs. For example, if the SKU scanning module incorrectly read a '3' as an '8' and the user corrects the module's reading by inputting a '3' into the GUI 300, then the SKU scanning module can be trained to recognize similar images of '3' to be a '3' rather than an '8.' Thus, user input can help the computer server train one or more modules to adapt to various discrepancies and/or difficulties in identifying parameters from visual information in the batch of images.

Figure 4A:
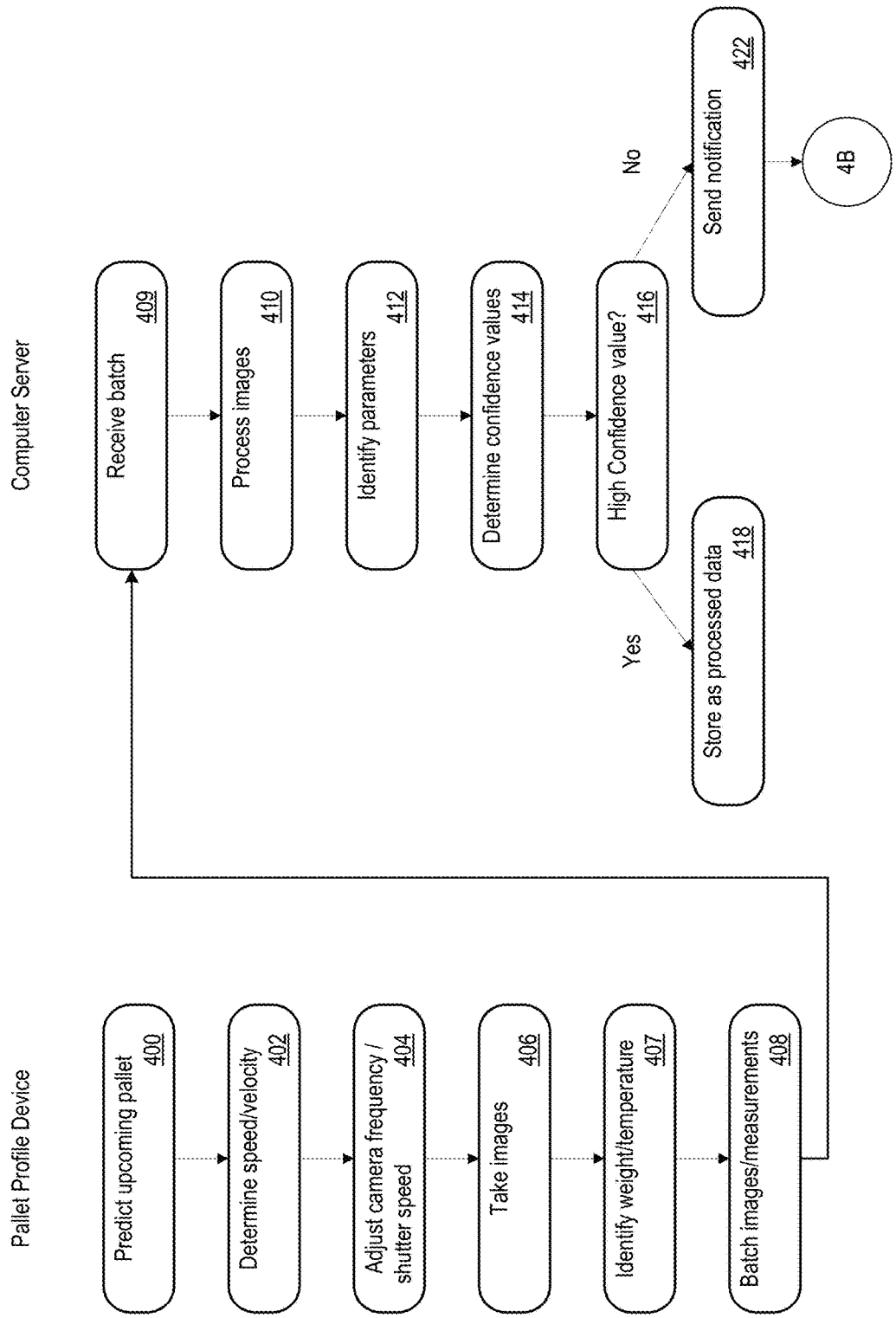
FIG. 4A is a flowchart that shows an example scanning process for an approaching pallet.

FIG. 4A is a flowchart that shows an example scanning process for an approaching pallet. The system described herein comprises a pallet profile device, a computer server, and a user computing device (see FIGS. 4A-B). At the pallet profile device, at least one camera (e.g., stereoscopic, 3D, 2D, thermal, or other type of scanner) integrated into/attached to a scanning frame can be configured to detect a pallet as it approaches the frame on a conveyor belt (step 400). As previously discussed, at least one camera on the frame can have a larger field of view to detect the pallet when it is some distance away from the scanning frame.

In some implementations, the camera can be configured to view a portion of the conveyor belt that is a predetermined distance in front of the frame. Once the camera detects a pallet approaching from that predetermined distance in front of the frame, for example, the pallet profile device can determine a speed and/or velocity of the pallet on the conveyor belt (e.g., using sensors in the conveyor belt and/or other information associated with the conveyor belt speed and/or velocity) (step 402). The pallet profile device can then modify/adjust one or more settings of each of the cameras in step 404 (e.g., camera frequency, shutter speed) based on the speed and velocity determinations of the approaching pallet. Consequently, the cameras can be appropriately configured to capture clear, non-blurry images of the pallet as it moves through/under the frame.

As the pallet approaches and goes through/under the frame, each of the cameras configured to the scanning frame can capture a multitude of images of the pallet in step 406. Images can be taken of the pallet from the front, sides, top, bottom, and/or back of the pallet as it approaches, passes through, and/or exits from the frame. Images and/or other pallet measurements can be capture during the progression of the pallet through the frame, including some being captured while the pallet is moving (e.g., moving at consistent speed, moving at varied speeds corresponding to position of pallet relative to frame and/or cameras) and/or while the pallet is stopped at one or more points along its pathway (e.g., pallet stopped when positioned above weight scale). Weight and/or temperature measurements can also be taken by one or more sensors and/or thermal imagers integrated into/attached to the frame and/or on the conveyor belt (step 407). The pallet profile device can then batch some or all of the images, metadata associated with the images, and weight/temperature measurements in step 408 and transmit the batch wirelessly to the computer server.

In step 409, the computer server receives the batch of images and/or measurements. In step 410, the server can process the batch of images. Processing the images can be accomplished by one or more trained modules (e.g., applications) that are executed by the server. For example, an image processing module can be trained to process the images, remove random ambient lighting, and/or reduce blurriness in the images. In general, image processing may be completed before the batch of images are sent to each of the other trained modules executed by the computer server. The batch of images can also be used by a module to construct a 3D point cloud structure of the pallet (e.g., using various point cloud generation techniques). Once the image processing module completes image processing techniques and the 3D point cloud is generated, for example, the batch of processed images and 3D point cloud can both be sent to the modules that are trained to detect particular parameters from the visual information in the images (step 412).

For example, a barcode scanning module can be trained to detect and scan a particular location in each of the images where a barcode is located. A text recognition module can be trained to detect text/characters in a particular location in each of the images using various optical character recognition techniques. A damage detecting module can further be trained to detect signs of damage in each of the images, and based on a 3D point cloud structure of the pallet. Some modules can be trained using machine learning models to detect parameters that appear in a particular area of an image. This can increase efficiency and accuracy, since the trained modules may identify parameters without inspecting an entire image. Rather, the module may be trained to perform a granular inspection of a particular region in an image that was identified in the training for that module. In some implementations, modules can be trained using geometric-based learning models to detect parameter information based on the 3D point cloud of the pallet. In some implementations, modules can be trained using both the machine learning and geometric-based learning models to more accurately determine particular parameters.

In step 412, one or more modules can identify and/or detect parameters that include but are not limited to barcodes, damage to one or more boxes and/or the pallet, dimensions of the pallet as well as the boxes/items on the pallet, number of boxes on the pallet, SKUs, text, external and/or internal temperature, weight of the pallet, etc. When identifying particular parameters, for example, each of the modules can assign a confidence value to its determination(s) (step 414). As discussed throughout this disclosure, a high confidence value (e.g., 50% or above, 66% or above, 75% or above, 80% or above, 90% or above, 95% or above, and/or other threshold confidence levels that may be determined and/or selected), for example, means that the module is most certain that it accurately detected and identified the parameter. A lower confidence value (e.g., 90% or less, 80% or less, 75% or less, 66% or less, 50% or less, and/or other threshold confidence levels that may be determined and/or selected), for example, means that the module is less certain about the accuracy of its detection and identification of the parameter. For example, if the ink on a barcode is faded or missing on the pallet, the barcode scanning module may not be able to get an accurate reading of the barcode. As a result, the module may store a value that is inaccurate or may store no value at all. Regardless, the module will have a low confidence values for its reading/determination of the barcode, as is further discussed in FIG. 11.

The computer server can then determine whether a particular parameter has a high confidence value in step 416. If the parameter determination had a high confidence value, for example, then the images were read accurately and the associated module accurately determined a value for the parameter. As a result, the computer server can store the determined parameter with a high confidence value as processed data in step 418. The processed data can be stored in a pallet profile within a pallet information database, for example.

Figure 4B:
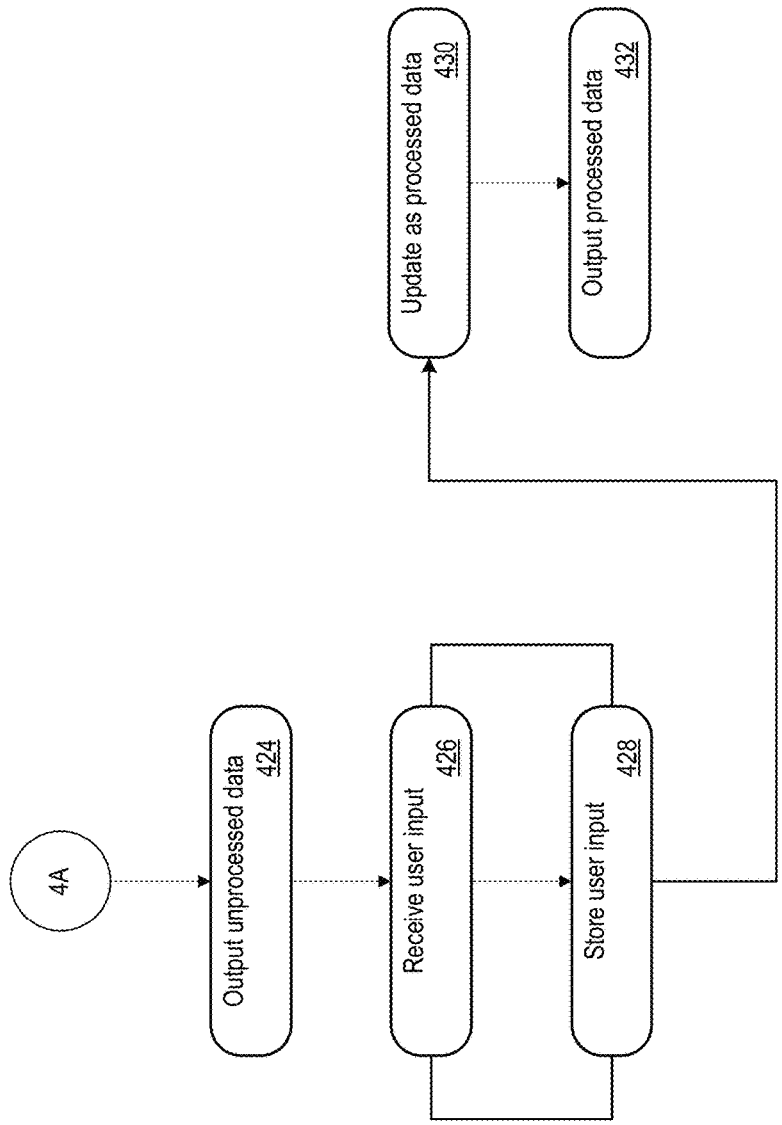
FIG. 4B is a flowchart that shows an example process for modifying parameters at a user computing device upon receiving a notification from a computer server.

If the computer server determines that a determined parameter has a low confidence value, for example, the server can send a notification to the user computing device in step 422. Referring now to FIG. 4B, an example process is shown for modifying parameters at a user computing device upon receiving a notification from a computer server. When identified parameters have low confidence values, for example, they are stored as unprocessed data and outputted to the computing device in step 424. A user (e.g., inventory manager, warehouse operator) at the computing device (e.g., smartphone, tablet, laptop) can review the unprocessed data, for example, and make corrections/modifications/edits to those parameters. For example, if the barcode scanning application does not get an accurate reading of the barcode and therefore has a low confidence value for the barcode determination, the scanned barcode may be classified as unprocessed data and sent to the computing device for review by the user.

In the present example, the user can view the unprocessed data (e.g., parameters with low confidence values) displayed on the GUI of the computing device, and can make edits based on manual inspection of the pallet. For example, the user can review the batch of images associated with the pallet, and/or compare information/parameters that are identified by the computer server with information/parameters that are associated with prior pallets accessible via a warehouse management system and/or an inventory management system. If a barcode was not accurately scanned by the barcode scanning module, for example, the user can manually scan the barcode using a handheld scanner then send that scan from the scanner to the computer server.

The user computing device receives the user input (step 426) and stores the input (step 428) in the pallet profile. The user computing device can receive one or more user inputs and store those user inputs each type the user provides them to the computing device, for example. Once the user computing device stores the user input in the pallet information database, for example, the computer server can replace the associated parameter determination with the low confidence value with the user input (step 430) (e.g., SKU reading with a low confidence value is replaced with the user input of a correct SKU value). Finally, the computer server can output the processed data (e.g., the updated pallet profile) to the computing device (step 432). The outputted data can include the user input(s), as well as the parameter determinations with high confidence values that were made by the modules executed by the computer server, for example.

Figure 5:
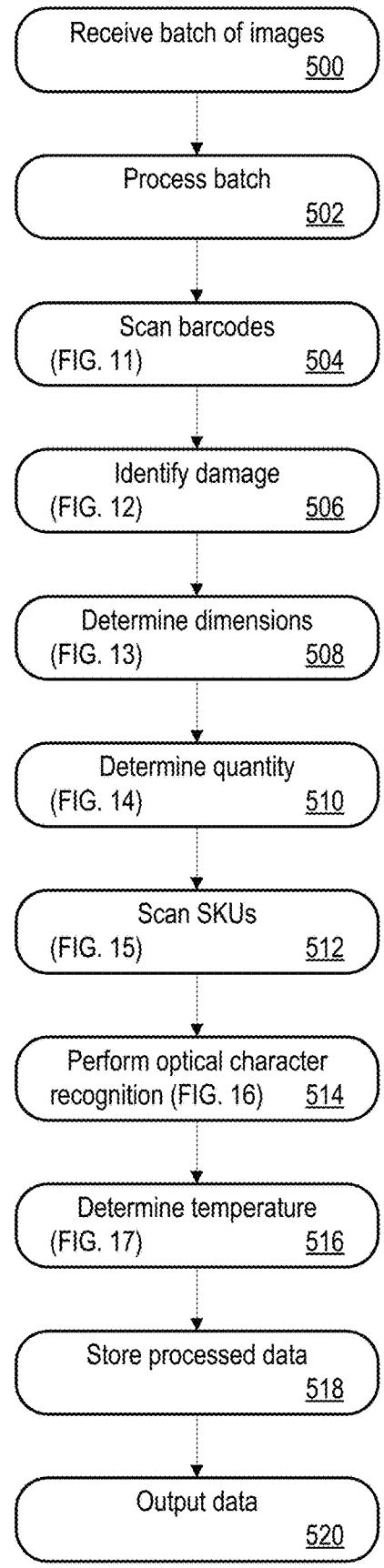
FIG. 5 is a flowchart that shows an example process for detecting pallet parameters from visual information in a batch of images.

FIG. 5 is a flowchart that shows a sample process for detecting pallet parameters from visual information in a batch of images. Although the following steps in the process are described as being sequential, the steps can be performed in any order and/or done in parallel. The computer server as previously described receives a batch of images from the cameras configured to the scanning frame in step 500. In step 502, the server sends the batch of images to an image processing application (e.g., module) that is configured to process the batch, including but not limited to removing random ambient lighting, correcting lighting, removing blurring, sharpening, etc. The image processing module or another module can further be configured to construct a 3D point cloud structure of the pallet that is based upon the batch of processed images. The processed batch of images and 3D point cloud can then be sent to each application (e.g., module) that is configured to determine a particular parameter from the visual information in the batch of images and/or the 3D point cloud.

In some implementations, a barcode scanning module can be configured to scan/read one or more barcodes that appear within specific locations/regions of an image (step 504). Training this module to scan/read barcodes in a specific location/region of an image can increase efficiency and accuracy and reduce the amount of time that the module spends identifying one or more barcode parameters. A damage detection module can also be configured to detect any indications of damage as previously discussed from the batch of images as well as the 3D point cloud, to determine whether the pallet or boxes on the pallet are damaged (step 506). Whereas the barcode scanning module can be trained to identify barcodes in specific regions in an image, for example, the damage detection module can be trained to identify one or more indicators of damage throughout the entire image as well as 3D point cloud structure. Indicators that the module can be trained to look out for/identify include, but are not limited to, fractures in a pallet board (which in an image may be represented by a high contrast, dark line running through the pallet board), crushed-in box (which in an image may be indicated by higher contrast and darker coloring and in the 3D point cloud may be represented by a vertical/horizontal plane that is not straight), etc.

A dimensions determination module can also be trained to determine the dimensions of the pallet as well as the boxes on the pallet (step 508). This application can determine the dimensions using the 3D model of the pallet. In some implementations, the application can be trained to determine the dimensions of the pallet based on a focal length value and object distance value which are stored as metadata in each of the images that are taken by one or more cameras on to the scanning frame. This module can also be trained to use any of the metadata associated with the batch of images, for example, to determine the dimensions of the pallet as well as boxes on the pallet.

A quantity calculator module can be trained to determine a quantity of boxes on the pallet from the batch of images (step 510). This application can be trained to use the 3D point cloud of the pallet and/or the batch of images to make this determination, for example. An SKU module can be configured to scan within particular regions of one or more images for SKU values (step 512). The SKU module can be trained similarly to the barcode scanning module, for example, and the SKU module can be configured to focus on and scan/read SKUs in specific locations/regions within an image.

An OCR module can also be configured to perform optical character recognition techniques or other text recognition techniques on the batch of images (step 514). The OCR module can be trained similarly to the SKU and barcode scanning modules, for example, and the OCR module can be configured to focus on text/characters in a particular location/region within an image. Once the OCR module is focused on the particular location in an image, for example, the module can detect whether there are entire words and/or lines of letters, numbers, or other characters. The module can break down and identify each character using various optical character recognition and processing techniques, for example. Upon identifying each character, for example, the module can convert the characters into character codes to output the final text. In the present example, if the module is unsure what any particular character represents, it can assign a random character code to that character. Once all the characters are assigned their appropriate character codes, the module can determine which character code fits in to make the text complete. If the module is still uncertain of what the character represents, then the module can assign a low confidence value to the text determination, thereby prompting the user at the computing device to make any necessary corrections/modifications, as discussed throughout this disclosure.

A temperature module can be configured to determine internal and/or external temperatures of the pallet from the batch of images (step 516). One or more image processing techniques can be used to determine the temperature values, for example. In some implementations, the temperature values can be determined from one or more images captured by thermal imaging cameras.

Additional applications (e.g., modules) can be executed by the computer server to determine other parameters as discussed throughout this application. The additional modules can determine parameters including, but not limited to, pallet skew and/or lean, height of the pallet, number of layers on the pallet, pallet board type and thickness, stacked pallets, logos, and pallet weight.

Once all the modules complete identifying the parameters from the visual information in the batch of images and/or the 3D point cloud structure of the pallet with high confidence values, for example, the identified parameters can be stored as processed data in the pallet information database (step 518). As previously discussed, the identified parameters can be stored in a profile that is associated with the scanned pallet. Once the identified parameters are stored in associated pallet profiles in the profile information database, for example, the processed data (e.g., identified parameters) can be outputted to the GUI of the user's computing device in step 520. The user can make any necessary adjustments to the identified parameters, such as when a parameter has a low confidence value, as previously discussed. User inputs can be stored by the computer server in the pallet profile and used to replace any parameter identifications made by the modules, whether or not those modules had low confidence values for their determinations. In some implementations, the server can store the user input along with the modules' identified parameters in order to enhance the training models used for each of the modules. The training models can be enhanced based upon a comparison of the user input and the modules' parameter determinations, for example. Improving the training models this way can ensure that future parameter determinations for different pallets are accurate and have high confidence values.

FIG. 6 is a flowchart that shows an example process for training a model and pallet identification modules. The computer server described throughout this disclosure displays an image from the batch of images to a machine learning training model in step 600. The model can then identify one or more locations in the image for each particular parameter that needs to be identified in step 602. In step 602, the model can also be trained to identify particular types of features of a pallet, such as damage, broken/split pallet boards, crushed boxes, shrink wrap, uneven packaging of boxes, and fewer boxes being placed on any particular layer. As previously mentioned, a convolutional neural network (CNN) can be used for minimal preprocessing, for example. The CNN can localize a label and/or other type of marker (e.g., barcode, SKU) within each of the scanned images. Then, identifying an SKU, for example, can be performed using other computer vision techniques, such as OCR and/or barcode reading techniques.

The training techniques described herein can use the machine learning model to learn from samples of each type of pallet and label, but not necessarily each individual feature/parameter (e.g., SKU) of a particular pallet. For example, one or more modules can be trained to detect features in an image, such as a pallet type, damage, skew, lean, product type, number of boxes, size of boxes, text, barcodes, and SKUs. A vendor providing 20 types of products with 5 types of packaging can use 5 classes of training samples rather than 20, for example. The amount of training samples per class can generally vary depending on the expected variability in visual appearance(s) between samples. If a barcode always appears in the same location on each type of packaging, for example, then fewer training samples may be used to train a barcode scanning module how to accurately identify and scan a barcode. On the other hand, if text can appear in different locations and/or different styles, sizes, and/or fonts on different types of packaging, then more training samples may be used to train the machine learning training model. In an example in which multiple training samples can be acquired from a single pallet, an estimate of 20 pallets per class would likely provide sufficient data for training.

The machine learning model can also be trained to detect SKU edges in each of the images in step 604. Edge detection can be beneficial to train an SKU reading module to scan/read an SKU within certain boundaries in an image to increase efficiency and accuracy in the module's determinations. SKU edge detection can be performed using various edge detection techniques.

The computer server described herein can also use a geometric-based training model to perform pallet plane segmentation (step 606). The segmentation techniques used can help segment objects from each other, including each face/surface of a pallet and each box on the pallet. This can be beneficial for one or more modules that use the 3D point cloud structure of the pallet to more accurately identify parameters such as damage (e.g., crushed in, holes, rips), pallet lean, pallet skew, box count, etc. Furthermore, the geometric-based model can be used to detect pallet plane boundaries in step 608. Separating and/or identifying the pallet from the rest of an image, for example, can assist one or more modules in determining the pallet's skew, lean, height, number of layers, etc. The geometric-based model can be trained to detect the pallet plane's orientation (step 610). Orientation of the pallet can assist modules in making accurate determinations of the parameters discussed above.

Once the machine learning and geometric-based models are trained, what is learned by each model can be aggregated and stitched together using various aggregation techniques (step 612). In this step, the computer server can feed each of the training models to the parameter identification modules. For example, in step 602, the machine learning model was trained to identify a location/region in an image for a barcode. The model in the present example was then trained to focus on that particular location/region, so that when the model is use by a barcode scanning module, the barcode scanning module can focus on the particular location identified in training to quickly and more efficiently scan a barcode in that particular location. Each of the modules is able to perform a more granular inspection of the particular region/location that it is trained to focus on in step 614. In some implementations, a damage detection module can receive the machine learning and geometric-based models to detect that damage exists based on the 3D point cloud, and detect what type of damage exists based on the batch of images.

In some implementations, each of the modules executed by the server can simultaneously detect and identify particular parameters that each module is trained to identify so as to increase efficiency of the overall system. Once a module completes identification of the particular parameter (e.g., barcode), for example, the module can send the parameter to the computer server along with a confidence value associated with that identification to be stored in a pallet profile in the pallet information database (step 616).

FIG. 7 depicts an example computer system. A computer server 700, as previously described, a pallet profile device 730, and a user computing device 704 can communicate through a network wirelessly (e.g., BLUETOOTH, WIFI) and/or through Ethernet-based communication. The computer server 700 can include one or more modules that are trained and configured to identify particular parameters about a pallet from visual information in the batch of images and 3D point cloud structure. The computer server 700 in the present example includes an image processing module 706, which is trained and configured to process/edit the batch of images using the techniques previously described. The image processing module 706 can also be configured to construct a 3D point cloud structure of the pallet based off the batch of processed images, for example. Once the images are processed (e.g., ambient light is removed, images are sharpened/deblurred), the batch of images can be sent to each of the modules of the computer server 700 to identify one or more parameters associated with the pallet. The computer server 700 also can communicate information such as one or more identified parameters with the pallet information 702 database and the user computing device 704, as previously described. The computer server 700 can communicate through a network interface 712, which allows for wireless communication (e.g., BLUETOOTH, WIFI) and/or Ethernet-based communication.

The computer server 700 in the present example includes a machine learning model 708A and a geometric-based learning model 708B. Each of these learning models can be used to train particular modules to identify certain features/parameters of a pallet. For example, a module for identifying one or more characteristics of the pallet, such as the pallet board type, can be trained by the machine learning model 708A. For example, the module can be trained to detect from one or more types of pallet board in the images, which can include CHEP, Whitewood, or ERUO board types. If the module does not or cannot accurately detect one of those board types, for example, the module can store a temporary value for the board type and flag it for a user to correct/edit/modify at a later time. If the user inputs a pallet board type not previously known by the module, for example, then the module can be trained again via the machine learning model 708A to detect that type of pallet board in future identifications for any pallet.

In some implementations, one or more modules can be trained by both the machine learning model 708A and the geometric-based learning model 708B. Those modules can include a text recognition module 716, barcode reader module 718, and damage module 721. Other parameters that can be determined based on training from the geometric-based learning model 708B include, but are not limited to, a timestamp, inventory owner, lot code, date code, height, dimensions, weight, quantity of boxes on the pallet, damage to the pallet, damage to the boxes or other items on the pallet, lean, skew, weight, and internal/external temperatures.

The text recognition 716 and barcode reader 718 modules in the present example can be trained to scan an identified region of an image, read character values, and associate those characters with existing character values. Training these modules may include less geometric-based training and more machine learning training, for example. The barcode reader module 718 can be trained to focus on a particular area of an image of the pallet where the barcode is located, for example, and then read the barcode and store that value. Using this training model and the machine learning model 708A, for example, the barcode reader module 718 can read the barcode on any image of any pallet because the module 718 is trained to read barcodes that appear in only a particular location in each image, regardless of which pallet the image is associated with. Thus, the barcode reader module 718 can be generally trained to determine a barcode value for a pallet from an image without having to identify a new location for the barcode in every instance.

If the text recognition 716 and/or barcode reader 718 modules cannot identify any text and/or barcodes, for example, the module(s) can be trained to assign the pallet temporary information, which can then be replaced at a later time by a human operator/user in the warehouse who performs a manual inspection of the pallet. These modules 716-718 can then be trained using the user input to more accurate identify future text and/or barcode parameters, for example.

The damage module 721, on the other hand, can use the geometric-based and machine learning training to more accurately identify if there is damage to the pallet or a box and what type of damage there is. Once the module 721 makes a determination that there is damage based on the geometric-based learning model 708B and use of the 3D point cloud of the pallet, for example, the module 721 can use the machine learning model 708A to examine and determine a type of damage (e.g., smashed box, missing box, broken pallet board) in a particular region in one or more images, based on what region in the 3D point cloud the module 721 identified as being damaged. A lean module 726 and height module 722 can further assist the damage module 721 in determining whether there is any damage (refer to the below description of FIGS. 8A-B).

The damage module 721 can be trained to identify crushed, moshed, and/or budging boxes on the pallet. If one or more boxes are crumpled in some form, perforated, and/or have noticeable rips and/or holes, that damage can be recorded by the module 721 and flagged for further inspection by the user at the computing device. Using the 3D point cloud, for example, the module 721 can be trained to determine which layer(s) of the pallet any identified damage occurred on, therefore making it easier for the user to inspect and identify the damage. Furthermore, the module 721 can be trained to identify damage to the pallet itself. For example, the damage module 721 can be trained based off the machine learning model 708A to identify any broken, cracked, and/or missing pallet boards. The module 721 can also detect pallet deflection and whether the pallet boards are sagging or are not straight using both the machine learning model 708A and the geometric-based learning model 708B. This information can be beneficial to a warehouse management system or human operator/user in determining whether the pallet is ready to be transported throughout the warehouse. This information can also be beneficial to determine liability for associated pallet damage and determining whether the pallet was received at the warehouse with damage or whether the damage occurred after the pallet arrived at the warehouse.

Most of the modules associated with position-oriented parameter determinations can be trained using a geometric-based learning model 708B. For example, a box count module 720 and a boxes per layer module 724 can be trained to calculate volume and other numeric values/calculations associated with a 3D point cloud structure of the pallet. The modules that are trained by the geometric-based learning model 708B in the present example include box count 720, height 722, boxes per layer 724, lean 726, and skew 728.

Thus, in the present example, the box count module 720 can be trained to identify a total number of boxes or other items on the pallet while the boxes per layer module 724 can be trained to identify a number of boxes in each layer on the pallet ("TI") from the 3D point cloud of the pallet. The boxes per layer module 724 can further identify and store a top TI separately from the TI for the rest of the pallet, for example, when the module determines that the top TI is not equal to the TI for the rest of the pallet.

The height module 722, for example, can be trained to identify a number of layers on the pallet ("HI"), including a length, height, and width of the pallet and the boxes on the pallet. For accuracy, the determined values can be rounded to the nearest ¼ inch or another suitable value. In addition, the height module 722 can be trained to identify and determine a thickness of the pallet boards (e.g., ½ inch, ¾ inch).

The lean module 726, for example, can determine whether there is a lean in the pallet. For example, when the module 726 detects a lean value of more than 3 inches (or another suitable value) to one side of the pallet, the module 726 can be configured to send a notification to the user at the user's computing device prompting the user to manually inspect the pallet. Upon inspection, the user can determine whether or not the lean is in fact 3 or more inches and/or whether the lean is likely to be a problem for transporting and storing the pallet in the warehouse. In the event that at least a threshold lean is detected indicating potential dangers in transporting the pallet, a notification can be provided to one or more systems and/or devices instructing that warehouse workers rebuild the pallet before transporting the pallet in order to eliminate the danger. For example, an additional task for rebuilding the pallet can be added to a sequence of warehousing operations for the pallet, requiring that the pallet be rebuilt before subsequent operations (e.g., transportation of the pallet to a designated storage location in the warehouse) are performed.

The skew module 728, for example, can determine whether one or more layers of the pallet are twisted, turned, and/or shifted with a possible overhang. The skew may negatively impact the ability to store the pallet in a rack in the warehouse, and may also increase the possibility that the pallet will fall over while in transit in the warehouse and/or while the pallet is stored in a location in the warehouse.

The geometric-based learning model 708B, for example, can use the 3D point cloud structure that was generated based on the batch of images by the image processing module 706. In some implementations, the 3D point cloud can be a collection of 3D points associated with one or more sides, parts, and/or planes of the pallet and its contents/boxes, the 3D points having color values and being fitted on an XYZ/RGB scale. Such a point cloud can be a base structure for most or all geometric-type processing that is performed at the computer server 700, for example. Modules that are trained by the geometric-based learning model 708B, for example, can use the same point cloud structure to make geometric determinations/calculations to identify parameters.

Parameter determinations made by one or more modules executed by the computer server 700 can be stored in a pallet profile in a pallet information database 702 as described throughout this disclosure. The pallet profile can then be accessed and displayed on the user computing device 704, such that a user can make any changes/modifications/additions to the determined parameters.

The pallet profile device 730 can control the system for taking images of a pallet on a conveyor belt and capturing other parameters associated with the pallet (e.g., weight, temperature). For example, a camera module 732 can control the one or more cameras that take pictures of the pallet as it moves through the warehouse (e.g., on the conveyor belt, on a forklift, as part of an automated warehouse system including automated pallet transporters, such as robots to transport pallets). The camera module 732 can determine a camera's shutter speed and/or other camera settings based on a speed/velocity of the approaching pallet as well as changes in ambient lighting. The camera module 732 can communicate its camera setting determinations to a controller 740, for example, which can be configured to set one or more camera settings to the values determined by the camera module 732. The camera module 732 can also temporarily store any images that are captured by the one or more cameras, for example. Once all images are captured (e.g., scanning of the pallet is completed), for example, the camera module 732 can transmit some or all of the images to the controller 740.

A thermal imager module 734, for example, can be configured to control one or more settings of any thermal imagers that are used in the system. The thermal imager module 734 can temporarily store any thermal images that are captured by the one or more thermal imagers, then transmit the images to the controller 740 when the pallet is completed with the scanning process.

A weight scale 736, for example, can be configured to read a weight measurement for the pallet as it passes over the weight scale 736. In some implementations, the weight scale 736 can be embedded into/placed on the conveyor belt. In some implementations, the weight scale 736 can be one or more weight sensors integrated into/attached to one or more forks of a forklift and/or automated pallet transporters that are part of an automated warehouse system, such as automated conveyors, robots to transport pallets, pallet gantries, pallet elevators, and/or other devices/systems to automatically transport pallets. If the weight scale 736 is incorporated into one or more conveyors, the conveyor may need to stop/pause/slow down the movement of the pallet for at least a threshold period of time in order to obtain an accurate weight measurement.

A conveyor belt module 738, for example, can be configured to maintain/set a speed of the conveyor belt to a particular, constant value. The conveyor belt module 738 in the present example can also be configured to read/determine a speed/velocity measurement of the conveyor belt and transmit that measurement to the camera module 732. The camera module 732 can use that measurement, for example, to determine how to modify one or more camera settings of the cameras in the system.

The controller 740, for example, can be configured to receive and batch some or all of the images and/or other information collected by the modules comprising the pallet profile device 730 after the pallet is done being scanned, and transmit the batch by a network interface 742, through the network, and to the computer server 700 for processing.

The pallet profile device 730, for example, can include additional and optional modules including an x-ray scanner module 744, a millimeter wave scanner module 746, a light module 748 and/or a temperature module 750. The x-ray scanner module 744 can be configured to control one or more settings for an x-ray scanner that is included in the system. Module 744, for example, can also be configured to temporarily store one or more x-ray images taken by the x-ray scanner then communicate those images to the controller 740 once the pallet is done being scanned. The x-ray scanner module 744 can also be configured to activate the x-ray scanner when the pallet profile device 730 receives a notification from a warehouse management system or inventory management system that indicates a client/customer associated with the pallet requires the pallet to be scanned with the x-ray scanner. Otherwise, the x-ray scanner can remain deactivated/turned off/inactive until a request for its use is received at the pallet profile device 730. The millimeter wave scanner module 746 can be configured similarly to the x-ray scanner module 744, for example.

The light module 748, for example, can be configured to control one or more settings of lights that are used in the system. These lights can be one or more light fixtures/bulbs placed in a tunnel configuration around a scanning frame, as described throughout this disclosure. The light module 748 can be configured to increase and/or decrease a brightness of each light fixture used in the system. As a result, the module 748 can control the amount of ambient light so that the one or more cameras can capture clear images of the pallet as it is being scanned. The temperature module 750 can be configured similarly to the light module 748, so that the temperature module 750 can control a temperature that is used in the system (e.g., in the tunnel configuration). Determining temperature information about the pallet can be beneficial in identifying where in the warehouse the pallet is to be stored and/or whether the items on the pallet (e.g., food) are spoiling.

Figure 8A:
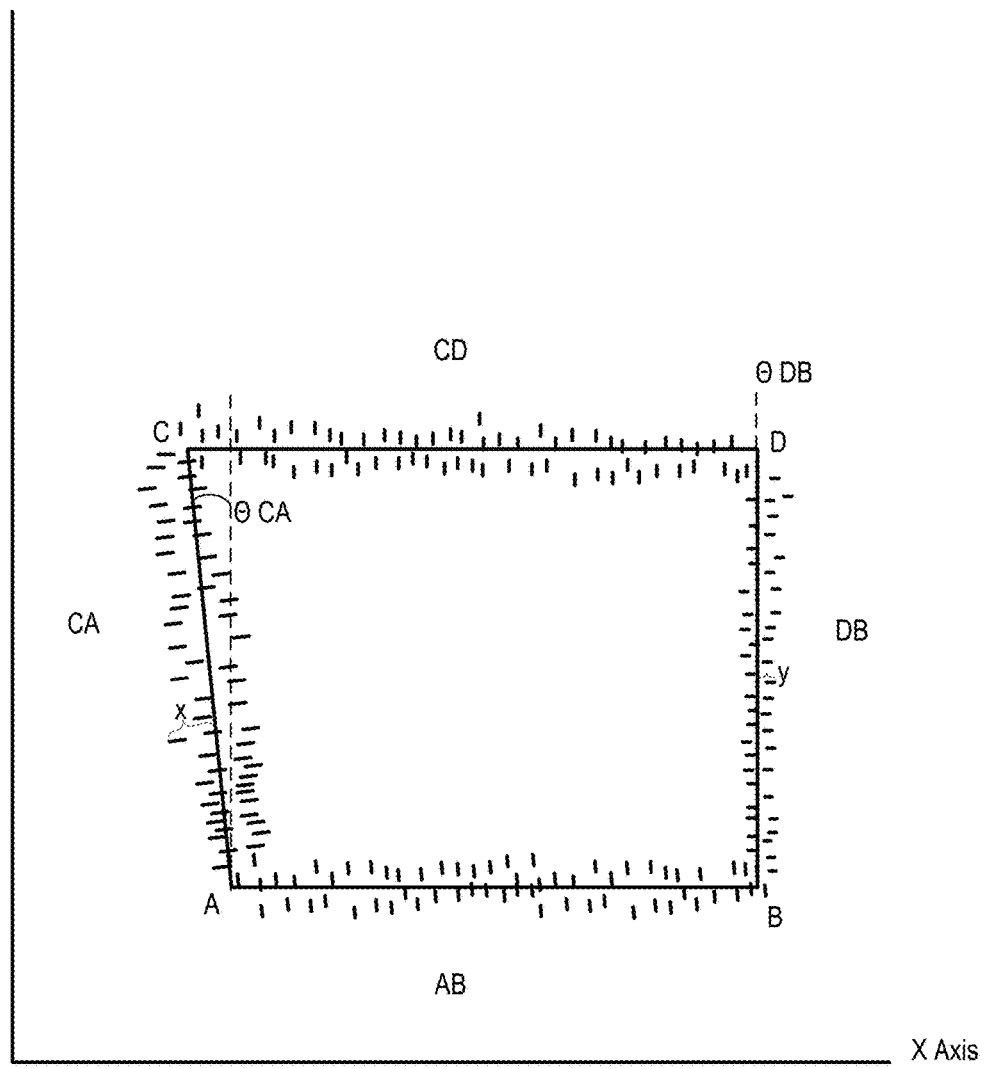
FIGS. 8A-C depict example point cloud graphs for determining pallet dimensions and lean, and associated confidence values for those determinations.
Figure 8B:
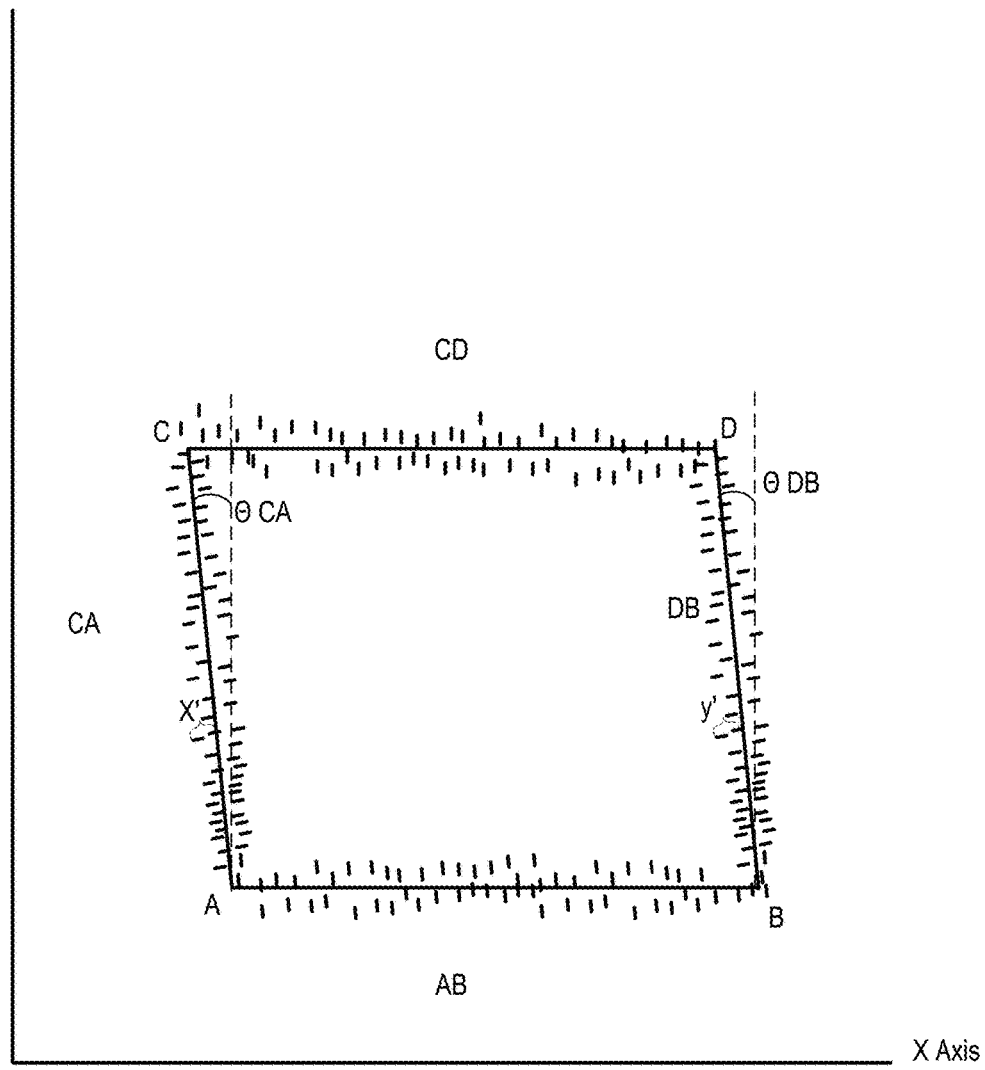
Figure 8C:
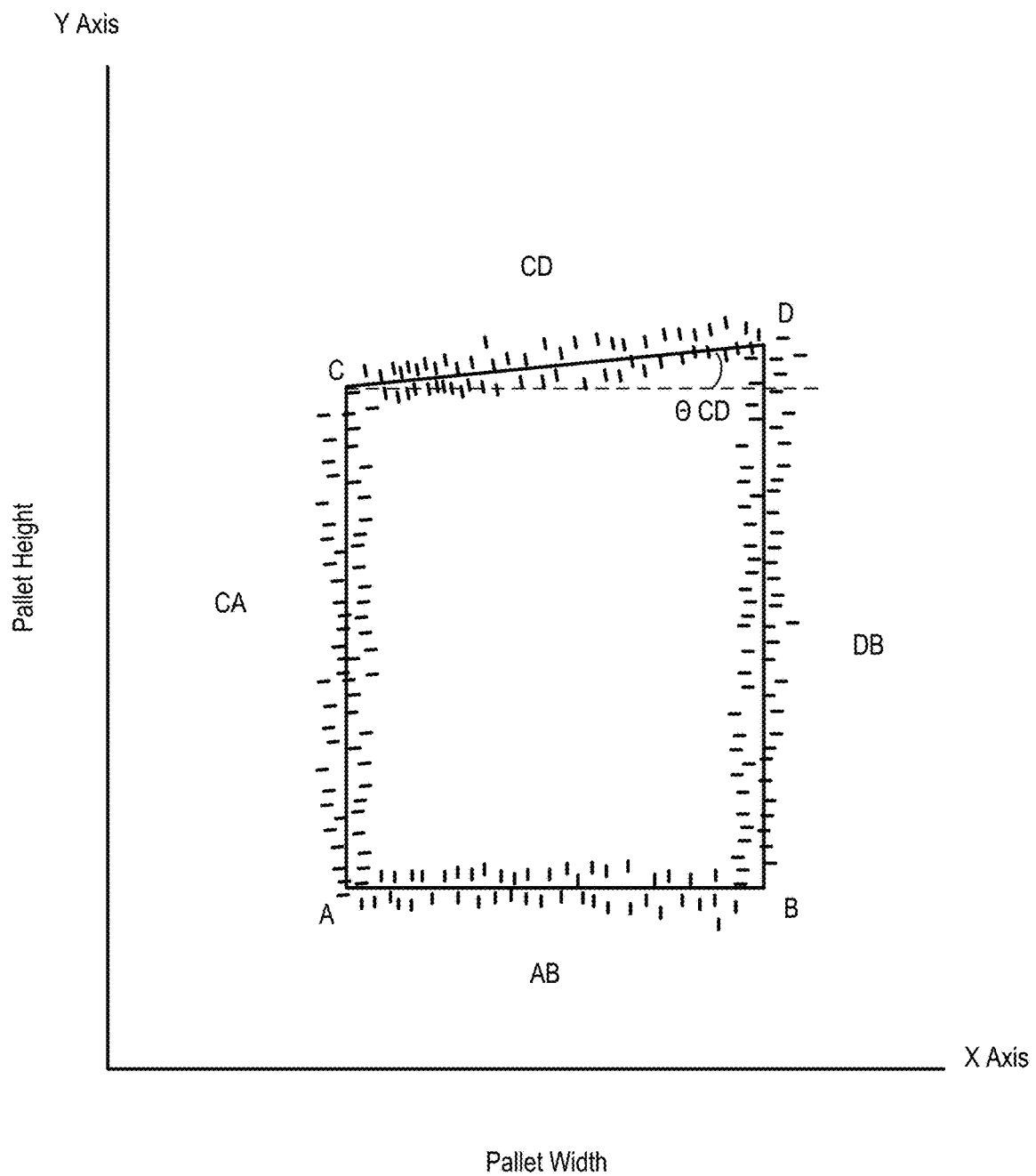

FIGS. 8A-C depict example point cloud graphs for determining pallet dimensions and lean, and associated confidence values for those determinations. These values (pallet dimensions—height, width, and depth—and pallet lean) and their associated confidence values can be different for each feature as it is identified by an associated module in the computer server. FIG. 8A pertains to a pallet dimension and lean determinations (and their associated confidence values), for example. As previously described, a module in the computer server can generate a 3D point cloud structure of the pallet based on the batch of processed images. The module can then apply a geometric plane model to that point cloud to segment and view each of the primary planes of the pallet (e.g., side) in isolation. These planes can be used to determine dimensions for the pallet, such as width, height, and depth of the pallet. The module can determine a closeness of fit for each of the planes with regard to the points that were used to generate the planes, which can be used as a confidence value for the planes and the resulting dimensions determined from the planes. For example, planes with points that are well contained within the plane can have a higher confidence value than planes with several significant outlier points, which can indicate that the plane may not be an accurate representation of the pallet's dimensions. The confidence value can be determined, for example, based on an average distance from each of the points to the plane, where a value closer to an average distance of zero indicates a higher level of confidence than greater average distance values. Other techniques for determining the confidence value can also be used.

A lean determination module can be trained use the plane equation for each of the primary planes of the pallet to determine an orientation for each of the planes. The orientation can help determine an angular measurement of the lean, and resulting confidence values in both the lean determination as well as the pallet dimensions. For example, the lean determination module can determine angular measurements for the planes and can compare the angular measurements for opposing sides to determine the confidence in the lean determinations, with incongruous angles for opposing sides indicating a lower level of confidence in the lean determinations. For example, when the goods on a pallet are leaning, the goods on the pallet will generally shift at a similar angle on opposing sides (e.g., front and back sides, left and right sides) due to shrink wrap that is used to hold goods on a pallet together. Similar angles for the planes on opposing sides of the pallet can indicate a higher confidence that the angle of the planes accurately represent the lean of the pallet, whereas significant differences in those values can indicate a lower confidence in the lean determination. The confidence value can be determined, for example, based on difference in the angles for opposing planes, where a value closer to a difference of zero indicates a higher level of confidence than greater difference values.

For example, referring to FIG. 8A, a side view of an example pallet is shown with the pallet height depicted along the y-axis and the pallet width depicted along the x-axis. The point cloud that is used to identify the contours of the pallet is identified by the hash marks, and the planes that are fit to the hash marks as described above are identified by the lines AB (between corners A and B), CA (between corners C and A), CD (between corners C and D), and DB (between corners D and B). An example distance x of one of the points from the plane CA is represented, and another example distance y of one of the points from plane DB is also represented. The distances from the points to each of their corresponding planes (e.g., distance x from the point to plane CA) can be averaged (or combined in some other mathematical operation) and used to determine a confidence value for how well/accurately the corresponding plane represents the physical contours of the pallet. In this example, the points along plane CA generally have a greater distance from the plane CA than the points along plane DB—resulting in the confidence value for the plane CA (and its corresponding measurements—height, lean) being lower than the confidence value for the plane DB and its corresponding measurements.

The orientation of the planes (e.g., CA, DB, CD, AB) can be determined and used as an indicator of lean for the pallet, and the orientation of opposing sides can be compared to determine confidence values for those lean values. For example, the plane CA can have a lean of angle ΘCA and opposing side DB can have a lean of angle ΘDB. As depicted in FIG. 8A, the opposing sides CA and DB are determined to have different leans (e.g., angle ΘCA indicating a lean for side CA, and angle ΘDB indicating no lean for side DB). These incongruous lean determinations for opposing sides CA and DB can result in a low confidence value for the lean determinations for one or both of the sides CA and DB. If such a confidence value is less than one or more threshold levels, the system can determine that the lean determination can be flagged for secondary review and verification, such as review and verification by a human user.

In contrast, referring to FIG. 8B, in this example the side DB generally has the same orientation and angle of lean ΘDB as side CA with its lean ΘCA. In this example, the lean determinations for opposing sides CA and DB can have a high confidence value. Similarly, in this example the average distance for representative point x' (as well as the other points along plane CA) can be less than the average distance for points along plane CA in FIG. 8A, as a result the measurements associated with the side CA in FIG. 8B can have a greater confidence value than the same side in FIG. 8A.

Referring to FIG. 8C, when determining how many boxes are on a pallet, a box count module can assume that a pallet has the same number of boxes per layer, except for the top layer, which may have fewer boxes. If the lean determination module identifies that the top of the pallet (plane CD) is straight (no lean or angle), then a full layer of boxes at the top of the pallet can be presumed and there can be a high confidence value associated with the count determination. If, in contrast, the top side CD is determined to have a lean, as depicted in the example in FIG. 8C, then there may be a lower confidence value in the accuracy of the box count for the top layer of boxes on the pallet. Similar lean confidence values and side confidence values, as described above, can also be used to determine a confidence value in the lean determination (confidence that the ΘCD is accurate) and in the plane determination (confidence that the plane CD accurately reflects the contours of the top of the pallet based on the point cloud for the top of the pallet).

For example, still referring to FIG. 8C, the count module may assume that the boxes are uniformly and tightly packed within the planes defining the contours of the pallet in 3D space. The count module can take the overall dimensions of the pallet along with box dimensions (e.g., determined using point cloud information, determined using barcode scans) to determine a count of the total number of boxes on the pallet. If a top layer has fewer boxes (as indicated by the top plane CD being at an angle), the box count for the top layer and overall box count may be less accurate and, as a result, the confidence value in the overall box count may be lower. The top layer of the pallet may be a source for affecting confidence values because it can raise ambiguity about how many boxes are actually on the top layer but also in the layers below. Other things may also affect the confidence in the box count, such as gaps between the boxes (e.g., boxes not packaged as tightly), shrink wrap or other obstructions (e.g., frost) that cause misidentification of the boxes, and/or other factors.

FIG. 8C pertains to a pallet's upper layer obstruction confidence value, which can impact the box count confidence value. A height determination module can be trained to determine overall dimensions of each side of the pallet (e.g., length, width, and height). The module can identify a highest point in the 3D point cloud of the pallet, which can indicate a height of the total pallet. However, if most of the points at the top of the 3D point cloud are not at the same height, then the module can determine that there is some type of obstruction on the pallet's upper layer and therefore there is a lower confidence value in the module's determinations. That is, the module may be mapping a plane of the pallet that is not flat nor horizontal.

Figure 9A:
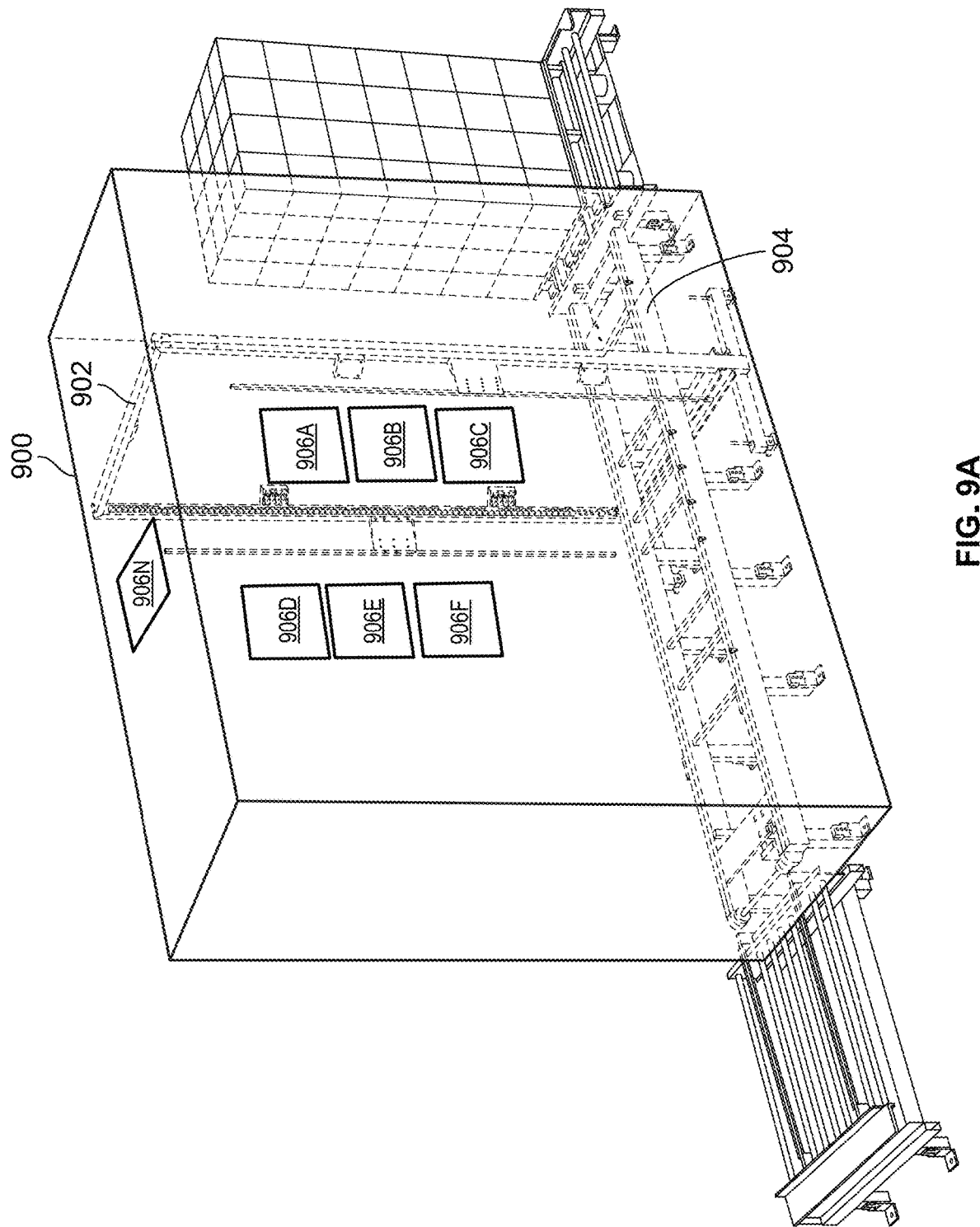
FIGS. 9A-C depict example configurations of a scanning frame in a tunnel.
Figure 9B:
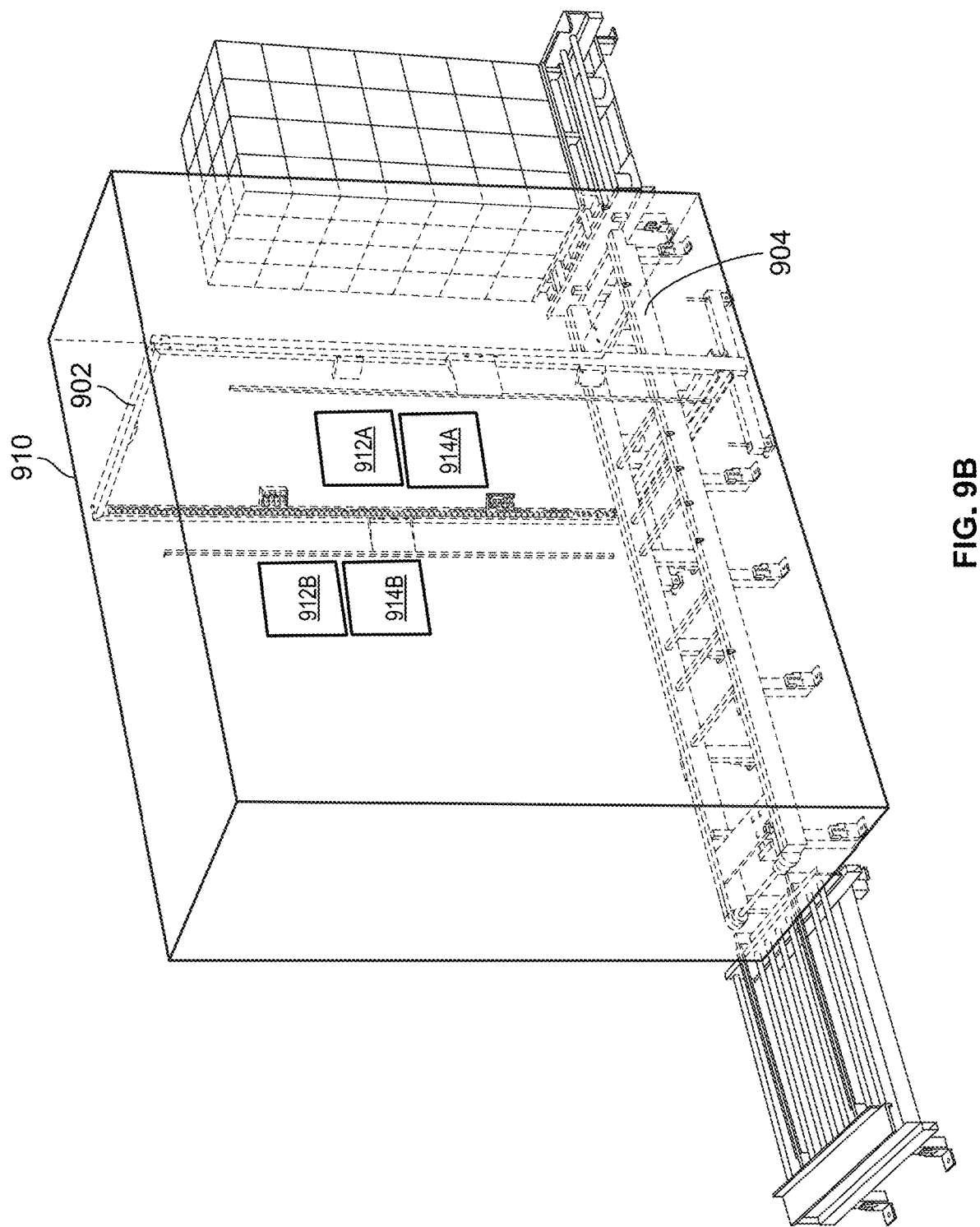
Figure 9C:
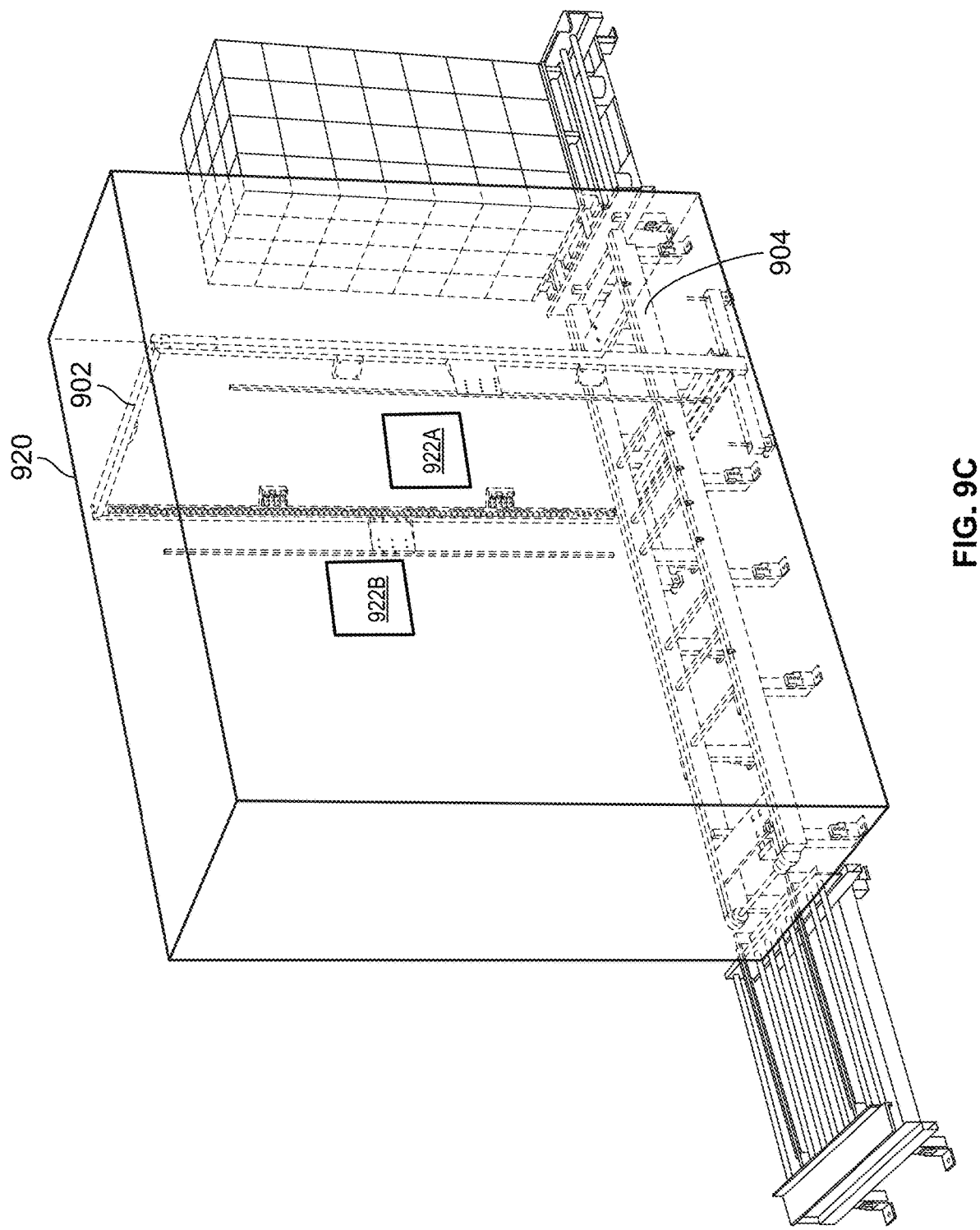

FIGS. 9A-C depict example configurations of a scanning frame in a tunnel. Referring to FIG. 9A, for example, a configuration is shown in which a scanning frame 902 is positioned within a tunnel 900, and various light sources 906A-N in the tunnel (e.g., attached to the frame 902, another frame, and/or an interior surface of the tunnel) illuminate the frame 902 and pallets that move along the frame's conveyor belt 904. The tunnel 900, for example, can be configured to maintain a uniform and neutral ambient state (e.g., uniform lighting, uniform temperature to prevent fogging camera lens, etc.) around the part of the conveyor belt 904 where the scanning frame 902 is positioned. The light sources 906A-N, for example, may be positioned at equal distances from the scanning frame 902 to create a uniform ambient lighting within the tunnel 900. The tunnel 900, for example, can be made of an opaque material that prevents random ambient light from filtering through, such as metal, plastic, wood, canvas, and/or another suitable material. In general, the tunnel 900 can provide consistent lighting by shielding out random ambient light and other atmospheric characteristics (e.g., air temperature, fog, condensation, etc.) that can disrupt cameras attached to/integrated into the frame 902 (or positioned on one or more paddles attached to the frame 902) from capturing clear images of a pallet and/or goods as the items move along the conveyor belt 904. Consequently, images taken by cameras from within the tunnel 900 may require less processing by the computer server, and can increase efficiency and accuracy in identifying and determining one or more parameters by one or more modules executed by the computer server.

In some implementations, a shutter speed of the cameras attached to/integrated into the frame 902 can be adjusted based on the speed and/or velocity of the conveyor belt 904 and the amount of light in the tunnel 900. For example, if the tunnel 900 is dimly lit by the one or more lights 906A-N and the conveyor belt 904 moves at a slow speed, the cameras can be adjusted such that the camera lenses are open wider (e.g., wider aperture) to let in more light. As another example, the shutter speed can be increased so that the cameras capture images that are not blurry, despite the dim lighting and speed/velocity of the pallet.

Referring to FIG. 9B, for example, a configuration is shown in which the scanning frame 902 is positioned within a tunnel 910, and one or more millimeter wave scanners in the tunnel (e.g., attached to the frame 902, another frame, and/or an interior surface of the tunnel) are used to scan pallets and/or goods that move along the frame's conveyor belt 904. Each millimeter wave scanner, for example, can include an emitter 912 for emitting millimeter waves, and a corresponding detector 914 for detecting reflected waves. In the present example, emitter/detector 912A/914A is shown as being positioned on one side of the scanning frame 902, and emitter/detector 912B/914B is shown as being on the other side, however other configurations are possible, such as positioning scanners above and/or below the frame 902, instead of or in addition to on the sides. In general, millimeter wave scanners may be beneficial in situations when a pallet is wrapped in shrink wrap, cellophane, or another material through which cameras may not be able to accurately capture images, and/or when items are covered with frost. For example, if a frozen pallet is moved from a truck onto the conveyor belt 904 in the tunnel 910, the tunnel 910 being kept at a significantly warmer, constant temperature, frost may develop on the surface of the pallet. Cameras may not be able to capture accurate images of the pallet for the computer server to accurately identify one or more parameters, so a millimeter wave scanner can be used in this situation. The millimeter wave scanner can capture images of barcodes, SKUs, and/or other text that is on the surface of the pallet, as well as images of damage to pallets and/or goods, through frost and/or various wrapping materials, for example. The scanner can then communicate the images to the computer server to process the images, identify the one or more parameters, and store the parameters in a pallet profile associated with the scanned pallet. Millimeter wave scanners, for example, may be used instead of, or in addition to, other image capture technology (e.g., cameras, x-rays, etc.).

Referring to FIG. 9C, for example, a configuration is shown in which the scanning frame 902 is positioned within a tunnel 920, and one or more x-ray scanners in the tunnel (e.g., attached to the frame 902, another frame, and/or an interior surface of the tunnel) are used to scan pallets and/or goods that move along the frame's conveyor belt 904. In the present example, x-ray scanner 922A is shown as being positioned on one side of the scanning frame 902, and x-ray scanner 922B is shown as being on the other side, however other configurations are possible, such as positioning scanners above and/or below the frame 902, instead of or in addition to on the sides. In general, x-ray scanners may be beneficial to identify internal qualities and/or states of goods/boxes/products on the pallet. For example, x-ray scanners can be used to detect whether or not food items are spoiling. As another example, x-ray scanners can be used to determine whether foreign objects were mistakenly incorporated into a customer's manufacturing process. The x-ray scanner(s) can then communicate the images to the computer server to process the images, identify the one or more parameters, and store the parameters in a pallet profile associated with the scanned pallet. X-ray scanners, for example, may be used instead of, or in addition to, other image capture technology (e.g., cameras, millimeter waves, etc.).

Figure 10A:
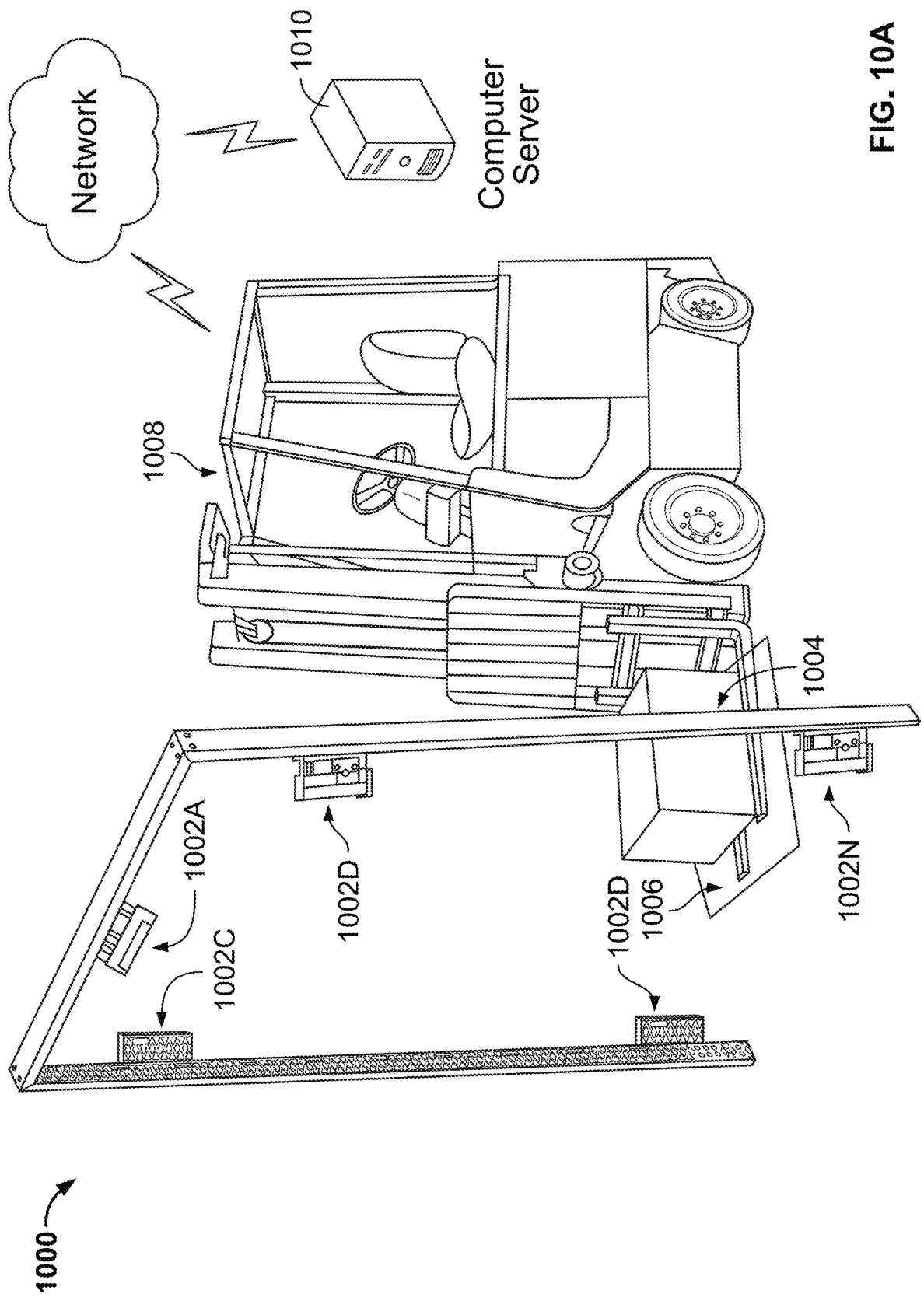
FIGS. 10A-B depict example configurations of the system in a warehouse environment.
Figure 10B:
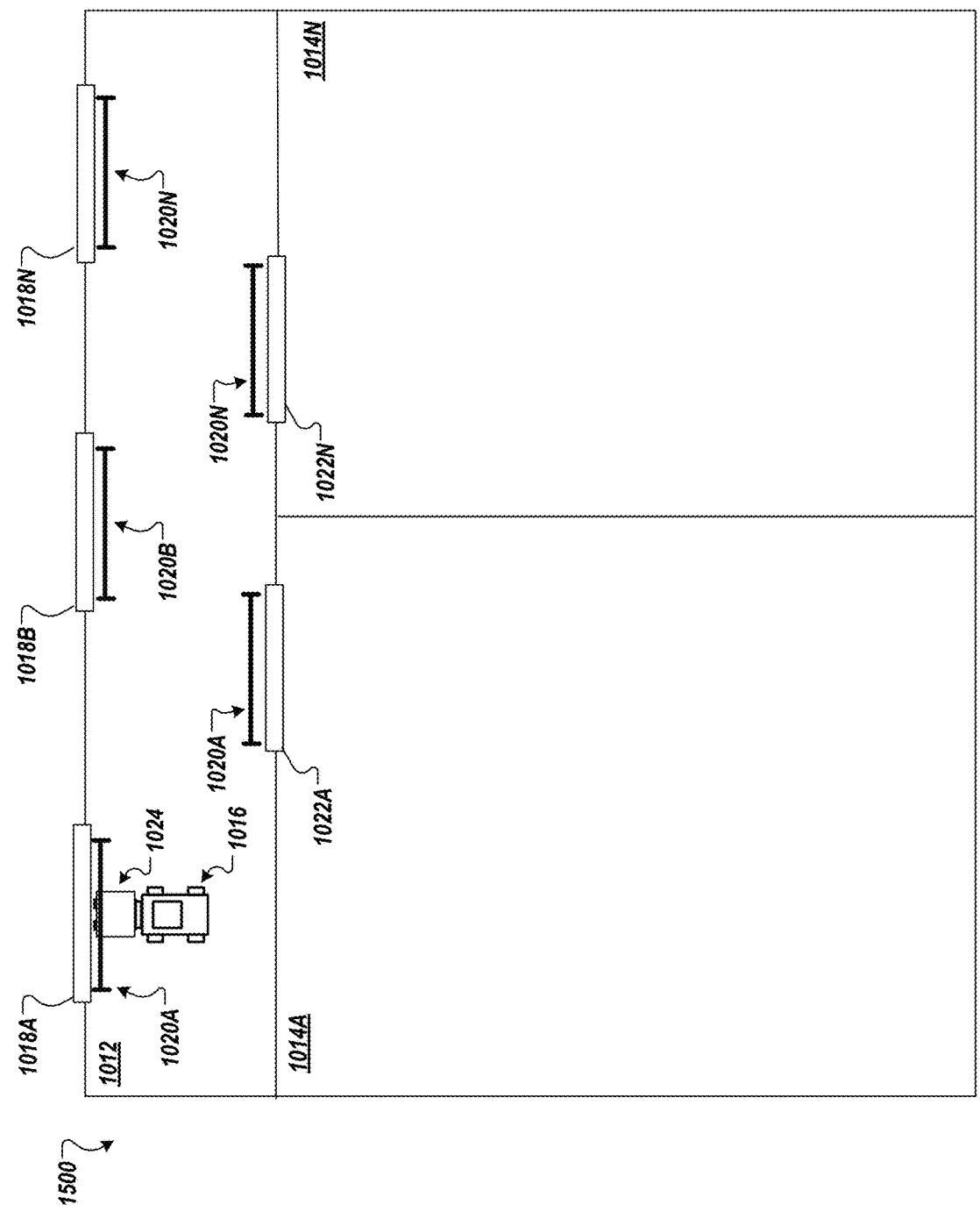

FIGS. 10A-10B depict example configurations of the system in a warehouse environment. FIG. 10A depicts an example configuration in which a doorframe 1000 comprises one or more cameras that are integrated into the doorframe 1000 and/or attached to one or more paddles 1002A-N that are attached to the doorframe 1000 and positioned at varying angles. Such a configuration can be advantageous in detecting whether one or more parameters of a scanned pallet 1006 changed since the pallet 1006 was scanned upon entry to the facility, for example. A pallet on a forklift, automated warehouse robots, automated transporters (e.g., automated warehouse robots, automated warehouse conveyors), and/or other vehicle/device/system for transporting pallets can be scanned, for example, as it moves on a forklift through a passageway. If the pallet contains perishable goods and the goods' temperature as scanned in the passageway increased since a time the pallet was first scanned, for example, the forklift carrying the pallet can be prompted to move the pallet to a new location in the facility that has a colder temperature to prevent food spoilage. Whether the scanning frame previously described is positioned in front of or after a passage area or one or more cameras are attached to the door frame 1000 rather than the scanning frame described herein, the one or more cameras can still be trained to capture accurate images of the pallet 1006 as it moves throughout the facility at a varying speed, velocity, and/or acceleration.

The cameras may be configured to capture images of the pallet 1006, which includes item(s) 1004 (e.g., boxes) as the pallet 1006 is moved through the warehouse environment on a forklift 1008. In this configuration, the doorframe 1000 can be any passageway in the warehouse, such as an entry to a freezer area in the warehouse, a dock door, or any other sort of passage between different zones in the warehouse. The cameras can be trained to detect a speed of the forklift 1008 and then adjust the shutter speed and frequency at which the cameras take pictures of the pallet 1006 based on the detected forklift speed, for example. As a result, the forklift 1008 can move at any speed, fast or slow, and the cameras can capture accurate images of the pallet 1006 as it moves at the speed of the forklift 1008 through the doorframe 1000.

If the captured images are blurry, for example, the cameras can communicate the determined speed, velocity, and/or acceleration of the forklift 1008 to a computer server 1010 previously described for improved image processing. The computer server 1010 can use those measurements to process the images and deblur them using various image processing techniques.

The forklift 1008 can be in communication with the computer server 1010 to share information about the forklift 1008 and/or the pallet 1006. For example, the forklift 1008 can wirelessly communicate (e.g., WIFI, BLUETOOTH connection) identification information of the forklift 1008 (e.g., forklift ID number, location in the warehouse) to the computer server 1010. The forklift 1008 can also communicate information it detects/determines about the pallet

1006. If one or more weight sensors are built into the forklift 1008, for example, the forklift 1008 can determine a weight measurement of the pallet 1006 and communicate that value to the computer server 1010. One or more cameras (e.g., stereoscopic, 2D, 3D) can be attached to suitable parts of the forklift 1008 and configured to capture one or more images of the pallet 1006 as the pallet 1006 is being moved throughout the warehouse. The forklift 1008 can then communicate a batch of the images to the computer server 1010 for image processing and for use in determining the particular parameters associated with the pallet 1006.

In some configurations (not depicted), one or more cameras can be mounted around a frame of a layer picker on the forklift 1008. As the layer picker moves up and down, for example, the cameras can scan one or more pallets and take images of the pallets from various angles. The batch of images can be communicated to the server as previously described, to determine parameters associated with each of the pallets stacked on the layer picker.

FIG. 10B depicts a map of a warehouse environment comprising one or more scanning areas. A dock area 1012 includes one or more truck bays 1018A-N. Each of the truck bays 1018A-N can have a scanning frame 1020A-N surrounding and/or in front of the truck bay 1018A-N. As a result, any items that are unloaded from a truck docked at the truck bay 1018A-N can be scanned upon delivery to the warehouse. For example, a forklift 1016 can pick up a pallet 1024 from inside a truck at truck bay 1018A. As the forklift 1016 moves from the truck, through the truck bay 1018A, and into the dock area 1012, the pallet 1024 can be scanned by the one or more cameras attached to/integrated into the scanning frame 1020A.

As the forklift 1016 moves throughout the warehouse, it can also come in contact with one or more other scanning areas. As a result, any information/images captured at each of the scanning areas can be communicated in real time to the computer server 1010 as previously described.

The warehouse can comprise one or more storage zones 1014A-N. The forklift 1016 can move through one or more passageways 1022A-N to enter each of the storage zones 1014A-N. Each of the passageways 1022A-N can have a scanning frame 1020A-N surrounding and/or in front/behind the passageway 1022A-N. As a result, the pallet 1024 that is moved by the forklift 1016 can be scanned at each passageway 1022A-N to assist the computer server 1010 in determining whether any parameters associated with the pallet 1024 change as the pallet 1024 is moved throughout the warehouse.

In the example of FIG. 10B, the forklift 1016 is assigned a task to move the pallet 1024 from the truck bay 1018A to a warehouse storage zone 1014N. As the forklift 1016 moves from the truck bay 1018A and into the dock area 1012, the pallet 1024 is initially scanned by the scanning frame 1020A. The scanning frame 1020A can capture one or more images and/or other parameters (e.g., temperature, weight) associated with the pallet 1024 as described throughout this disclosure. Any images and/or parameters captured by the scanning frame 1020A can be communicated wirelessly (e.g., BLUETOOTH, WIFI) from the scanning frame 1020A and to the computer server 1010. Then, as the forklift 1016 moves from the dock area 1012 to the storage zone 1014N, the scanning frame 1020N at the passageway 1022N can again capture one or more images and/or other parameters associated with the pallet 1024. Any information captured by the scanning frame 1020N can be communicated wirelessly from the scanning frame 1020N and to the computer server 1010. As a result, the computer server 1010 can use and compare the information from the scanning frame 1020A and the information from the scanning frame 1020N to determine whether any of the parameters associated with the pallet 1024 changed while the pallet 1024 was in transit in the warehouse (e.g., internal temperature of the pallet item(s) increased, items on the pallet began to lean or move around so that the pallet is no longer tightly packed, item(s) fell off while in transit and was not retrieved, item(s) on the pallet were crushed or damaged in some way due to movement through the warehouse, pallet boards are damaged from the item(s) weight and movement on the forklift).

Figure 11:
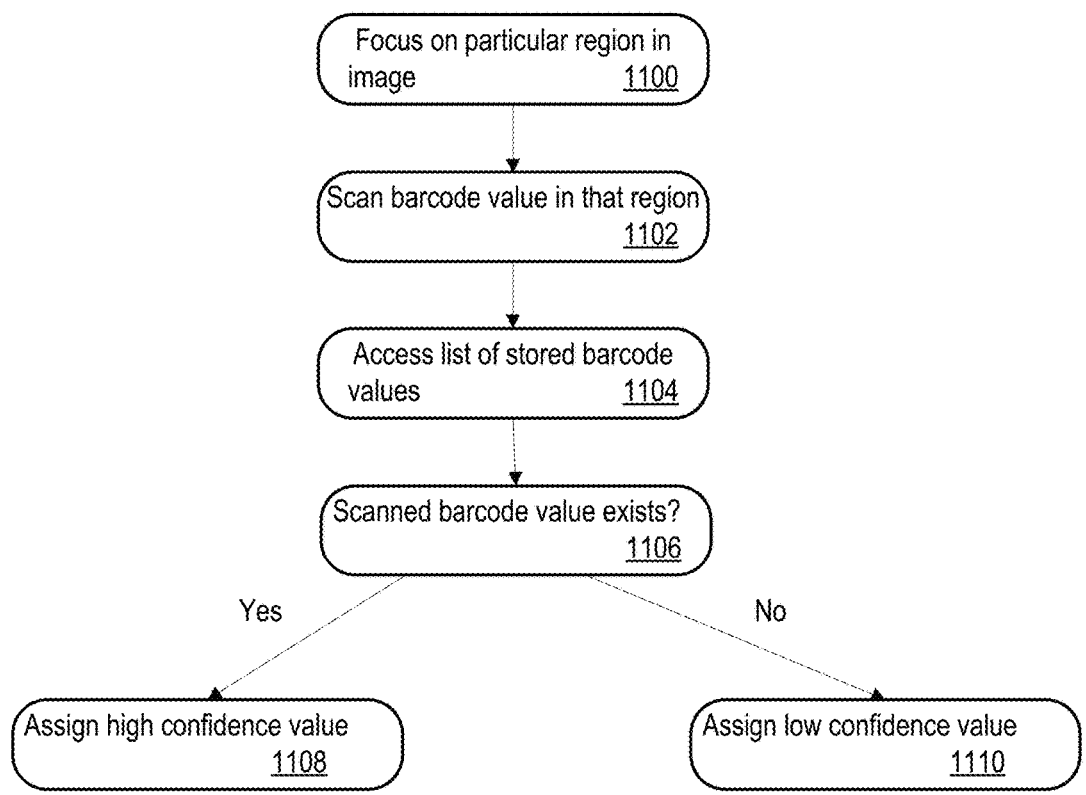
FIG. 11 is a flowchart that shows an example process for scanning a barcode and determining a confidence value.

FIG. 11 is a flowchart that show an example process for scanning a barcode and determining a confidence value. FIG. 11 corresponds to FIG. 5, step 504. The barcode scanning module as described throughout this disclosure can focus on a particular region in an image from the batch of images in step 1100. The particular region in the image that is focused on can be the particular region identified by the training model in which the barcode is most likely to appear, as previously discussed. Once the module focuses on the particular region, for example, it scans a barcode value in that region in step 1102. The module can then access a list of stored barcode values in step 1104, for example. The list of barcode values can be stored in the warehouse management system and/or the inventory management system, as described throughout this disclosure. The list of barcode values can be based on historic data/identified parameters, for example.

In general, there may be a multitude of false positives due to obstructions over the barcode, such as stretch/shrink wrap which adds wrinkles and may give off the appearance of a barcode. As a result, it may be beneficial for the barcode scanning module to compare its scanned barcode value to the list of stored barcode values. In step 1106, the module determines whether the scanned barcode value exists in the list of stored barcode values. A barcode that has been successfully identified many times, for example, can be on the list with a higher frequency and therefore result in a higher confidence value. Consequently, if the scanned barcode value exists in the list of stored barcode values, then the module can assign a high confidence value to the scanned barcode value (step 1108).

If, on the other hand, the barcode scanning module only identified a barcode once and/or the scanned barcode does not appear in the list of stored barcode values, for example, then the module can assign a low confidence value to the scanned barcode value (step 1110). In other words, that scanned barcode value may not exist in association with some pallet, supplier, client, and/or product, and the barcode scanning module may have made an error in scanning the barcode in one or more images in the batch.

Overall, each parameter identification can start with a neutral confidence value, and once it is compared with a list of possibilities for that parameter (based on historic data/identified parameters stored in a database), then the confidence value can be higher (e.g. the scanned barcode appears in the list and therefore is a correct barcode) or lower (e.g., the scanned barcode does not appear in the list and therefore may not exist). The more overlap in the module's determination with values stored in the list, for example, the higher the confidence value for that determination.

Figure 12A:
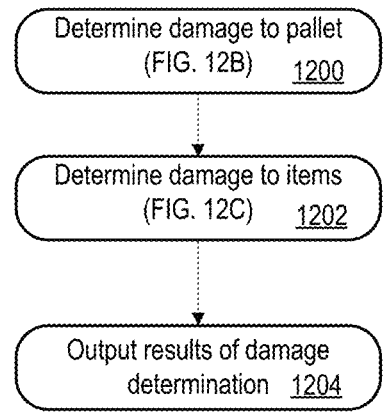
FIGS. 12A-C are flowcharts that show an example process for identifying damage and determining a confidence value.
Figure 12B:
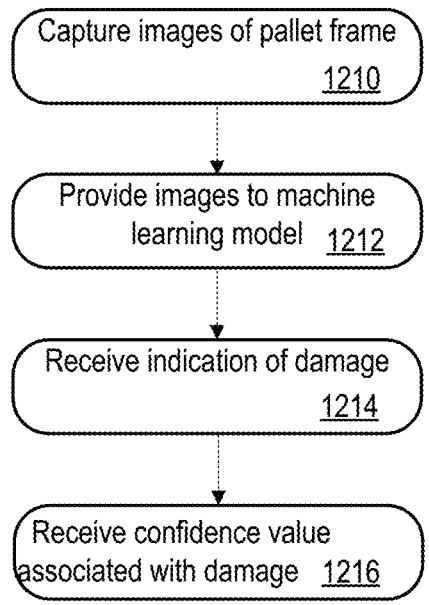
Figure 12C:
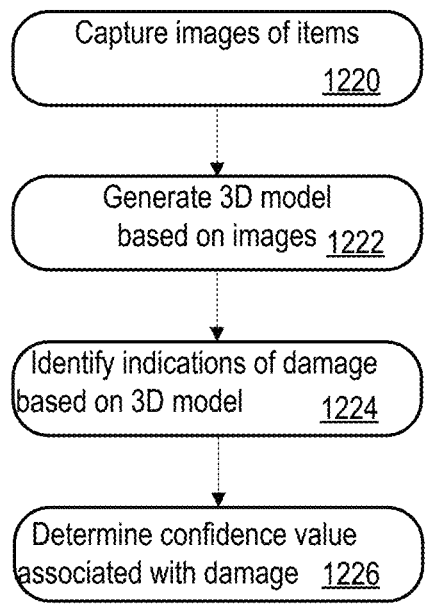

FIGS. 12A-C are flowcharts that show an example process for identifying damage and determining a confidence value. FIG. 12A corresponds to FIG. 5, step 506. The example process for identifying damage can include separate sub-processes for determining damage to a pallet in step 1200, and for determining damage to items on the pallet in step 1202, for example. The separate sub-processes represented in steps 1200 and 1202 can be performed by the computer server 700 (shown in FIG. 7, and similar to the computer server 110), for example, and may be performed sequentially in either order, or may be performed concurrently. After determining possible damage to the pallet and items (e.g., goods, boxes, packages, etc.), for example, results of each separate damage determination can be output (e.g., to the GUI 300, shown in FIG. 3) in step 1204.

Referring now to FIG. 12B, for example, the sub-process for determining damage to the pallet is shown. In step 1210, for example, images of the pallet frame can be captured by one or more cameras and/or other sensors. For example, one or more cameras 118A-N(shown in FIG. 1) that are directed towards the pallet frame 114 (also shown in FIG. 1) can capture images of pallet frame 114 as it passes through the scanning frame 106 (also shown in FIG. 1). Such cameras can include cameras on the scanning frame 106 that are directed to capture images of an underside of the pallet frame 114 from beneath the pallet frame 114, cameras on the scanning frame 106 that are directed to capture images of sides of the pallet frame 114, and/or cameras that are directed to capture images of the pallet frame 114 from other suitable angles.

In step 1212, for example, some or all of the captured images can be provided to a machine learning model. For example, the images captured by the cameras 118A-N can be provided to the computer server 700 (shown in FIG. 7), which can use the machine learning model 708A and/or the geometric-based learning model 708B to identify damage to the pallet frame 114. In general, machine learning models may be suitable for identifying damage to pallet frames (e.g., due to various pallet frames being somewhat similar with respect to their construction and materials), however geometric-based techniques or a combination of techniques may also be used. To train a machine learning model for identifying damage to pallet frames, for example, a supervised or semi-supervised approach may be used, in which multiple images of pallet frames are labeled (e.g., by an operator) as being damaged or non-damaged, and the labeled images are provided for training the model. In some implementations, images of pallet frames may be labeled with a damage classification. For example, a damaged pallet frame may be classified as having damaged boards, missing boards, a broken frame, and/or another suitable damage classification.

In step 1214, for example, an indication of damage can be received from the machine learning model 708A and/or the geometric-based learning model 708B, along with a confidence value associated with the damage indication (step 1216). For example, the computer server 700 can assess whether or not damage to the pallet frame 114 exists, along with a confidence value in that assessment. If an indication is received that damage does not exist, along with a high confidence value, for example, the pallet may be processed normally. As another example, if an indication is received that damage does exist, along with a high confidence value, the pallet may be routed to a location for resolving the problem. As another example, if a damage assessment (e.g., either damage or non-damage) is associated with a low confidence value, an operator can be notified of the assessment, and the operator may inspect the pallet frame 114 to confirm whether the assessment is accurate. Further, captured images corresponding to the low-confidence damage assessment may be labeled by the operator, for example, to refine the machine learning model 708A. In some implementations, separate indications of damage, along with corresponding confidence values, may be provided for multiple different damage classifications. For example, an indication of whether the pallet frame 114 includes one or more damaged boards, an indication of whether frame 114 includes one or more broken boards, and/or an indication of whether frame 114 is broken, can be provided, along with corresponding confidence values, to assist an operator in readily resolving a particular problem with the pallet frame 114.

Referring now to FIG. 12C, for example, the sub-process for determining damage to goods on the pallet is shown. In step 1220, for example, images of the pallet can be captured by one or more cameras and/or other sensors. For example, one or more cameras 118A-N(shown in FIG. 1) that are directed towards the items 102 (e.g., goods, boxes, packages, etc.) supported by the pallet frame 114 can capture images of the items 102 as they pass through the scanning frame 106 and/or as the pallet and items move along the conveyor belt 104. Such cameras can include cameras on the scanning frame 106 that are directed to capture images of the items 102 from various suitable angles, for example, including the top, front, back, and sides of the items 102.

In step 1222, for example, a 3D model can be generated, based on the captured images. For example, the images captured by the cameras 118A-N can be provided to the computer server 700 (shown in FIG. 7), which can use one or more modules of the geometric-based learning model 708B to generate a 3D model (e.g., a point cloud) of the items 102 based on the aggregated images. The 3D model of the items 102, for example, can include multiple planes, which can be analyzed with respect to possible damage, lean, skew, and other suitable properties. In general, geometric-based techniques for analyzing planes in the 3D model may be suitable for identifying damage to items (e.g., due to various goods, boxes, packages, etc., being somewhat dissimilar with respect to their size, shape, and materials, yet being representable by planes), however machine learning techniques or a combination of techniques may also be used.

In step 1224, for example, indications of damage can be identified based on the 3D model. For example, the computer server 700 can determine whether indications of damage (e.g., voids, concave surfaces, and/or convex surfaces) are represented in the 3D model of the items 102. In step 1226, for example, confidence values associated with possible damage to the items 102 can be determined. In some implementations, the confidence values may be based, at least in part, on an area of possible damage of an item relative to a total surface area of the item, and/or an amount of deviation from a plane that defines the item. For example, if the 3D model indicates that a large area of possible damage exists relative to the total surface area of the item, a high confidence value for damage can be determined. As another example, if the 3D model indicates that a small area of possible damage exists relative to the total surface area of the item, a low confidence value for damage (or non-damage) can be determined. As another example, if the 3D model does not indicate any damage, and/or includes a few random outlier points, a high confidence value for non-damage can be determined. In general, items may be processed according to a damage assessment and confidence value. If an indication is received that damage does not exist, along with a high confidence value, for example, items 102 on the pallet 114 may be processed normally. As another example, if an indication is received that damage does exist, along with a high confidence value, the items 102 may be routed to a location for resolving the problem. As another example, if a damage assessment (e.g., either damage or non-damage) is associated with a low confidence value, an operator can be notified of the assessment, and the operation may inspect the items 102 to confirm whether the assessment is accurate.

Figure 13:
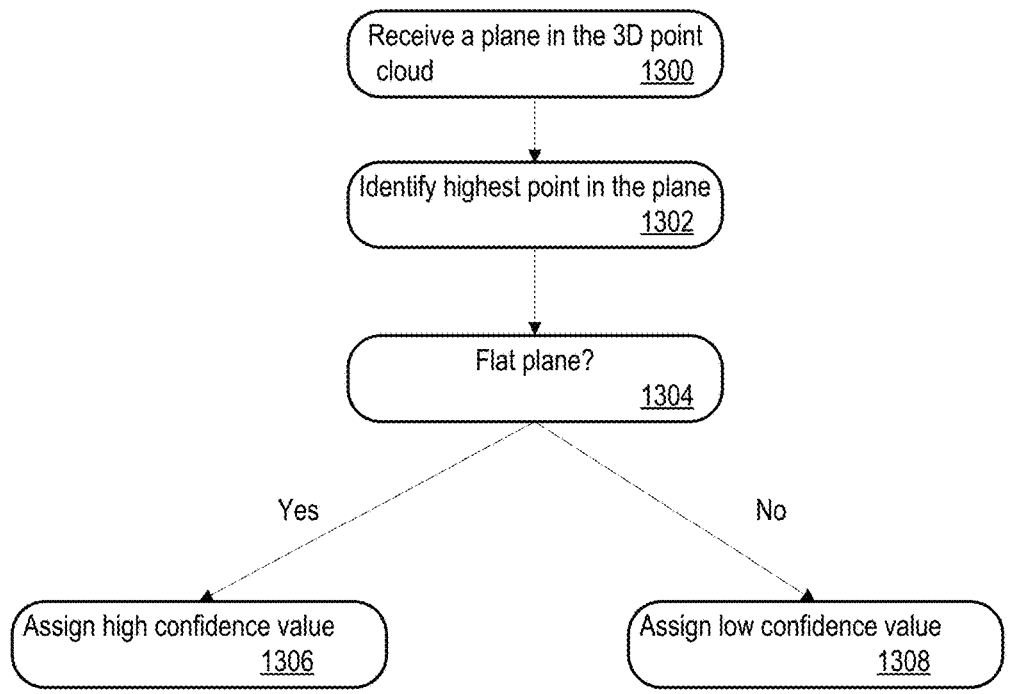
FIG. 13 is a flowchart that shows an example process for determining dimensions of a pallet and a confidence value

FIG. 13 is a flowchart that shows an example process for determining dimensions of a pallet and a confidence value. FIG. 13 corresponds to FIG. 5, step 508. A dimensions module can receive a plane from the 3D point cloud of a pallet in step 1300. The plane can correspond to one side of the pallet, as discussed throughout this disclosure. Based on the plane, this module can identify a highest point in the plane in step 1302. This module can then compare the highest point with a lowest point in the plane to determine whether the plane is flat (step 1304). The plane can be flat if, for example, it represents a straight line, there is no lean, and/or the angle between a vertical and a horizontal side of the plane is 0. If the module determines that the plane is flat, for example, then it can assign the dimensions determination a high confidence value (step 1306). If, on the other hand, the module determines that the plane is not flat (e.g., not all top points on the plane are at the same height), then it can assign the dimensions determination a low confidence value in step 1308.

As discussed previously throughout this application, the dimensions module can also determine dimensions of individual boxes on the pallet. The module can also determine the dimensions of the pallet based on a focal length and object distance, and this information can be stored in the metadata of one or more images in the batch of images. FIG. 8B provides further discussion of how the dimensions can be determined using the 3D point cloud of the pallet.

Figure 14:
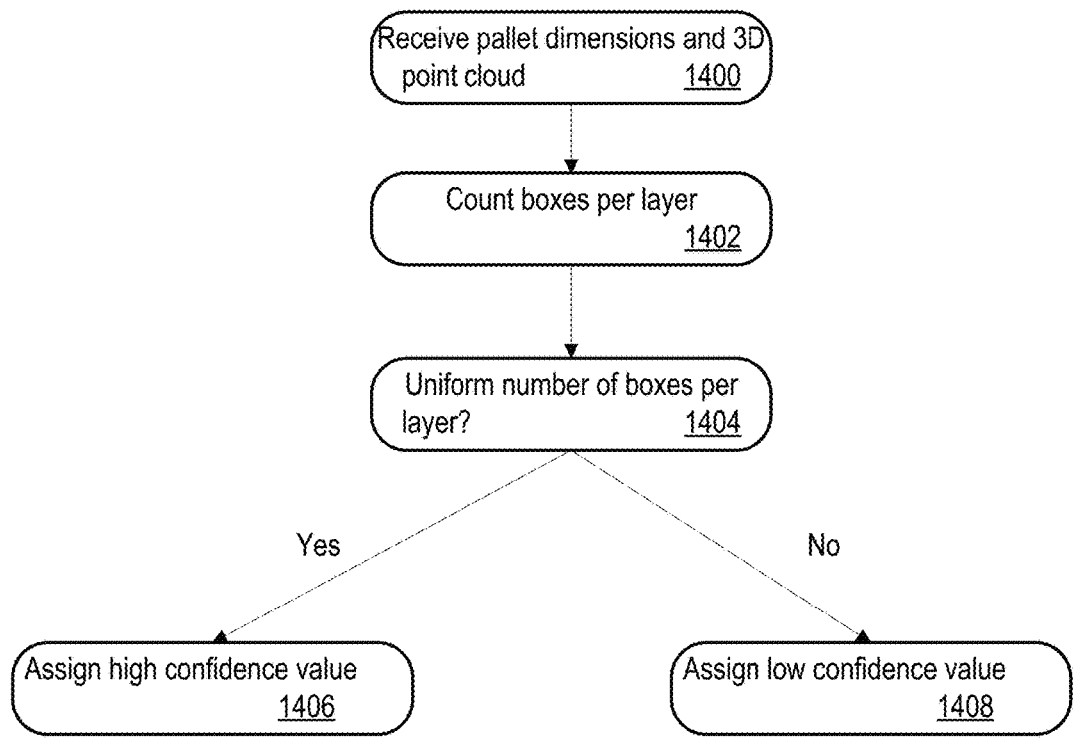
FIG. 14 is a flowchart that shows an example process for determining a quantity of boxes on the pallet and a confidence value.

FIG. 14 is a flowchart that show an example process for determining a quantity of boxes on the pallet and a confidence value. FIG. 14 corresponds to FIG. 5, step 510. A quantity module can receive one or more pallet and/or individual box dimensions and the 3D point cloud of the pallet in step 1400. The module can receive these dimensions from the dimensions module, the computer server, the inventory management system, and/or the warehouse management system, as described throughout this disclosure. Based on the received dimensions, the quantity module can count a number of boxes per layer in step 1402. Refer to FIG. 8A for a more in-depth discussion of how the module can count the number of boxes on the pallet using the 3D point cloud.

The module can then determine whether there is a uniform number of boxes per layer of the pallet in step 1404. For example, if a top layer of the pallet has a lower count of boxes than the other layers of the pallet, then there may be a discrepancy (e.g., a missing box, improper packaging, damaged box, etc.). In another example, some pallets may a top layer that intentionally has a smaller quantity of boxes than the other layers of the pallet, such as a pallet with two extra boxes thrown on the top (instead of shipping those two boxes as a separate pallet). The module is configured to count the number of boxes (or other items) that are part of such a non-uniform top layer, which may, in some instances, can be more difficult to accurately determine due to, for example, shrink wrap deformities. When factors like this (e.g., non-uniform top layer with shrink wrap deformities) potentially impacting accurate box counts are detected, the confidence level for the count of such layers can be lower than the confidence for a uniform pallet layer. As a result, when the module determines that there is non-uniform number of boxes on a layer, the module can assign the quantity determination for that layer a low confidence value in step 1408. On the other hand, if the module determines that there is a uniform number of boxes per layer, then the module can assign the quantity determination a high confidence value in step 1406.

Figure 15A:
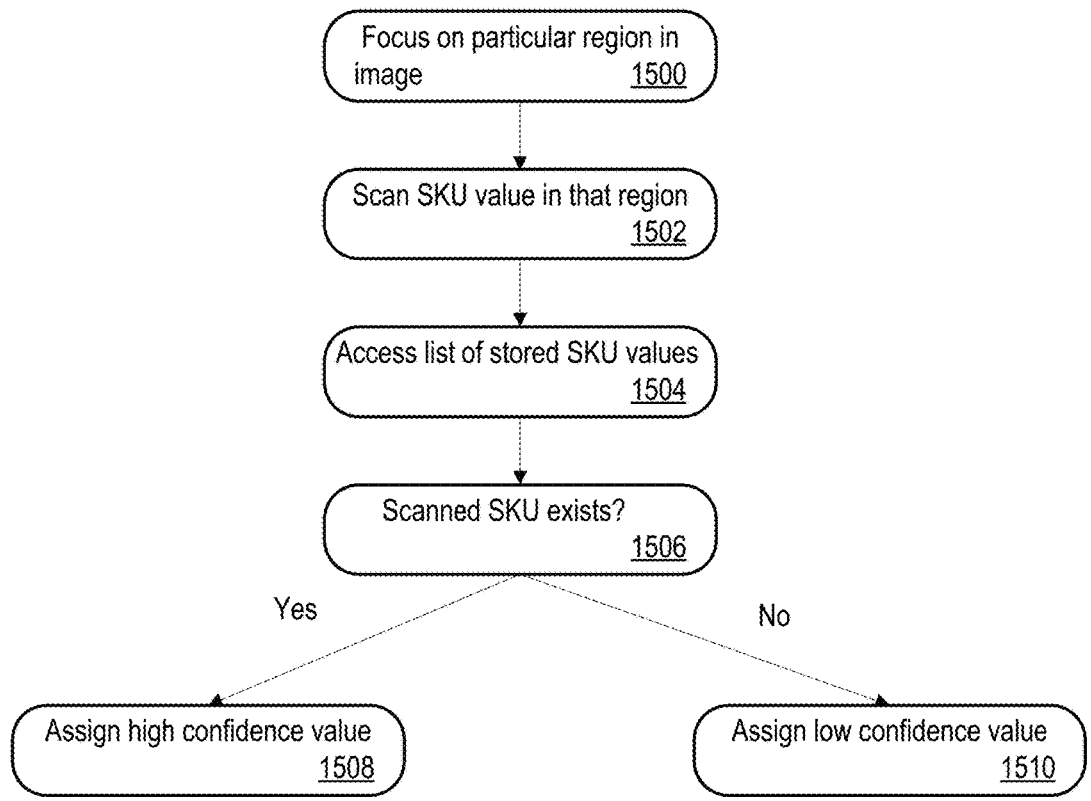
FIG. 15A is a flowchart that shows an example process for scanning an SKU and determining a confidence value.

FIG. 15A is a flowchart that shows an example process for scanning an SKU and determining a confidence value. FIG. 15A corresponds to FIG. 5, step 512. The SKU scanning module as described throughout this disclosure can focus on a particular region in an image from the batch of images in step 1500. The particular region in the image that is focused on is the particular region identified by the training model in which an SKU is most likely to appear, as previously discussed. Once the module focuses on the particular region, for example, it scans an SKU value in that region in step 1502. The module can then access a list of stored SKU values in step 1504, for example. The list of SKU values can be stored in the warehouse management system and/or the inventory management system, as described throughout this disclosure. The list of SKU values can be based on historic data/identified parameters, for example.

In step 1506, the module determines whether the scanned SKU value exists in the list of stored SKU values. An SKU that has been successfully identified many times, for example, can be on the list with a higher frequency and therefore result in a higher confidence value. Consequently, if the scanned SKU value exists in the list of stored SKU values, then the module can assign a high confidence value to the scanned SKU value (step 1508). If, on the other hand, the SKU scanning module only identified an SKU once and/or the scanned SKU does not appear in the list of stored SKU values, for example, then the module can assign a low confidence value to the scanned SKU value (step 1510). In other words, that scanned SKU value may not exist in association with some pallet, supplier, client, and/or product, and the SKU scanning module may have made an error in scanning the SKU in one or more images in the batch.

Figure 15B:
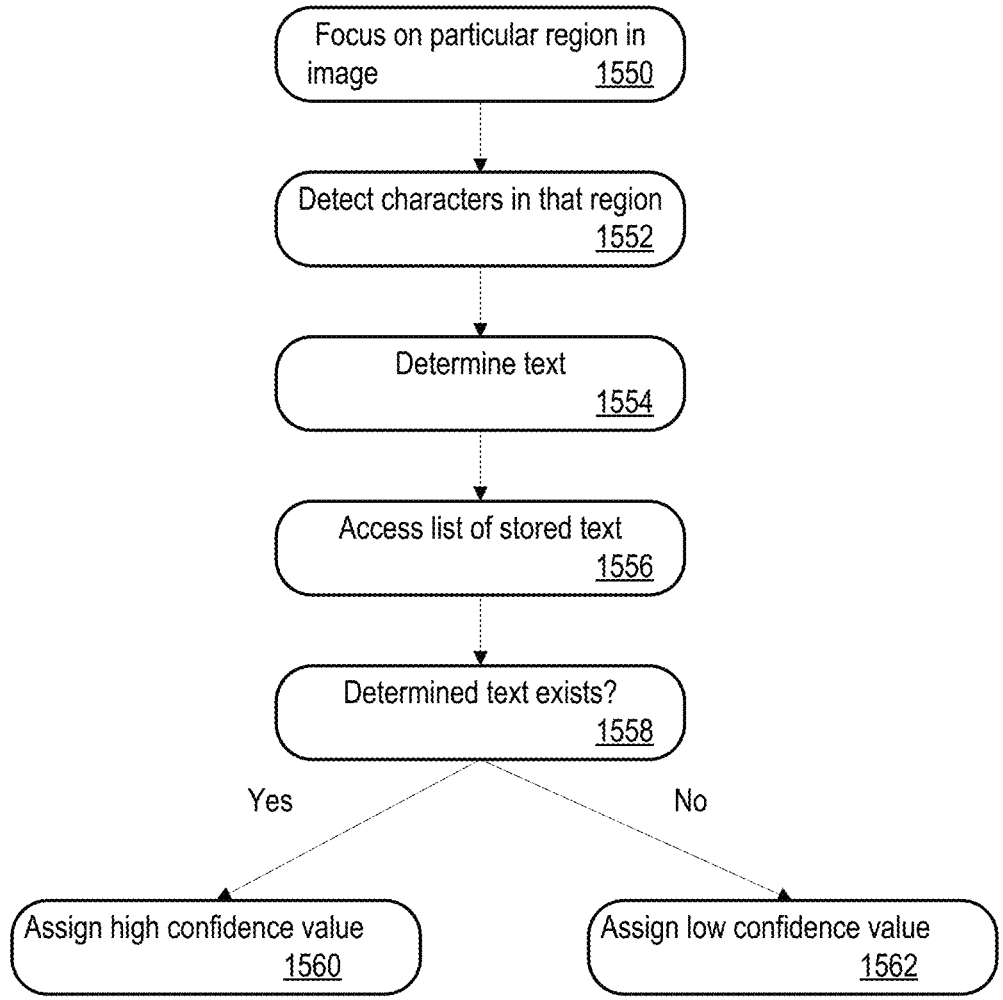
FIG. 15B is a flowchart that shows an example process for performing optical character recognition and determining a confidence value

FIG. 15B is a flowchart that shows an example process for performing optical character recognition and determining a confidence value. FIG. 15B corresponds to FIG. 5, step 514. A text recognition module as described throughout this disclosure can focus on a particular region in an image from the batch of images in step 1550. The particular region in the image that is focused on can be the particular region identified by the training model in which text is most likely to appear, as previously discussed. Once the module focuses on the particular region, for example, it can detect one or more characters in that region using known techniques in the industry (step 1552). Using various OCR techniques, for example, the module can determine appropriate text (e.g., words, phrases, sentences) associated with those characters in step 1554.

The module can access a list of stored text values in step 1556. The list of text can be stored in the warehouse management system and/or the inventory management system, as described throughout this disclosure. The list can be based on historic data/identified parameters and can be associated with existing products, SKUs, barcodes or other identifying information. The text recognition module can search the list of stored text to see whether the determined text already exists (step 1558). If the text does exist in the list of stored text, for example, then the module can assign a high confidence value to the determined text in step 1560. If, on the other hand, the module determines that the text does not exist in the list of stored text, then the module can assign a low confidence value to the determined text in step 1562. For example, if the text recognition module identities a number but does not know what the number is (e.g., a 3 or 8), then the module can search through the list of stored text to see whether the number it identified matches any UPC, barcode, SKU or other value associated with the determined text. If the module finds a textual-based match/association, for example, the confidence value will be high.

Figure 16:
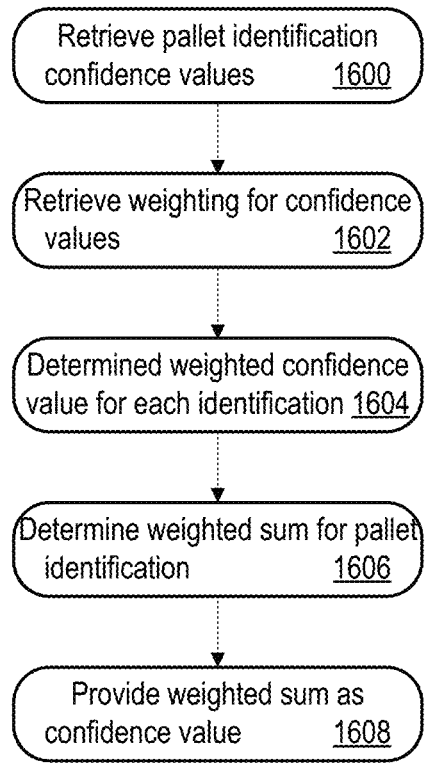
FIG. 16 is a flowchart that shows an example process for determining a combined confidence value for pallet information based on multiple different identification techniques.

FIG. 16 is a flowchart that shows an example process for determining a combined confidence value for pallet information (e.g., pallet content identification) based on multiple different identification techniques, such as barcode/SKU identification (e.g., FIG. 15A), OCR (e.g., FIG. 15B), and/or pallet manifest information (e.g., identification information provided with pallet). Each of these identification techniques may reach independent conclusions about a pallet and its contents. In the event that they reach the same or similar conclusions (e.g., each identification technique identifies the same type of product), then the process described in FIG. 16 can be performed using each of the techniques and their confidence values. If they reach different conclusions, then selection of one or more of the conclusions can be performed, for example, based on the weighted confidence values for each technique (e.g., confidence value multiplied by weight). Multiple selected techniques arriving at the same conclusion can be used to perform the process described in FIG. 16.

Referring to FIG. 16, confidence values for each of the pallet identification techniques, such as barcode/SKU identification, OCR, manifest information, and/or other identification techniques (1600). Weightings for each of these identification techniques can be retrieved (1602). The weight variables for each of these techniques can indicate, for example, the importance of each technique's confidence value and they can be used to emphasize the importance of a specific part of the inputs for an total confidence when assessing the accuracy of the conclusions reached. The weighted confidence value for each identification technique can be performed (1604), which can include, for example, multiplying the confidence value by the corresponding weighting value for each identification technique. A weighted sum can then be generated by combining the weighted confidence values (1606), which can include, for example, aggregating the weighted confidence values. The weighted sum value can then be provided as an combined confidence value indicating the overall confidence of the product identification across multiple techniques (1608).

For instance, in an illustrative example assume that three example product identification techniques barcode identification, OCR identification, and manifest identification have example confidence values: Barcode (BC)—99%, OCR—63%, and Manifest (M)—100%. And assume that example weights for these techniques are 1000× for barcode technique, 1× for the OCR technique, and 100× for the manifest technique on the pallet is read—meaning that the total confidence across these technique would take into account different inputs with varying weights. Applying this example, the resulting combined confidence value would be determined by multiplying the example confidence values (noted above) by the example weights to arrive at the following determination: (1000*BC)+(1*OCR)+(100*M)~=99.999% weighted percentage. Other weighting of different techniques can also be used.

Figure 17:
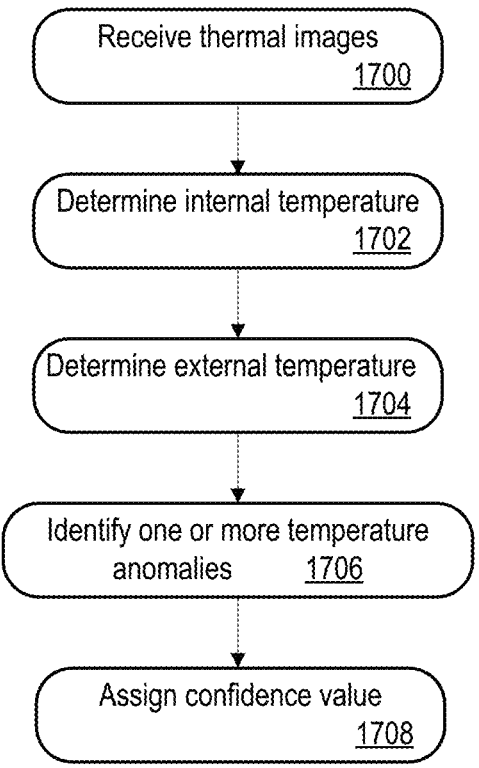
FIG. 17 is a flowchart that shows an example process for determining temperature values of the pallet and a confidence value.

FIG. 17 is a flowchart that shows an example process for determining temperature values of the pallet and a confidence value. FIG. 17 corresponds to FIG. 5, step 516. A temperature module can receive one or more thermal images of the pallet and/or goods located on the pallet from one or more thermal imaging cameras in step 1700. Based on the received thermal images, for example, the module can determine an internal temperature of the pallet/goods in step 1702. The module can determine an external temperature of the pallet in step 1704. Steps 1702 and 1704 can be performed in any order, simultaneously, or at different times, for example. Determining the internal and/or external temperatures can include using one or more physical temperature probes, for example, instead of or in addition to the use of thermal imaging cameras. In some implementations, determining the internal and/or external temperature of the pallet/goods may include identifying a range of temperatures that exist throughout the pallet/goods. For example, the temperature module can determine a minimum temperature of goods on the pallet (e.g., a box that contains cold products), a maximum temperature of goods on the pallet (e.g., a box that contains hot products), and a median temperature of goods on the pallet.

In step 1706, for example, the temperature module can identify one or more temperature anomalies within the pallet/goods. In some implementations, identifying the one or more temperature anomalies may include analyzing collected temperature data associated with the pallets/goods. For example, the temperature module can generate a heat map of the pallet/goods, which can be used to identify anomalous cold spots and/or hot spots (e.g., particular boxes that contain cold products and/or particular boxes that contain hot products), relative to the overall pallet/goods (e.g., based on a standard deviation of temperatures). In some implementations, identifying the one or more temperature anomalies may include accessing a list of existing temperature thresholds. For example, each temperature threshold can be associated with one or more different pallets, products, barcodes, UPC codes, SKUs, and/or other identifying information. Using the list of temperature thresholds, for example, the temperature module can determine whether the determined temperature values fall within one or more of the listed temperature thresholds (e.g., an expected result), or whether the determined temperature values fall outside one or more of the listed temperature thresholds (e.g., an anomalous result). If cold spots and/or hot spots exist with the pallet/goods, for example, the goods can be separated by a warehouse employee and delivered to appropriate temperature-controlled environments.

In step 1708, for example, the temperature module can assign one or more confidence values to the temperature results. If the module determines that the determined temperatures fall within one of the listed temperature thresholds, for example, then the module can assign the determined temperatures high confidence values, whereas if the module does not find that the determined temperatures fall within any of the listed temperature thresholds, then the module can assign the determined temperatures low confidence values. As another example, the confidence value can be indicative of whether or not the temperature module determines that the various temperature sensors (e.g., thermal cameras and/or physical probes) are calibrated correctly, based on cross-checking the sensor readings of multiple sensors, or another suitable technique.

Figure 18A:
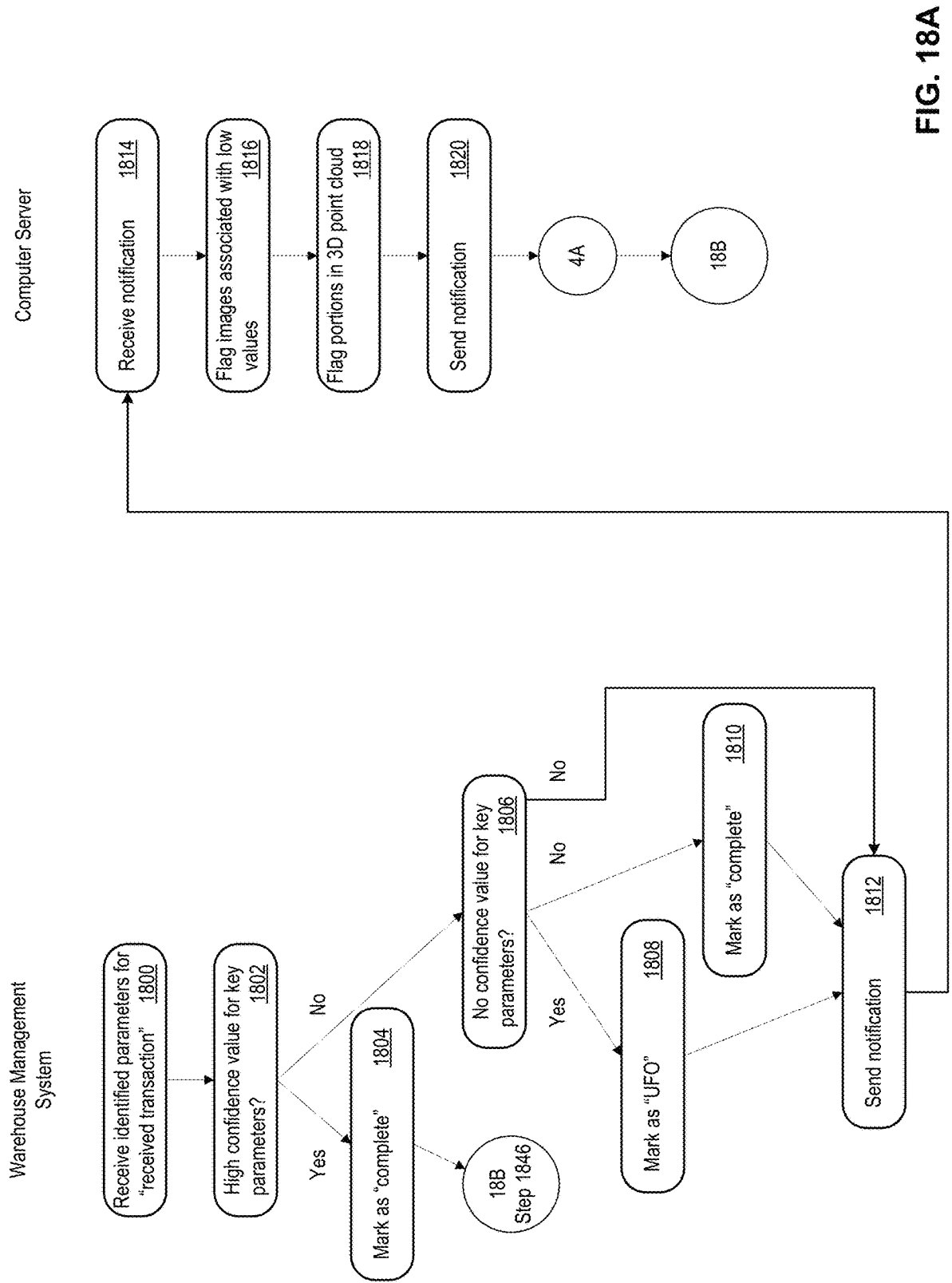
FIG. 18A is a flowchart that shows an example process for determining whether a pallet is ready to be moved throughout the warehouse.

FIG. 18A is a flowchart that shows an example process for determining whether a pallet is ready to be moved throughout the warehouse. First, the warehouse management system receives one or more identified parameters for a pallet that has been initially marked as "received transaction" (step 1800). The one or more identified parameters includes an associated confidence value which can be used by the warehouse management system to determine whether the pallet can be moved throughout the warehouse. A "received transaction" can be a pallet that has been unloaded into the warehouse from a truck and placed on a conveyor belt. Next in step 1802, the warehouse management system can determine whether one or more key identified parameters have high confidence values. Some key parameters that would require a high confidence value include an inventory owner (which can be identified via an accurate barcode scanning in some implementations), SKU, height, whether there is a lean to the pallet 114, and/or a quantity of boxes (e.g., item(s) 102) on the pallet 114. Each warehouse management system can determine which parameters are required to have high confidence values before the system can determine that the pallet can be moved throughout the warehouse.

If the warehouse management system determines that one or more key identified parameters have high confidence values, then the system can mark the pallet as "complete" in step 1804. The warehouse management system then can proceed with step 1846 in FIG. 18C. A confidence value can be considered 90% or above. So, for example, if one or more key identified parameters, such as a barcode, lean, and/or height have corresponding confidence values that are 90% or above, the warehouse management system can update the associated pallet from "received transaction" to "complete."

If, on the other hand, the warehouse management system determines that one or more key parameters have low confidence values, then the system can determine whether the key parameters even have confidence values in step 1806. The system determines that a key parameter has no confidence value if the confidence value does not exist (e.g., is 0%) or the confidence value exists but is below 80%. If the confidence value is 80% or below, then the system can mark the associated pallet as a "UFO" or "Unidentified Frozen Object" in step 1808. The UFO indication means that one or more parameters (whether key or not) were not successfully identified, and as a result, the associated pallet is not "complete" nor ready to be moved throughout the warehouse. When a pallet is marked as a "UFO," the system further sends a notification in step 1812 which is received at the computer server described throughout this disclosure (step 1814).

After step 1806, if the warehouse management system determines that one or more key parameters have confidence values but those confidence values are not high (e.g., the confidence values are between 80% and 90% and therefore considered low confidence values), then the system can mark the associated pallet as "complete" in step 1810 or leave the associated pallet marked as "received transaction" and instead immediately send a notification to the computer server in step 1812. The system may choose to skip step 1810 and immediately send a notification in step 1812 if, for example, the system determines that there are one or more low confidence values for one or more identified parameters, such as damage. If there is damage to the pallet, the system may determine that the pallet's damage should be addressed and assessed by the user in the warehouse before the pallet can be marked as "complete" and ready to be moved throughout the warehouse. The damage, for example, may make it challenging and/or even impossible to move the pallet around the warehouse, and therefore would require fixing before the pallet can be marked as "complete" and moved throughout the warehouse.

When the pallet is marked as "complete" it is ready to be moved throughout the warehouse. The system can then send a notification to the computer server in step 1812, which the computer server receives in step 1814. The computer server can flag one or more images in the batch of images that were used to identify particular parameters but resulted in low confidence values in step 1816. The one or more flagged images can include images in which a barcode and/or label is partly or fully obscured by shrink wrap or has faded ink, and/or images in which one or more boxes are damaged and/or missing. The computer server can also flag a particular portion of a 3D point cloud of the pallet where a parameter was identified with a low confidence value in step 1818. Steps 1816 and 1818 can be performed in any order, simultaneously, or at different times by the computer server.

Once one or more images and/or the 3D point cloud structure of the pallet are flagged by the server, a notification can be sent in step 1820 to the user computing device, as described previously. Refer to FIG. 4A for discussion of outputting the associated pallet profile on the user computing device and receiving user input. The user can view identified parameters with low confidence values (e.g., if the pallet was marked as "complete" in step 1810) and parameters with no confidence values (e.g., if the pallet was marked as "UFO" in step 1808). The user at the computing device can then input values to correct one or more of the parameters. The user can base his/her inputted values upon manual inspection of the pallet (e.g., which can be performed by a user when the pallet is marked as "UFO" in step 1808) and/or viewing the one or more flagged images and/or portions in the 3D point cloud (e.g., which can be performed by a user when the pallet is marked as "complete" in step 1810). The user can also access information stored by the warehouse management system, such as a list of possible barcodes and/or other parameters/information, to search and find a match with one or more of the parameters. Once the steps in FIG. 4A are completed, the computer server can communicate with the warehouse management system through FIG. 18A.

Figure 18B:
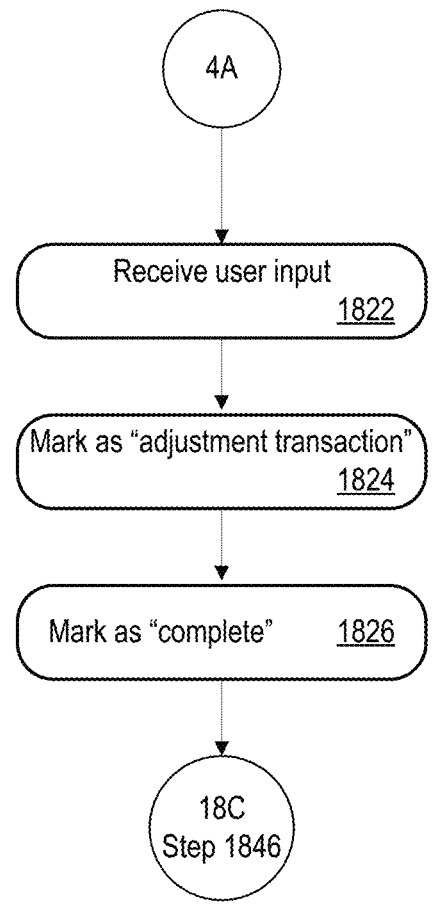
FIG. 18B-C are flowcharts that show example processes for marking a pallet as ready for travel throughout the warehouse.
Figure 18C:
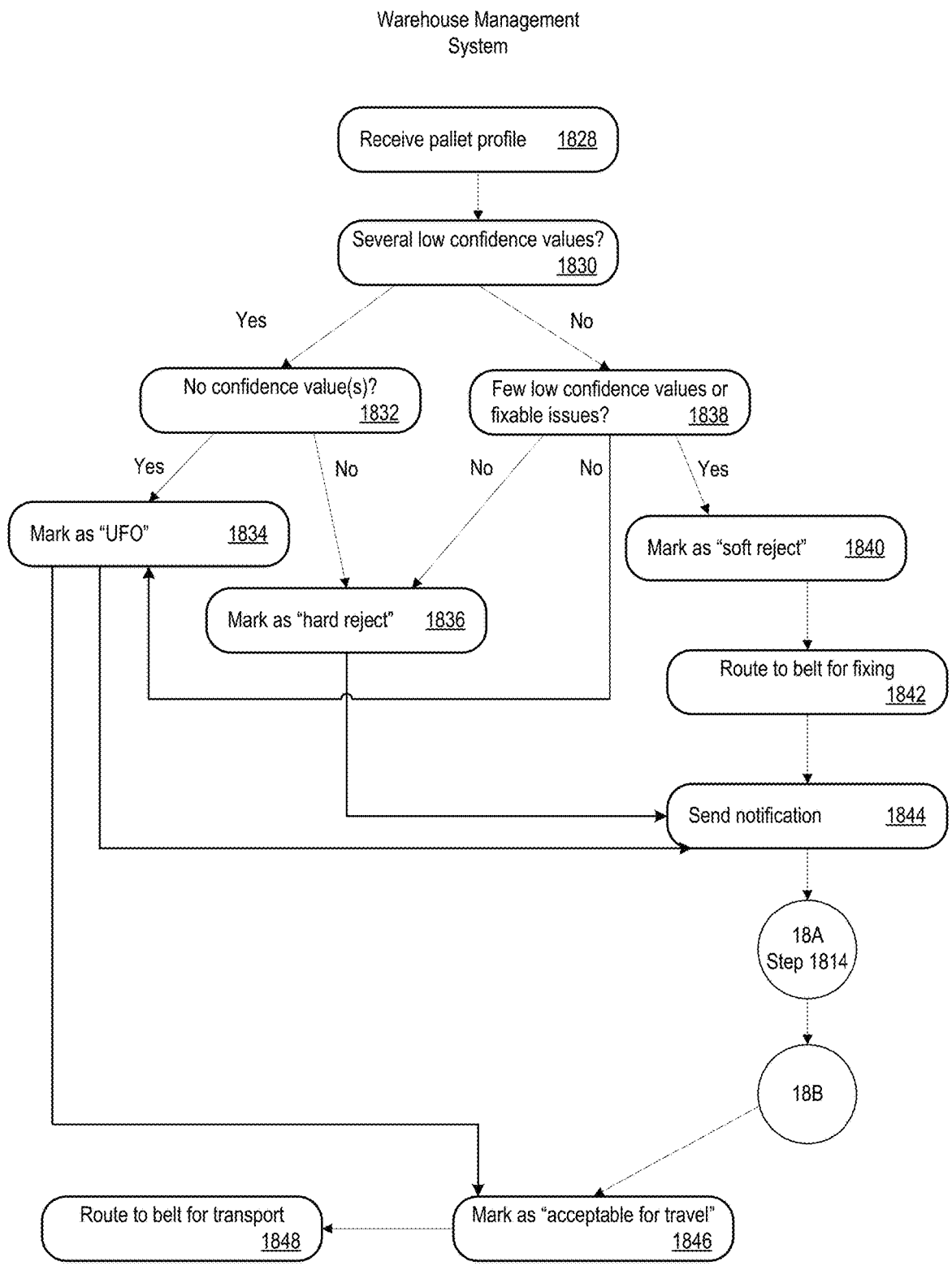

FIGS. 18B-C are flowcharts that show example processes for marking a pallet as ready for travel throughout the warehouse. In particular, FIG. 18B depicts a process for marking a pallet as ready for travel throughout the warehouse based on user input. Once the user inputs any corrections to one or more parameters with low confidence values, the warehouse management system receives those user inputs in step 1822. The system can then mark the associated pallet as "adjustment transaction" in step 1824. "Adjustment transaction" indicates that one or more parameters were not accurately identified by the computer server and/or had low confidence values and therefore required user review and input. Once the associated pallet is marked as "adjustment transaction," the associated pallet can also be marked as "complete" in step 1826. The warehouse management system then can proceed to step 1846 in FIG. 18C.

When the warehouse management system marks a pallet as "adjustment transaction" in step 1824, the system can also notify the computer server (not depicted). Upon notifying the computer server that the user input(s) is acceptable, the computer server can use the user inputs to improve one or more training models that teach each of the modules comprising the computer server how to accurately identify the parameters with high confidence values.

FIG. 18C depicts a process for routing a pallet to a conveyor belt for transport throughout the warehouse. Once all the parameters associated with a pallet are identified and stored in a pallet profile in the pallet information database as previously described, the warehouse management system can receive that pallet profile (step 1828). The warehouse management system can use the parameters in the pallet profile to determine whether the pallet should be classified as a "hard reject," "soft reject," "UFO," and/or "acceptable for travel." The warehouse management system can determine in step 1830 whether there are several low confidence values. If there are several low confidence values, then the system can determine whether there are no confidence values associated with one or more parameters in step 1832. If there are no confidence values associated with one or more parameters, then the system can mark the pallet as "UFO" in step 1834. Once the pallet is marked as "UFO," the system can either send a notification to the computer server in step 1844 or mark the pallet as "acceptable for travel" in step 1846.

If the system sends a notification to the computer server in step 1844, then the computer server proceeds with step 1814 in FIG. 18A. After going through the steps 1814-1820 in FIG. 18A, for example, the warehouse management system can receive the user input in FIG. 18B. Once the steps 1822-1826 are completed in FIG. 18B, for example, the warehouse management system can proceed with step 1846 in FIG. 18C. In step 1846, the pallet can be marked as "acceptable for travel" and then the pallet can be routed to a conveyor belt that sends the pallet off for transport throughout the warehouse (step 1848).

If, on the other hand, the system immediately marks the "UFO" pallet as "acceptable for travel" in step 1846, then the system determined that the pallet can and/or should be moved throughout the warehouse despite it missing one or more confidence values. This is necessary in situations where, for example, a pallet marked as a "UFO" may or does contain frozen goods that require refrigeration while the pallet waits to be manually inspected by a user in the warehouse.

Referring back to step 1832, if there are confidence values associated with one or more parameters but those are low confidence values (e.g., 80% or less), then the warehouse management system can mark the associated pallet as "hard reject" in step 1836. In some implementations, the pallet can be classified as "hard reject" if one or more parameters indicate that there is damage to the pallet, one or more boxes are crushed, and/or there is a leaning load on the pallet. The "hard reject" classification indicates that the pallet is not suitable for travel throughout the warehouse and require some sort of attention. For example, the pallet can be "hard reject" if it has a significant lean. The lean can make increase the risk that one or more items on the pallet fall off the pallet while the pallet is being transported through the warehouse. The lean can also make it more challenging for the pallet to be stored in some area in the warehouse. Therefore, when the pallet is classified as "hard reject," the warehouse management system sends a notification to the computer server in step 1844 and proceeds with the remaining steps in ensuring that a user in the warehouse inspects the pallet and/or its associated profile to fix the issues and make the pallet ready to travel throughout the warehouse.

Referring back to step 1830, if the warehouse management system determines that there are not several low confidence values, then the system must determine whether there are only a few low confidence values and/or one or more issues associated with the pallet that can be fixed (step 1838). In other words, the system must determine whether a few low confidence values will prevent the pallet from being transported throughout the warehouse. For example, a low confidence value for a weight parameter may not be critical to allow for the pallet's movement throughout the warehouse. A low confidence value, on the other hand, for a lean parameter or damage parameter may be critical in preventing the pallet from being moved throughout the warehouse and therefore the associated pallet would most likely be marked as "hard reject" in step 1836. Thus, if the system determines that there are more than a few low confidence values and/or the system determines that one or more issues are not fixable, then the system marks the associated pallet as "hard reject" in step 1836.

In another embodiment, if the system determines that one or more issues can be fixed to allow the pallet for transport throughout the warehouse and/or there are only a few low confidence values, then the system can mark the associated pallet as "soft reject" in step 1840. In some implementations, the pallet can be classified as "soft reject" if one or more parameters indicate that the pallet has a slight lean, trailing plastic/shrink wrap, and/or one or more malformed boxes. A "soft reject" pallet can have some malformation that can be easily fixed by a human operator/user in the warehouse.

Consequently, if the system marks the pallet as "soft reject" in step 1840, the system can then route the pallet to a different belt to be fixed in step 1842. Once the pallet is routed down a different belt, the warehouse management system can send a notification to the computer server in step 1844 as described in detail above. Once the pallet is fixed, it can be routed back onto the conveyor belt represented in FIG. 1 to be scanned and profiled for a second time.

Referring back to FIG. 18C at step 1844, after proceeding through FIGS. 18A and 18B, the pallet can then be marked as "acceptable for travel" by the warehouse management system (step 1846). When the pallet is marked as "soft reject" in step 1840, it can be marked "acceptable for travel" in step 1846 once one or more of the issues and/or low confidence values from the first scanning and profiling are fixed. Thus, when the pallet is scanned and profiled the second time, the one or more issues and/or low confidence values should be resolved, thereby making the pallet ready to be transported throughout the warehouse. In other implementations, the pallet can be marked as "acceptable for travel" if one or more key parameters (e.g., barcode or other identifying information, whether there is damage and/or a lean) are identified with high confidence values. In that situation, it is not required that every parameter be identified and/or have a high confidence value—it is only necessary that the key parameters required to transport the pallet throughout the warehouse are identified with high confidence values.

In other implementations, as previously described in detail above, the pallet can be marked as "acceptable for travel" when the pallet is initially marked as "UFO" in step 1834. A "UFO" pallet can still be "acceptable for travel" because the pallet may comprise frozen goods that require some sort of refrigeration, especially while the pallet is waiting to be manually inspected by a user in the warehouse, wherein the user can resolve any discrepancies in the computer server's identification and or lack thereof of one or more parameters. Therefore, the "UFO" pallet would require being transported to a cold zone in the warehouse in order for it to be manually inspected by the user in the warehouse.

Once a pallet is marked as "acceptable for travel" in step 1846, the warehouse management system can route the pallet on the conveyor belt to a location where a forklift or other warehouse vehicle can then transport the pallet to a storage area in the warehouse (step 1848).

Figure 19:
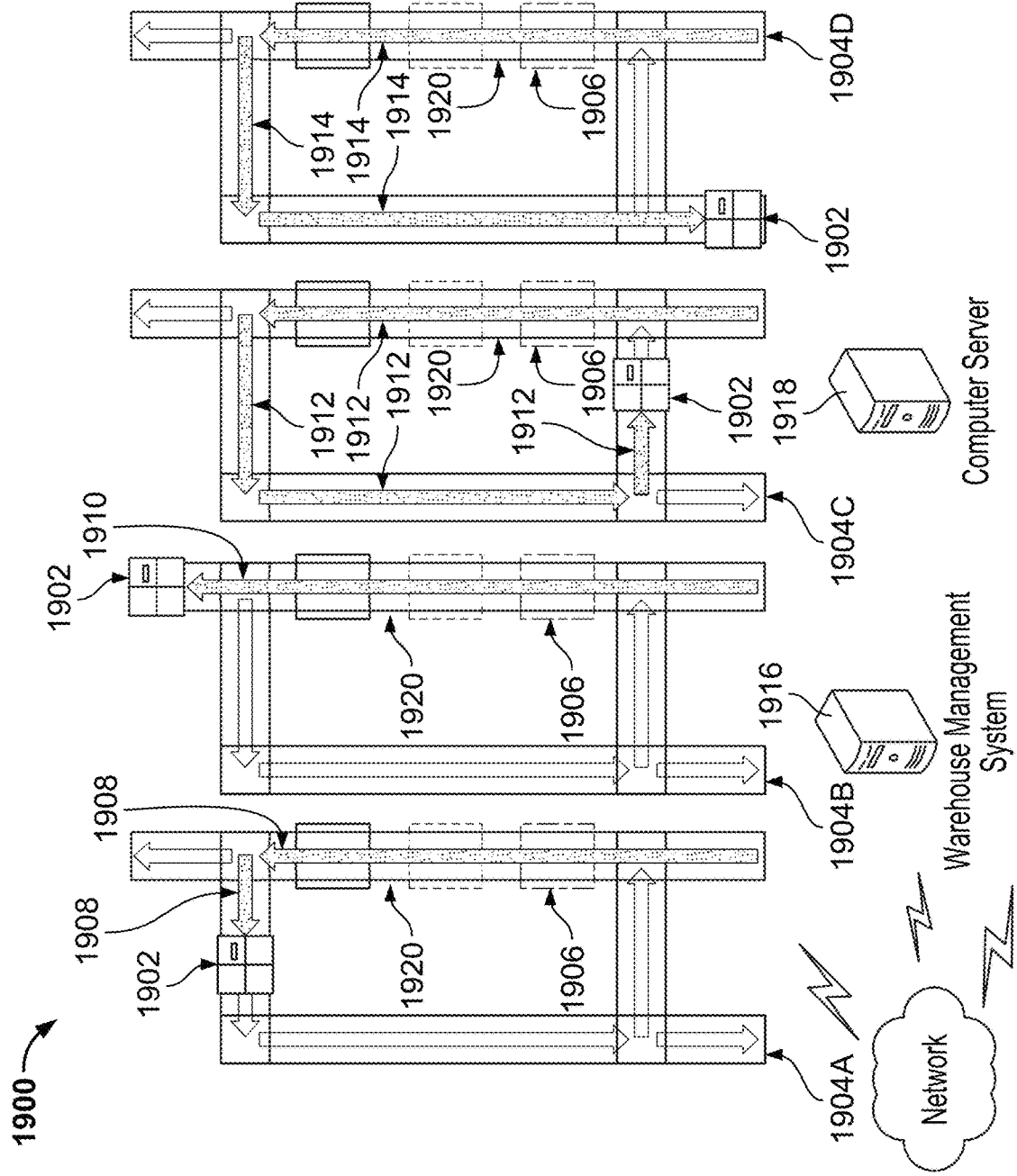
FIG. 19 depicts possible paths that a pallet can take during the process of determining whether a pallet is ready for transport throughout the warehouse.

FIG. 19 depicts possible paths that a pallet can take during the process of determining whether a pallet is ready for transport throughout the warehouse. Warehouse environment 1900 can be a docking area or other area where a pallet 1902 is transported from a truck and into the warehouse. The pallet 1902 is placed on a conveyor belt 1904A-D where it first must proceed through a scanning area 1906. Scanning in the scanning area 1906 is done by a computer server 1918 as described in detail throughout this disclosure. The computer server 1918 communicates wirelessly (e.g., BLU- ETOOTH, WIFI) through a network to a warehouse management system 1916 as described in detail throughout this disclosure. The warehouse management system 1916 receives one or more identified parameters and associated confidence values from the computer server 1918 and then can determine what to mark the pallet 1902 as (e.g., hard reject, soft reject, UFO, acceptable for travel), as described previously. Once this determination is made, the warehouse management system 1916 can also determine what path the pallet 1902 should take. For example, a pallet 1902 that is marked as "hard reject" or "soft reject" follows a path 1908 in which it is routed off a main conveyor belt 1920. Once routed off the main conveyor belt 1920, the pallet can be manually inspected by a human operator/user in the warehouse, rescanned in the scanning area 1906, and/or removed from the system.

A pallet 1902 that is marked as "UFO" or "acceptable for travel" follows a path 1910 in which it continues on the main conveyor belt 1920 to an area where it can then be transported throughout the warehouse. In another implementation, a pallet 1902 that is fixed (e.g., the pallet was marked as "soft reject" and initially sent along the path 1908) can be readmitted for scanning in the scanning area 1906. Therefore, the pallet 1902 would take a path 1912 and be routed back onto the main conveyor belt 1920. In yet another implementation, if a pallet 1902 was marked as "hard reject," it can follow a path 1914 in which it is removed from the scanning system and therefore will not be rescanned in the scanning area 1906 on the main conveyor belt 1920. As described above (e.g., refer to FIGS. 18A-C), a pallet 1902 can also take one or more paths not depicted in FIG. 19.

Figure 20:
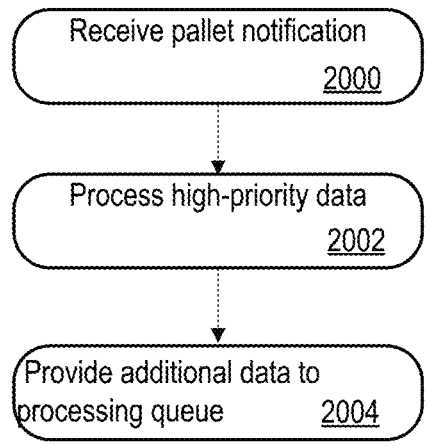
FIG. 20 is a flowchart that shows an example process for prioritizing the processing of time-sensitive data.

FIG. 20 is a flowchart that shows an example process for prioritizing the processing of time-sensitive data. In step 2000, a pallet notification can be received. For example, the computer server 700 (e.g., shown in FIG. 7, and similar to the computer server 110) can receive a notification that images and/or other sensor data has been captured for the pallet 114 and the items 102.

In step 2002, high-priority data can be processed. For example, after a warehouse receives the pallet 114 and the items 102, and captures relevant data using the scanning frame 106, the pallet/items may be transported to another area of the warehouse for further processing and/or storage. In general, high-priority data may include data that facilitates such processing and/or storage, such that the flow of goods throughout the warehouse may be facilitated. For example, information used to slot a pallet/items into a correct location in the warehouse can include item identification information, customer identification information, expiration date information, and/or pallet/item dimensions (e.g., length, height, width, and weight), and other such information. The computer server 700, for example, can prioritize processing the received images and/or other sensor data, such that the relevant information is quickly determined.

In step 2004, additional data can be provided to a processing queue. For example, during receipt of the pallet 114 and the items 102, data that is not used for immediately processing and/or transporting the pallet/items can be provided by the computer server 700 to a processing queue for processing at a time when system resources are not being fully used to facilitate warehouse processes, such as during the middle of the night. Such additional data, for example, can include labeled image data used to train a machine learning model, or other such data.

Figure 21:
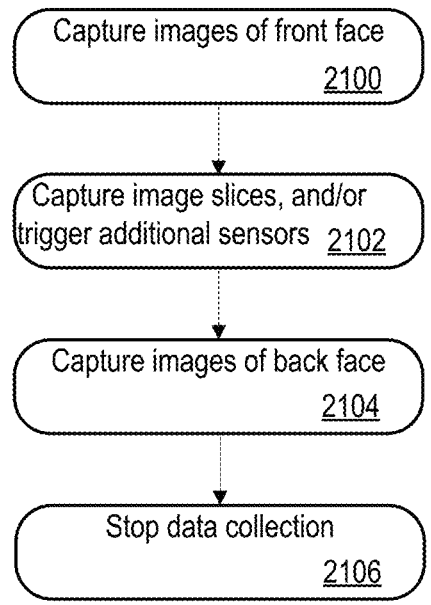
FIG. 21 is a flowchart that shows an example process for capturing different pallet parameters at different time intervals.

FIG. 21 is a flowchart that shows an example process for capturing different pallet parameters at different time intervals. Referring to FIG. 1, for example, as the pallet 114 and the items 102 move along the conveyor belt 104 and through the scanning frame 106, different sensors can be triggered to capture the different pallet parameters. Techniques for capturing different pallet parameters at different time intervals, for example, can include timer-based techniques (e.g., based on a speed of the conveyor belt 104), and/or trigger-based techniques, (e.g., using trigger sensors, as depicted in FIG. 2J).

In step 2100, one or more images can be captured of a front face of the pallet 114 and the items 102. Referring to the example configuration of the scanning frame 200 depicted in FIG. 2J, for example, when the pallet/items are detected by trigger sensor 246A, images can be captured of the front face of the pallet/items. For example, one or more cameras that are attached to the frame 200 (e.g., similar to the cameras 108A-N attached to the scanning frame 106, shown in FIG. 1) and fixed in the current direction of the pallet/items can be activated to capture images. As another example, one or more movable (e.g., rotatable) cameras can be re-oriented in the direction of the pallet/items and can be activated.

In step 2102, one or more image slices can be captured of the pallet/items, and/or additional sensors can be triggered. Referring again to the example configuration depicted in FIG. 2J, for example, when the pallet/items pass through the frame 200 (e.g., the pallet/items are detected by respective trigger sensors 246B-E), images can be captured of the sides of the pallet/items. For example, one or more cameras that are attached to the frame 200 and fixed in the current direction of the pallet/items (and/or other sensors, such as millimeter wave scanners, x-ray scanners, temperature sensors, weight sensors, etc.) can be activated to capture data when the pallet/items pass by the corresponding trigger sensors 246B-E. As another example, one or more movable (e.g., rotatable) cameras can be orientated to follow the pallet/items as it passes through the frame 200, and can be activated at suitable times.

In step 2104, one or more images can be captured of a back face of the pallet 114 and the items 102. Referring again to the example configuration depicted in FIG. 2J, for example, when the pallet/items reach trigger sensor 246N, images can be captured of the back face of the pallet/items. For example, one or more cameras that are attached to the frame 200 and fixed in the current direction of the pallet/items can be activated to capture images. As another example, one or more movable (e.g., rotatable) cameras can be re-oriented in the direction of the pallet/items and can be activated.

In step 2106, data collection for the pallet 114 and the items 102 can be stopped. Referring again to the example configuration depicted in FIG. 2J, for example, after the pallet/items have passes trigger sensor 246N, data collection for the pallet/items can be ended. After ending data collection for the pallet/items, for example, movable cameras may returned to a starting position for collecting data for another pallet/items.

Figure 22A:
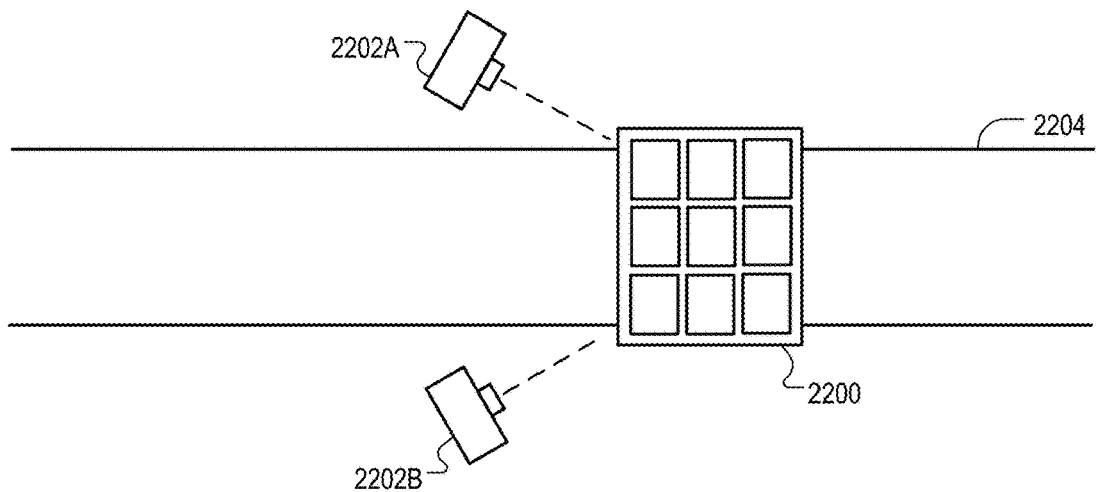
FIGS. 22A-C depicts an example technique for controlling cameras used for capturing images of pallets and goods.
Figure 22B:
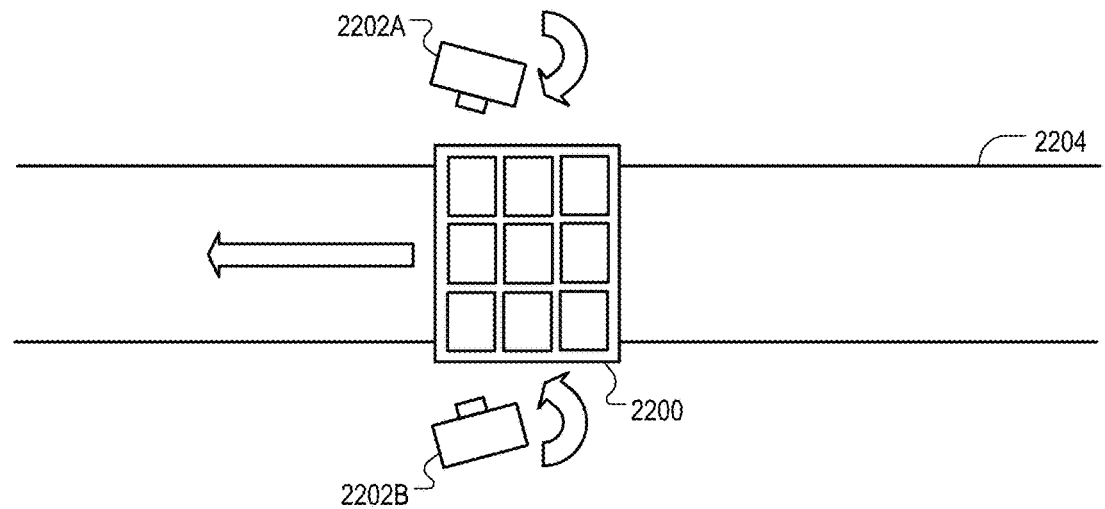
Figure 22C:
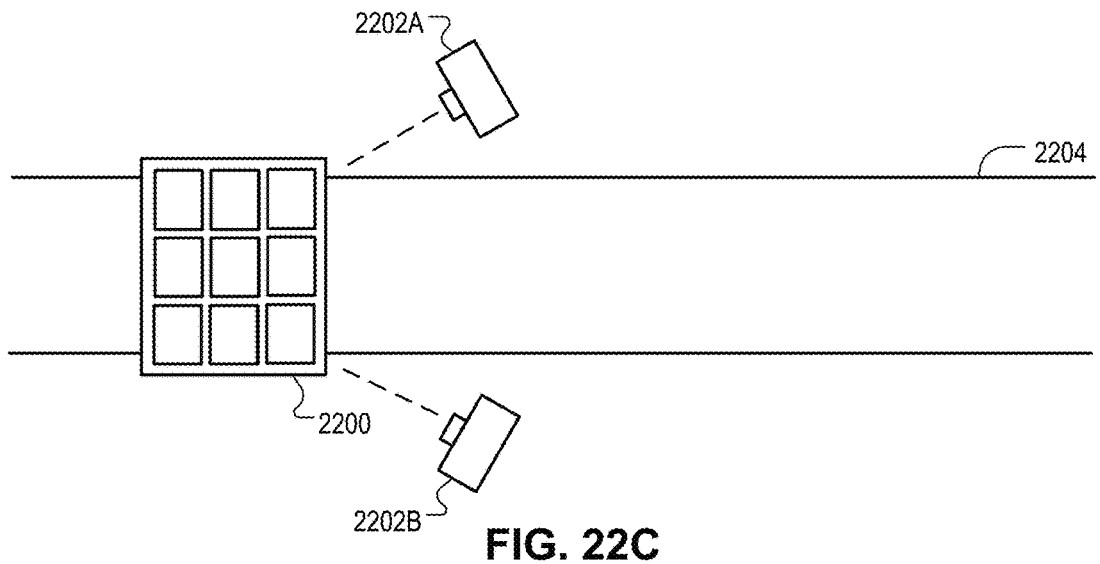

FIGS. 22A-C depicts an example technique for controlling cameras used for capturing images of pallets and goods. Referring to FIG. 22A, for example, as pallet/items 2200 move along conveyor belt 2204, cameras 2202A-B (e.g., positioned on either side of the conveyor belt 2204, attached to or separate from a scanning frame), each the cameras 2202A-B can capture one or more images of a front face of the pallet/items 2200. Capturing images, for example, may be timer-based (e.g., based on a speed of the conveyor belt 2204) and/or trigger-based (e.g., as depicted in FIG. 2J).

Referring now to FIG. 22B, as the pallet/items 2200 pass by the cameras 2202A-B, for example, the cameras 2202A can stop capturing images, and can be rotated into position for capturing one or more images of a back face of the pallet/items. As another example, the cameras 2202A-B can continue to capture images as the cameras are rotated. Referring now to FIG. 22C, the cameras can capture images of the back face of the pallet/items when the pallet/items are in a suitable position.

Figure 23A:
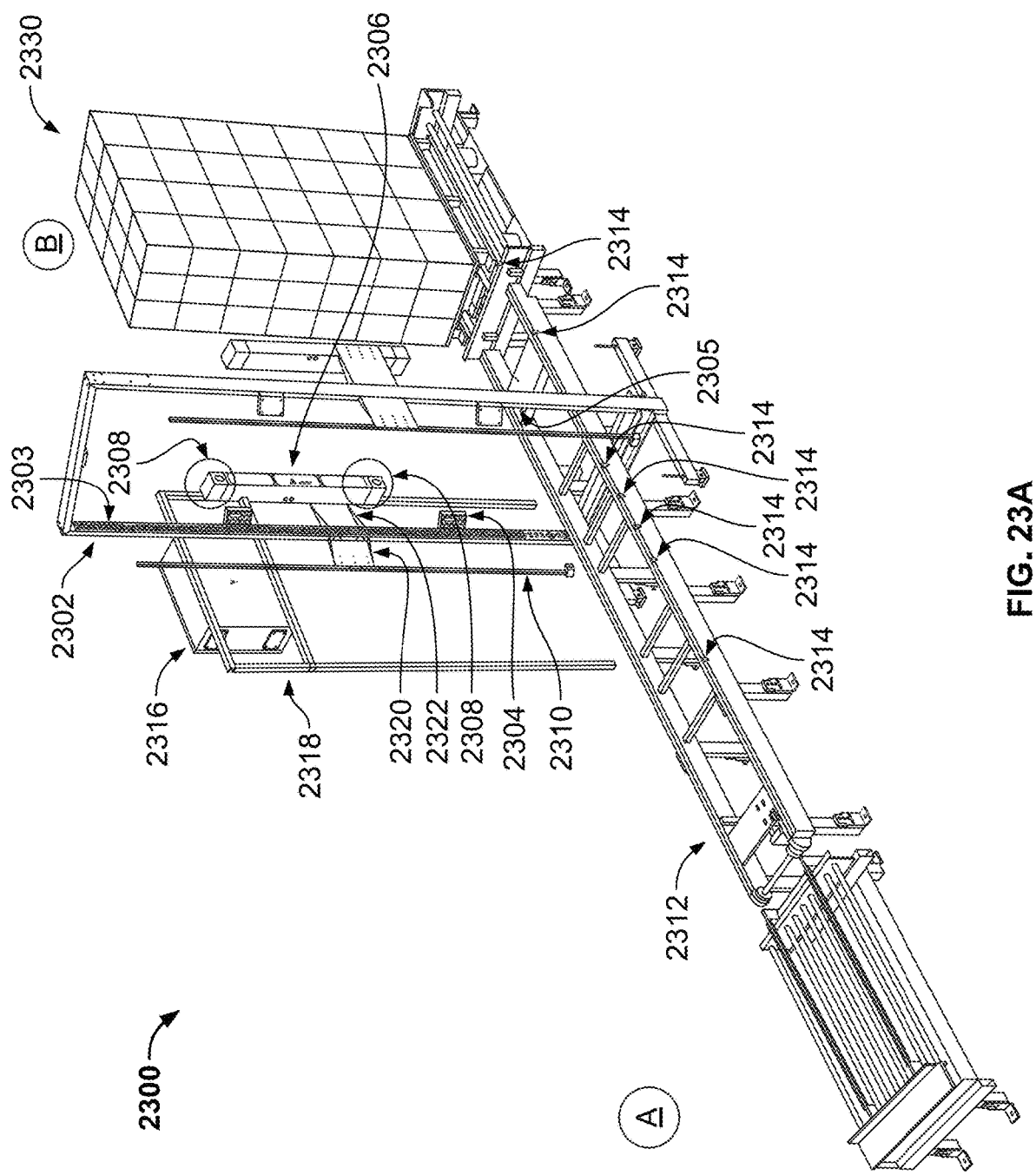
FIGS. 23A-D provide different views of an example pallet profiling apparatus that can be used to capture pallet details that are used to determine pallet information.
Figure 23B:
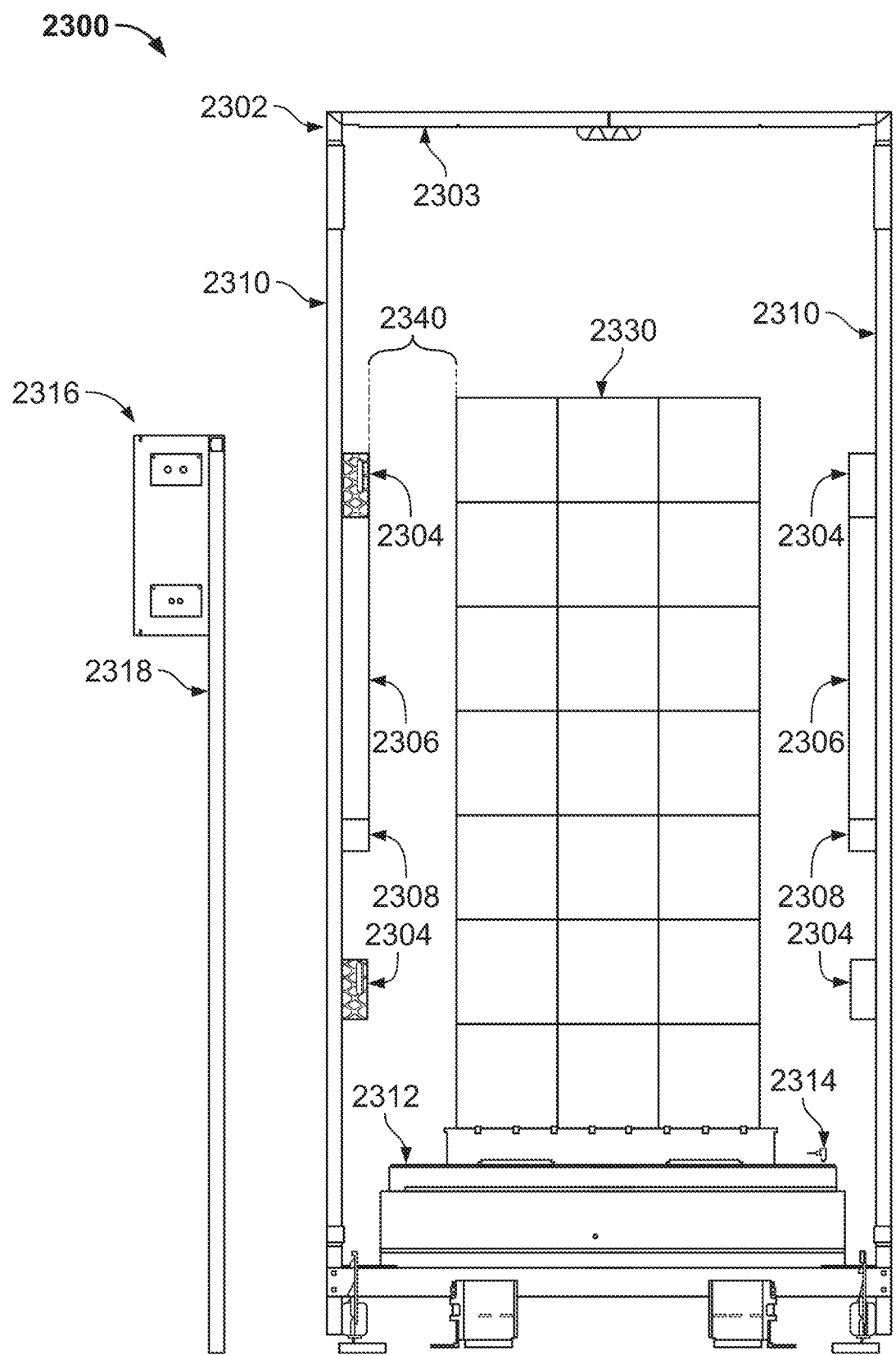
Figure 23C:
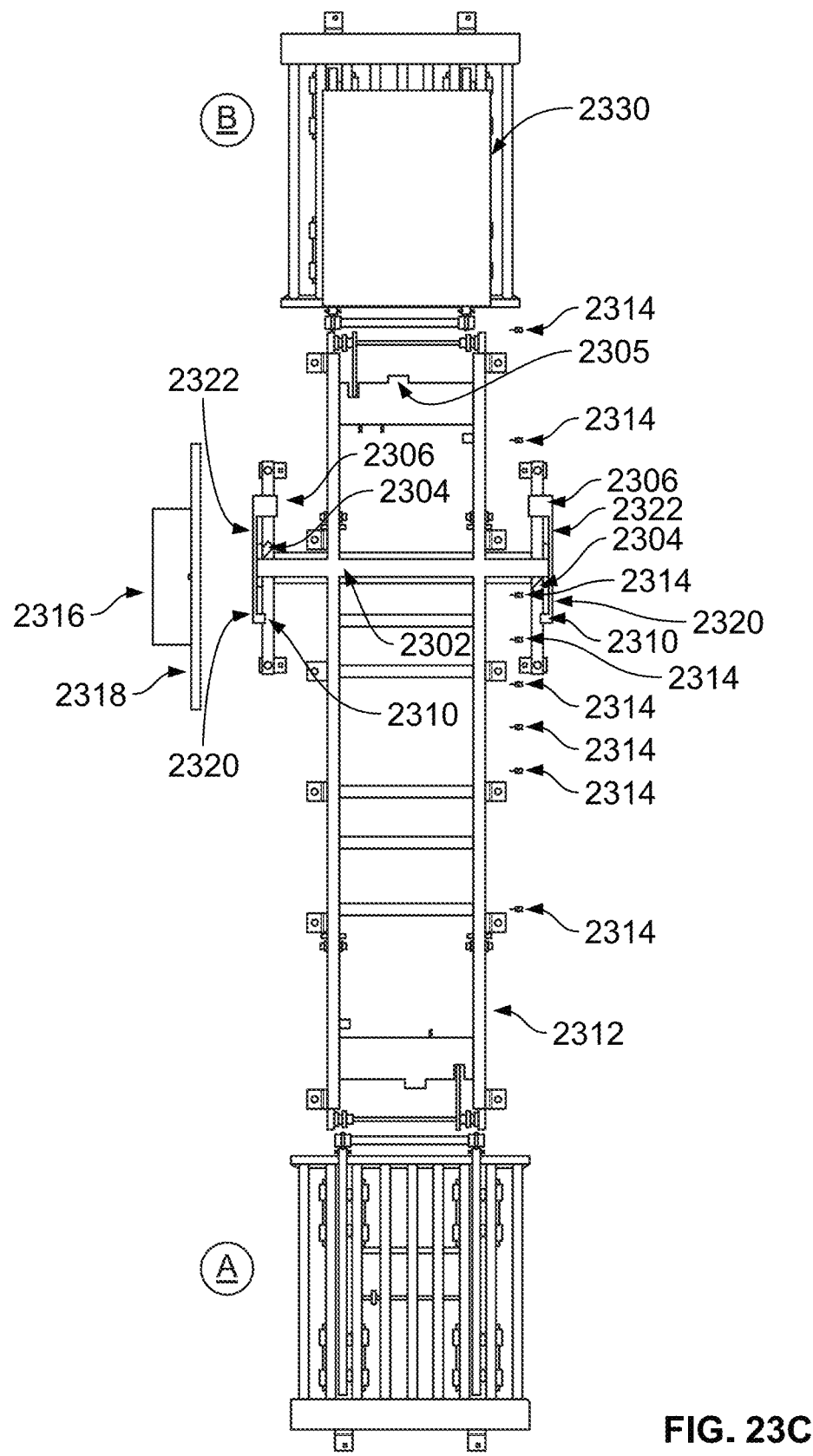
Figure 23D:
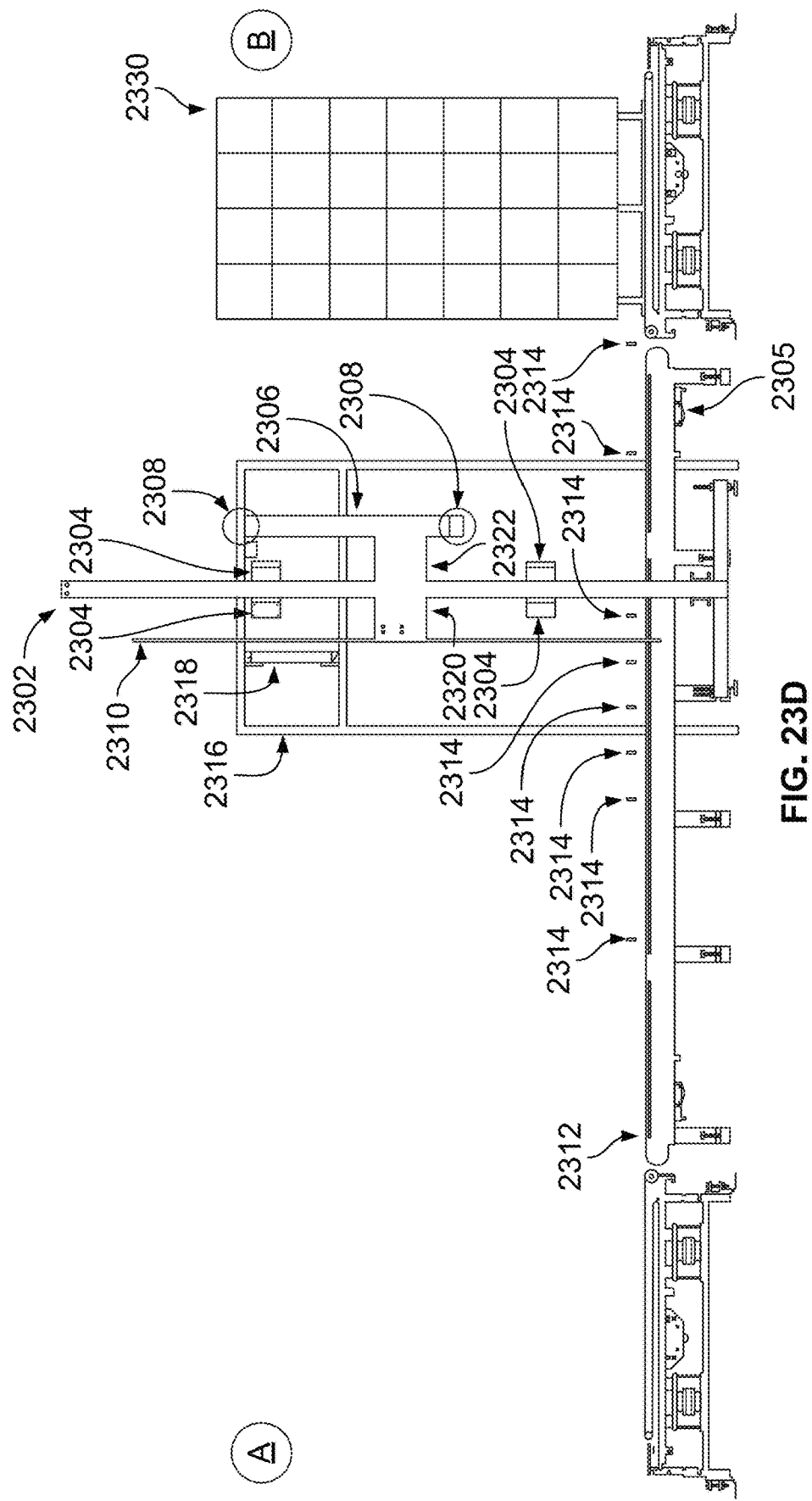

FIGS. 23A-D provide different views of an example pallet profiling apparatus 2300 that can be used to capture pallet details that are used to determine pallet information. FIG. 23A provides a perspective view, FIG. 23B provides a front view, FIG. 23C provides a top down view, and FIG. 23D provides a side view of the pallet profiling apparatus 2300. Some or all of the features of the pallet profiling apparatus 2300 are similar to those described above and depicted in the other Figures (e.g., FIGS. 2A-J), and the pallet profiling apparatus 2300 can be used in combination with the pallet information determination techniques, systems, and other devices described above.

The pallet profiling apparatus 2300 includes a frame 2302 to which cameras 2303 are affixed around the interior perimeter in order to capture images of the top and sides of the pallet 2330. Another set of cameras are provided on paddles 2304 that are mounted to and extend at an angle from the frame 2302. Four sets of paddles 2304 can be provided, with two sets on each lateral side of the frame 2302 at differing heights and with each set including a forward angled paddle (angled toward an exit end B of the apparatus 2300) and rearward angled paddle (angled toward an entrance end A of the apparatus 2300). The cameras 2303 and 2304 can be fixed (e.g., non-rotatable, non-movable).

Another set of cameras 2308 can be contained within a housing 2306. The cameras 2308 can be rotatable and, in some instances, may be higher resolution cameras than the cameras 2303 affixed to the inner perimeter of the frame 2303 and/or the cameras provided on the angled paddles 2304. The housing 2306 can be mounted to and extend longitudinally from frame 2302 via a mounting arm 2322. The cameras 2308 can be similar to those described above with regard to FIGS. 22A-C.

Another camera (or set of cameras) 2305 is provided on the conveyor 2312 and is angled upward to capture images of the pallet frame as it passes overhead. The camera 2305 can be pointed upward and/or angled (e.g., perpendicular to longitudinal direction of pallet movement along conveyor 2312, provided at forward and/or backward angle that is offset from perpendicular) so as to capture sufficient detail for the pallet frame.

The pallet profiling apparatus 2300 also includes light sources 2310 that are mounted to and extend longitudinally from the frame 2302 via another mounting arm 2320. The light sources 2310 can extend along substantially the entire vertical opening of the frame 2302 (vertical span between the top surface of the conveyor 2312 and the top bar of the frame 2302).

The pallet profiling apparatus 2300 also includes a local control box 2316 mounted to a frame 2318. The local control box 2316 can include a programmable logic controller (PLC) along with other components, and can control the operation of the apparatus 2300 and its components (e.g., control when and which cameras capture images of the pallet 2330 at various points along its progression from end A to end B along the conveyor 2312, control illumination and levels thereof with light sources 2310, control speed for the conveyor 2312, etc.). The local control box 2316 can use, for example, signals from photo eyes 2314 positioned along the conveyor 2312 that are triggered by the pallet 2330 as it progresses along the conveyor 2312. Each photo eye 2314 can send a message to the PLC that, in turn, notifies some or all of the cameras and/or micro computer components (that are part of the apparatus 2300) to capture their images and info for the pallet 2300.

The relative positioning and spacing of components of the apparatus 2300 can provide various advantages. For example, the paddles 2304 and the housing 2306 can extend inward from the frame 2302 so as to be able to better capture, for example, images of the front and back of the pallet 2330. However, the amount by which the paddles 2304 and the housing 2306 extend inward can be limited so as to permit at least a threshold spacing 2340 between their inner most surface and the lateral sides of the pallet 2330, so as to avoid collisions between the pallet 2330 and the apparatus 2300.

In another example, the use of multiple paddles 2304 and cameras 2308 on each lateral side of the frame 2302 that are vertically separated from each other can permit for the apparatus 2300 to sufficiently capture images of every pallet regardless of the pallet's height, while at the same time minimizing the size of the apparatus 2300 and its frame. If one paddle 2304 and/or camera 2308 were to be used, the frame 2302 would need to be much larger in order to provide sufficient field of view to capture the entirety of each pallet 2330. By using multiple, vertically spaced cameras 2304 and 2308, the compactness of the frame 2302 can be achieved while still capturing images of the entirety of the pallet 2330.

In another example, by longitudinally offsetting the positioning of light source 2310 relative to the cameras 2303, 2304, and 2308, the apparatus can achieve sufficient and consistent illumination of the pallet 2330 without problems that may be associated with a light source positioned at the camera location (e.g., washout, glare, reflections, etc.). Furthermore, by having the light source 2310 extend from the frame 2302 opposite the housing 2306 and cameras 2308 can provide sufficient illumination of both the front and back of the pallet 2330 while minimizing potential illumination problems, such as reflections, washout, and glare.

In another example, by providing varied image capture systems—frame mounted cameras 2303, angled paddle cameras 2304, rotatable high resolution cameras 2308, and frame cameras 2305—the apparatus 2300 can provide redundant and robust pallet profiling that can accurately determine pallet information across a wide range of pallets (e.g., varied pallet sizes, pallet contents, pallet damage, etc.).

Figure 24:
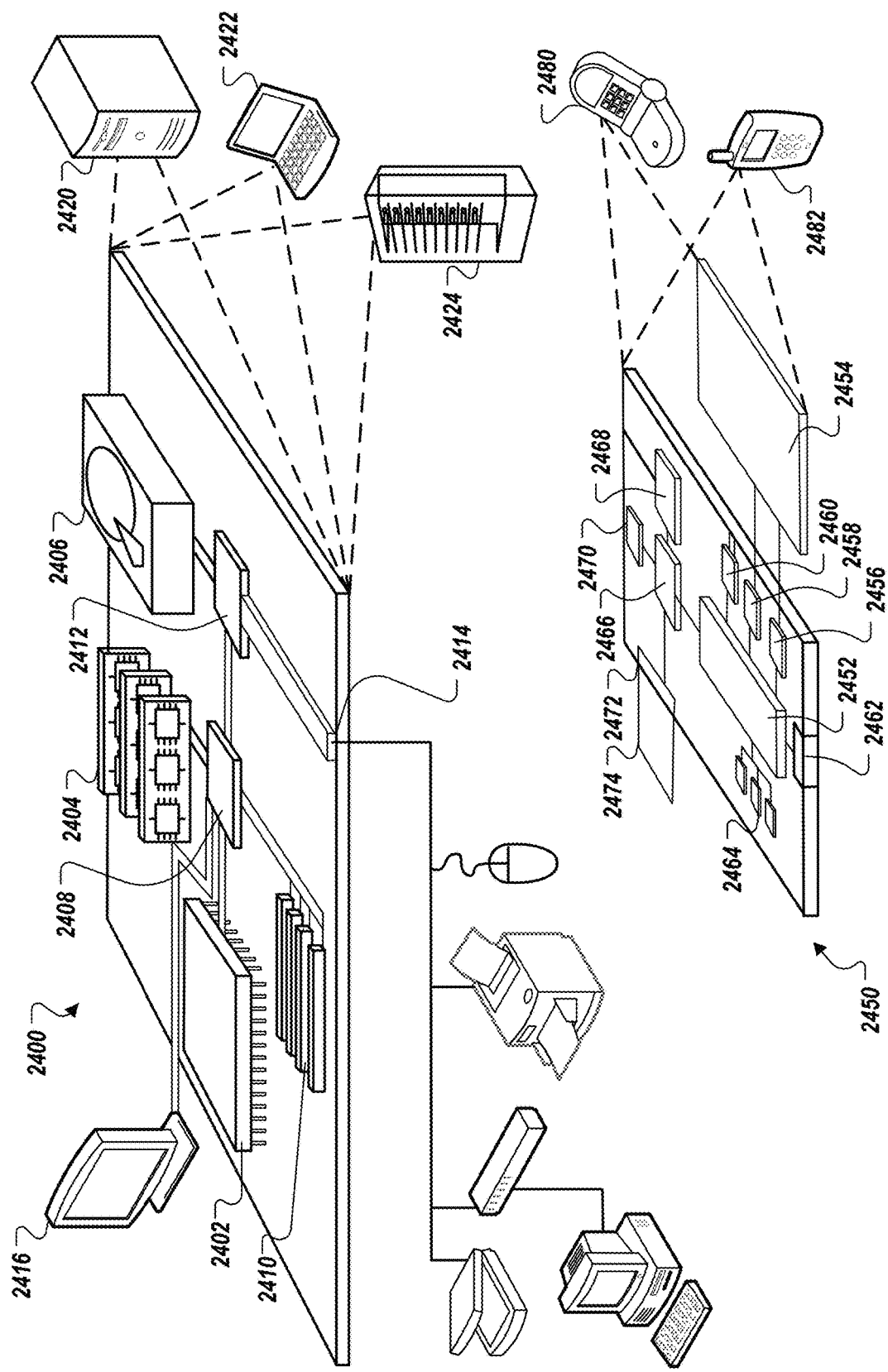
FIG. 24 is a block diagram of example computing devices that may be used to implement the systems and methods described in this document.

FIG. 24 is a block diagram of computing devices 2400, 2450 that may be used to implement the systems and methods described in this document, as either a client or as a server or plurality of servers. Computing device 2300 is intended to represent various forms of digital computers, such as laptops, desktops, workstations, personal digital assistants, servers, blade servers, mainframes, and other appropriate computers. Computing device 2350 is intended to represent various forms of mobile devices, such as personal digital assistants, cellular telephones, smartphones, and other similar computing devices. Additionally, computing device 2400 or 2450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be example only, and are not meant to limit implementations described and/or claimed in this document.

Computing device 2400 includes a processor 2402, memory 2404, a storage device 2406, a high-speed interface 2408 connecting to memory 2404 and high-speed expansion ports 2410, and a low speed interface 2412 connecting to low speed bus 2414 and storage device 2406. Each of the components 2402, 2404, 2406, 2408, 2410, and 2412, are interconnected using various busses, and may be mounted on a common motherboard or in other manners as appropriate. The processor 2402 can process instructions for execution within the computing device 2400, including instructions stored in the memory 2404 or on the storage device 2406 to display graphical information for a GUI on an external input/output device, such as display 2416 coupled to high speed interface 2408. In other implementations, multiple processors and/or multiple buses may be used, as appropriate, along with multiple memories and types of memory. Also, multiple computing devices 2400 may be connected, with each device providing portions of the necessary operations (e.g., as a server bank, a group of blade servers, or a multi-processor system).

The memory 2404 stores information within the computing device 2400. In one implementation, the memory 2404 is a volatile memory unit or units. In another implementation, the memory 2404 is a non-volatile memory unit or units. The memory 2404 may also be another form of computer-readable medium, such as a magnetic or optical disk.

The storage device 2406 is capable of providing mass storage for the computing device 2400. In one implementation, the storage device 2406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2404, the storage device 2406, or memory on processor 2402.

The high speed controller 2408 manages bandwidth-intensive operations for the computing device 2400, while the low speed controller 2412 manages lower bandwidth-intensive operations. Such allocation of functions is example only. In one implementation, the high-speed controller 2408 is coupled to memory 2404, display 2416 (e.g., through a graphics processor or accelerator), and to high-speed expansion ports 2410, which may accept various expansion cards (not shown). In the implementation, low-speed controller 2412 is coupled to storage device 2406 and low-speed expansion port 2414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2400 may be implemented in a number of different forms, as shown in the figure. For example, it may be implemented as a standard server 2420, or multiple times in a group of such servers. It may also be implemented as part of a rack server system 2424. In addition, it may be implemented in a personal computer such as a laptop computer 2422. Alternatively, components from computing device 2400 may be combined with other components in a mobile device (not shown), such as device 2450. Each of such devices may contain one or more of computing device 2400, 2450, and an entire system may be made up of multiple computing devices 2400, 2450 communicating with each other.

Computing device 2450 includes a processor 2452, memory 2464, an input/output device such as a display 2454, a communication interface 2466, and a transceiver 2468, among other components. The device 2450 may also be provided with a storage device, such as a microdrive or other device, to provide additional storage. Each of the components 2450, 2452, 2464, 2454, 2466, and 2468, are interconnected using various buses, and several of the components may be mounted on a common motherboard or in other manners as appropriate.

The processor 2452 can execute instructions within the computing device 2450, including instructions stored in the memory 2464. The processor may be implemented as a chipset of chips that include separate and multiple analog and digital processors. Additionally, the processor may be implemented using any of a number of architectures. For example, the processor 2410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 2450, such as control of user interfaces, applications run by device 2450, and wireless communication by device 2450.

Processor 2452 may communicate with a user through control interface 2458 and display interface 2456 coupled to a display 2454. The display 2454 may be, for example, a TFT (Thin-Film-Transistor Liquid Crystal Display) display or an OLED (Organic Light Emitting Diode) display, or other appropriate display technology. The display interface 2456 may comprise appropriate circuitry for driving the display 2454 to present graphical and other information to a user. The control interface 2458 may receive commands from a user and convert them for submission to the processor 2452. In addition, an external interface 2462 may be provided in communication with processor 2452, so as to enable near area communication of device 2450 with other devices. External interface 2462 may provide, for example, for wired communication in some implementations, or for wireless communication in other implementations, and multiple interfaces may also be used.

The memory 2464 stores information within the computing device 2450. The memory 2464 can be implemented as one or more of a computer-readable medium or media, a volatile memory unit or units, or a non-volatile memory unit or units. Expansion memory 2474 may also be provided and connected to device 2450 through expansion interface 2472, which may include, for example, a SIMM (Single In Line Memory Module) card interface. Such expansion memory 2474 may provide extra storage space for device 2450, or may also store applications or other information for device 2450. Specifically, expansion memory 2474 may include instructions to carry out or supplement the processes described above, and may include secure information also. Thus, for example, expansion memory 2474 may be provided as a security module for device 2450, and may be programmed with instructions that permit secure use of device 2450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2464, expansion memory 2474, or memory on processor 2452 that may be received, for example, over transceiver 2468 or external interface 2462.

Device 2450 may communicate wirelessly through communication interface 2466, which may include digital signal processing circuitry where necessary. Communication interface 2466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2468. In addition, short-range communication may occur, such as using a Bluetooth, WiFi, or other such transceiver (not shown). In addition, GPS (Global Positioning System) receiver module 2470 may provide additional navigation- and location-related wireless data to device 2450, which may be used as appropriate by applications running on device 2450.

Device 2450 may also communicate audibly using audio codec 2460, which may receive spoken information from a user and convert it to usable digital information. Audio codec 2460 may likewise generate audible sound for a user, such as through a speaker, e.g., in a handset of device 2450. Such sound may include sound from voice telephone calls, may include recorded sound (e.g., voice messages, music files, etc.) and may also include sound generated by applications operating on device 2450.

The computing device 2450 may be implemented in a number of different forms, as shown in the figure. For example, it may be implemented as a cellular telephone 2480. It may also be implemented as part of a smartphone 2482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A system for automatically profiling pallets, the system including:
   a pallet profiling frame defining an opening that is sized and shaped for a pallet to pass through;
   a plurality of cameras mounted to the pallet profiling frame at a plurality of different locations along the pallet profiling frame, the plurality of cameras being configured to capture images of a pallet as the pallet passes through the opening of the pallet profiling frame, the images providing multiple different views of the pallet from a plurality of different vantage points provided by the cameras being mounted to the pallet profiling frame at the plurality of different locations;
   a pallet profiling computer system that is configured to receive the images captured by the plurality of cameras and to automatically profile the pallet based, at least in part, on analysis of the images, wherein automatically profiling the pallet includes:
   generating a point cloud representing the pallet based on the images, the point cloud comprising a collection of points in three-dimensional space that identify physical contours of the pallet, determining a size of the pallet based on the point cloud generated from images of the pallet, identifying contents of the pallet based on the images, and providing pallet information identifying, at least, the size and contents of the pallet to a warehouse management system in association with the pallet;

one or more conveyor belts that are configured to convey the pallet through the opening of the pallet profiling frame;

one or more optical gateways that are positioned along the conveyor belts to detect presence of the pallet at particular locations relative to the pallet profiling frame; and a pallet profiling controller that is configured to selectively control different groups of the cameras to capture the images based on the position of the pallet along the conveyor belts as indicated by signals from the optical gateways.

2. The system of claim 1, wherein the size of the pallet includes a height of the pallet.

3. The system of claim 2, wherein:
the pallet information provided to the warehouse management system includes the height of the pallet,
the pallet profiling frame is located at a warehouse and is configured to automatically profile the pallet upon arrival at the warehouse, and
the warehouse management system uses the pallet information (i) to select an appropriately-sized storage location for the pallet in the warehouse and (ii) to direct storage of the pallet in the selected storage location.

4. The system of claim 3, wherein the warehouse management system directs a robot or other type of warehouse vehicle capable of transporting the pallet to store the pallet in the appropriately-sized storage location.

5. The system of claim 3, wherein the warehouse management system directs an automated warehouse system to convey the pallet in the appropriately-sized storage location via one or more automated pallet transportation mechanisms contained in the warehouse.

6. The system of claim 1, wherein the contents of the pallet include (i) a type of goods and (ii) a quantity of the type of goods contained in the pallet.

7. The system of claim 6, wherein:
the type of goods are identified based, at least in part, on optical identification of one or more goods identifying markings from the images of the pallet, and
the quantity of the type of goods is determined based on (i) the size of the pallet and (ii) a size of containers determined for the type of goods on the pallet.

8. The system of claim 7, wherein the one or more goods identifying markings include a barcode identifying a SKU corresponding to the type of goods.

9. The system of claim 7, wherein the one or more goods identifying markings on the pallet include text that identifies the type of goods.

10. The system of claim 7, wherein:
the containers include boxes containing the types of goods, and
determining the quantity of the type of goods includes identifying (i) a number of boxes contained within a layer of the pallet based on the size of the pallet and the size of the containers and (ii) a number of layers of boxes contained within the pallet based on the size of the pallet and the size of the containers.

11. The system of claim 6, wherein the contents of the pallet further include one or more expiration dates of perishable goods contained in the pallet.

12. The system of claim 6, wherein:
the pallet profiling frame is located at a warehouse and is configured to automatically profile the pallet upon arrival at the warehouse, and
the warehouse management system uses the pallet information to select an appropriate area of the warehouse for storage of the pallet based on the types of goods contained in the pallet and environmental requirements for safe storage of the types of goods.

13. The system of claim 1, wherein automatically profiling the pallet further includes:
identifying a lean amount for the pallet based on the point cloud generated from images of the pallet, wherein the lean amount identifies an amount by which goods contained in the pallet lean to one or more sides of the pallet,
wherein the information provided to the warehouse management system includes the lean amount for the pallet.

14. The system of claim 13, wherein identifying the lean amount includes:
generating geometric planes that represent sides of the pallet based on the geometric planes providing a at least a threshold fit with points from the point cloud that correspond to the sides of the pallet, and
identifying angles by which each of the geometric planes are offset from a vertical orientation, wherein the lean amount corresponds to the angles.

15. The system of claim 14, wherein automatically profiling the pallet further includes:
determining a confidence value for the determined lean amount based on a difference between the angles for opposing sides of the pallet, wherein the confidence value indicates a degree to which the system can rely on the automatic lean determinations for the pallet.

16. The system of claim 13, wherein:
the pallet profiling frame is located at a warehouse and is configured to automatically profile the pallet upon arrival at the warehouse, and
the warehouse management system uses the lean amount from the pallet information to determine whether to disassemble and reassemble the pallet before storage in the warehouse to avoid potential dangers and damage that may result from at least a threshold level of pallet lean.

17. The system of claim 1, wherein automatically profiling the pallet further includes:
identifying damage to the pallet based on one or more of: the point cloud and the images of the pallet,
wherein the information provided to the warehouse management system includes the identified damage.

18. The system of claim 17, wherein:
the identified damage includes damage to goods contained in the pallet, and
identifying the damage includes identifying, from the point cloud, one or more of: voids of at least a threshold size in a side of the pallet and protrusions extending at least a threshold length from a side of the pallet.

19. The system of claim 17, wherein:
the identified damage includes damage to a pallet frame on which goods contained in the pallet rest, and
identifying the damage includes processing images of the frame using one or more machine learning algorithms and one or more trained models of frame damage to determine whether the pallet frame includes damage and a type of damage.

20. The system of claim 17, wherein:
the pallet profiling frame is located at a warehouse and is configured to automatically profile the pallet upon arrival at the warehouse, and
the warehouse management system uses the damage from the pallet information to determine whether to disassemble and reassemble the pallet before storage in the warehouse to avoid potential dangers and damage that may result from at least a threshold level of damage.

21. The system of claim 1, wherein:
the groups of cameras include (i) a first group of cameras that are arranged along surfaces of the pallet profiling frame that define the opening and that are configured to capture images of the pallet as it passes through the opening, (ii) a second group of cameras that extend from the pallet profiling frame to capture front and back images of the pallet as it enters into and exits through the opening, and (iii) a third group of cameras that are positioned below a top surface of the conveyor belts at or around the opening of the pallet profiling frame so as to capture images of a pallet frame for the pallet, and
light sources positioned on opposing sides of the conveyor belts at one or more locations before or after the opening.

22. The system of claim 21, wherein the second group of cameras include rotatable cameras that are configured to selectively rotate to capture a first set of images of the pallet before the pallet reaches the opening and, as the pallet passes through the opening, to rotate so as to capture a second set of images of the pallet after the pallet has passed through the opening.

23. The system of claim 1, further comprising:
a weight scale that is positioned along the conveyor belts and that is configured to record a weight of the pallet as it moves down the conveyor belts,
wherein the information provided to the warehouse management system includes the weight for the pallet.

24. The system of claim 1, wherein:
the pallet profiling frame is positioned at or around a doorway in a warehouse, and
the images are captured as a machine carrying and transporting the pallet throughout the warehouse passes through the doorway in the warehouse.

25. The system of claim 24, wherein:
the doorway comprises a truck bay door in the warehouse, and
the machine comprises a forklift.

26. The system of claim 1, further comprising:
one or more thermal imaging devices that are configured to capture one or more thermal images of the pallet as it passes through the opening, and
wherein the information provided to the warehouse management system includes the thermal images of the pallet.

27. The system of claim 1, wherein automatically profiling the pallet further includes:
determining confidence values for the pallet information based on the images and the point cloud, wherein the confidence values indicate a determined level of accuracy of the pallet information,
determining whether one or more of the confidence values are less than a threshold confidence level,
providing, in response to determining that one or more of the confidence values are less than the threshold confidence level, the pallet information to a user computing device for review, wherein the user computing device is configured (i) to present the pallet information to a user with, at least, the images of the pallet and (ii) to receive user input verifying or correcting the pallet information with corresponding confidence values below the threshold confidence level,
receiving the user input from the user computing device verifying or correcting the pallet information, and
providing the verified or corrected pallet information to the warehouse management system.

28. The system of claim 1, further comprising:
a tunnel with which the pallet profiling frame is positioned, the tunnel including an entrance and an exit between which the pallet profiling frame is positioned inside the tunnel, the entrance and exit being sized to permit the pallet to pass into and through the tunnel and the opening of the pallet profiling frame;
an x-ray scanner device that is positioned inside the tunnel to capture x-ray images of the pallet and its contents, wherein the tunnel is configured to minimize or eliminate interference from radiation in an ambient environment when capturing the x-ray images; and
wherein the information provided to the warehouse management system includes the x-ray images of the pallet.

29. The system of claim 1, further comprising:
a tunnel with which the pallet profiling frame is positioned, the tunnel including an entrance and an exit between which the pallet profiling frame is positioned inside the tunnel, the entrance and exit being sized to permit the pallet to pass into and through the tunnel and the opening of the pallet profiling frame;
a millimeter wave scanner device that is positioned inside the tunnel to capture millimeter wave images of the pallet and its contents, wherein the tunnel is configured to minimize or eliminate interference from radiation in an ambient environment when capturing the millimeter wave images; and
wherein the information provided to the warehouse management system includes the millimeter wave images of the pallet.

* * * * *